United States Patent
Chiang et al.

(10) Patent No.: US 7,338,734 B2
(45) Date of Patent: Mar. 4, 2008

(54) CONDUCTIVE LITHIUM STORAGE ELECTRODE

(75) Inventors: Yet-Ming Chiang, Framingham, MA (US); Sung-Yoon Chung, Seoul (KR); Jason T. Bloking, Cambridge, MA (US); Anna M. Andersson, Uppsala (SE)

(73) Assignee: Massachusetts Institute of Technology, Cambridge, MA (US)

( * ) Notice: Subject to any disclaimer, the term of this patent is extended or adjusted under 35 U.S.C. 154(b) by 473 days.

(21) Appl. No.: 10/329,046

(22) Filed: Dec. 23, 2002

(65) Prior Publication Data

US 2004/0005265 A1    Jan. 8, 2004

Related U.S. Application Data

(60) Provisional application No. 60/343,060, filed on Dec. 21, 2001, provisional application No. 60/388,721, filed on Jun. 14, 2002, provisional application No. 60/412,656, filed on Sep. 20, 2002.

(51) Int. Cl.
*H01M 4/52* (2006.01)
*H01M 4/62* (2006.01)

(52) U.S. Cl. ............. 429/221; 429/231.5; 429/232

(58) Field of Classification Search ............ 429/221, 429/231.5, 232
See application file for complete search history.

(56) References Cited

U.S. PATENT DOCUMENTS 4,048,395 A    9/1977 Lai (Continued)

FOREIGN PATENT DOCUMENTS

CA    2200998    3/1997

(Continued)

OTHER PUBLICATIONS

Aleshin, A.N. et al., "Transport Properties of Poly (3,4-Ethylenedioxythiophene)/Poly (Styrenesulfonate)," Synthetic Metals 94:173 (1998).

(Continued)

*Primary Examiner*—Tracy Dove
(74) *Attorney, Agent, or Firm*—Wolf, Greenfield & Sacks, P.C.

(57) ABSTRACT

A compound comprising a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1-a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)_z$ $(A_{1-a}M''_a)_xM'_y(X_2D_7)_z$ and have values such that $(1-a)_x$ plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, and x, y, and z are greater than zero. The compound can have a conductivity at 27° C. of at least about $10^{-8}$ S/cm. The compound can be a doped lithium phosphate that can intercalate lithium or hydrogen. The compound can be used in an electrochemical device including electrodes and storage batteries and can have a gravimetric capacity of at least about 80 mAh/g while being charged/discharged at greater than about C rate of the compound.

132 Claims, 25 Drawing Sheets

U.S. PATENT DOCUMENTS

| | | |
|---|---|---|
| 4,245,016 A | 1/1981 | Rampel |
| 4,668,596 A | 5/1987 | Shacklette et al. |
| 4,889,777 A | 12/1989 | Akuto |
| 4,950,566 A | 8/1990 | Huggins et al. |
| 5,187,209 A | 2/1993 | Hirai et al. |
| 5,213,895 A | 5/1993 | Hirai et al. |
| 5,436,093 A | 7/1995 | Huang et al. |
| 5,538,814 A | 7/1996 | Kamauchi et al. |
| 5,576,121 A | 11/1996 | Yamada et al. |
| 5,614,334 A | 3/1997 | Kamauchi et al. |
| 5,624,605 A | 4/1997 | Cao et al. |
| 5,670,277 A | 9/1997 | Barker et al. |
| 5,677,080 A | 10/1997 | Chen |
| 5,695,893 A | 12/1997 | Arai et al. |
| 5,705,296 A | 1/1998 | Kamauchi et al. |
| 5,714,053 A | 2/1998 | Howard et al. |
| 5,733,683 A | 3/1998 | Searson et al. |
| 5,759,714 A | 6/1998 | Matsufuji et al. |
| 5,789,100 A | 8/1998 | Burroughs et al. |
| 5,834,136 A | 11/1998 | Gao et al. |
| 5,871,866 A | 2/1999 | Barker et al. |
| 5,897,522 A | 4/1999 | Nitzan |
| 5,902,689 A | 5/1999 | Vleggar et al. |
| 5,910,382 A * | 6/1999 | Goodenough et al. ... 429/218.1 |
| 5,925,283 A | 7/1999 | Taniuchi et al. |
| 6,085,015 A | 7/2000 | Armand et al. |
| RE36,843 E | 8/2000 | Lake et al. |
| 6,096,454 A | 8/2000 | Tran et al. |
| 6,103,419 A | 8/2000 | Saidi et al. |
| 6,120,940 A | 9/2000 | Poehler et al. |
| 6,136,472 A | 10/2000 | Barker et al. |
| 6,136,476 A | 10/2000 | Schutts et al. |
| 6,153,333 A | 11/2000 | Barker |
| 6,156,931 A | 12/2000 | Lewis |
| 6,174,623 B1 | 1/2001 | Shackle |
| 6,203,946 B1 | 1/2001 | Barker et al. |
| 6,231,779 B1 | 1/2001 | Chiang et al. |
| 6,300,016 B1 | 1/2001 | Jan et al. |
| 6,306,540 B1 | 1/2001 | Hiroi et al. |
| 6,319,632 B1 | 1/2001 | Amine |
| 6,337,156 B1 | 1/2001 | Narang et al. |
| 6,387,568 B1 | 1/2001 | Barker et al. |
| 6,391,493 B1 | 1/2001 | Goodenough et al. |
| 6,447,951 B1 | 1/2001 | Barker et al. |
| 6,514,640 B1 | 1/2001 | Armand et al. |
| 6,528,033 B1 | 1/2001 | Barker et al. |
| 6,596,435 B2 | 1/2001 | Kelley et al. |
| 6,599,662 B1 | 1/2001 | Chiang et al. |
| 6,787,232 B1 | 1/2001 | Chiang et al. |
| 6,720,113 B2 * | 1/2004 | Goto et al. ............ 429/231.95 |
| 2001/0005558 A1 | 6/2001 | Yoshioka et al. |
| 2001/0005562 A1 | 6/2001 | Yoshioka et al. |
| 2001/0007726 A1 | 7/2001 | Yoshioka et al. |
| 2001/0021472 A1 | 9/2001 | Barker et al. |
| 2001/0055718 A1 | 12/2001 | Li |
| 2002/0004169 A1 | 1/2002 | Yamada et al. |
| 2002/0015278 A1 | 2/2002 | Fukuyama et al. |
| 2002/0036282 A1 | 3/2002 | Chiang et al. |
| 2002/0039687 A1 | 4/2002 | Barker et al. |
| 2002/0041998 A1 | 4/2002 | Hosoya et al. |
| 2002/0047112 A1 | 4/2002 | Hosoya et al. |
| 2002/0048706 A1 | 4/2002 | Mayes et al. |
| 2002/0056719 A1 | 5/2002 | Morin et al. |
| 2002/0061274 A1 | 5/2002 | Hosoya et al. |
| 2002/0071990 A1 | 6/2002 | Kweon et al. |
| 2002/0071991 A1 | 6/2002 | Kweon et al. |
| 2002/0074972 A1 | 6/2002 | Narang et al. |
| 2002/0086214 A1 | 7/2002 | Barker et al. |
| 2002/0094481 A1 | 7/2002 | Goto et al. |
| 2002/0102459 A1 | 8/2002 | Hosoya et al. |
| 2002/0106562 A1 | 8/2002 | Sato et al. |
| 2002/0106563 A1 | 8/2002 | Okawa et al. |
| 2002/0106564 A1 | 8/2002 | Okawa et al. |
| 2002/0110736 A1 | 8/2002 | Kweon et al. |
| 2002/0114754 A1 | 8/2002 | Hosoya et al. |
| 2002/0122984 A1 | 9/2002 | Sakai et al. |
| 2002/0124386 A1 | 9/2002 | Hosoya et al. |
| 2002/0150816 A1 | 10/2002 | Sakai et al. |
| 2002/0168573 A1 | 11/2002 | Baker et al. |
| 2002/0182497 A1 | 12/2002 | Kohzaki et al. |
| 2002/0192137 A1 * | 12/2002 | Chaloner-Gill et al. ..... 423/306 |
| 2002/0192148 A1 | 12/2002 | Kweon et al. |
| 2002/0192553 A1 | 12/2002 | Barker et al. |
| 2002/0195591 A1 | 12/2002 | Ravet et al. |
| 2003/0003352 A1 | 1/2003 | Kweon et al. |
| 2003/0013019 A1 | 1/2003 | Barker et al. |
| 2003/0027049 A1 | 2/2003 | Barker et al. |
| 2003/0049529 A1 | 3/2003 | Cho et al. |
| 2003/0054250 A1 | 3/2003 | Kweon et al. |
| 2003/0064287 A1 | 4/2003 | Masquelier et al. |
| 2003/0064290 A1 | 4/2003 | Li |
| 2003/0077514 A1 | 4/2003 | Barker et al. |
| 2003/0082446 A1 | 5/2003 | Yet-Ming Chiang et al. |
| 2003/0082454 A1 | 5/2003 | Armand et al. |
| 2003/0087155 A1 | 5/2003 | Cho |
| 2003/0099884 A1 | 5/2003 | Chiang et al. |
| 2003/0124423 A1 | 7/2003 | Sasaki et al. |
| 2003/0129492 A1 | 7/2003 | Barker et al. |
| 2003/0143465 A1 | 7/2003 | Takahashi et al. |
| 2003/0170534 A1 | 9/2003 | Kim et al. |
| 2003/0170542 A1 | 9/2003 | Barker et al. |
| 2004/0033360 A1 | 2/2004 | Armand et al. |
| 2004/0086445 A1 | 5/2004 | Armand et al. |
| 2004/0175614 A1 | 9/2004 | Wurm et al. |

FOREIGN PATENT DOCUMENTS

| | | |
|---|---|---|
| CA | 2270771 | 10/2000 |
| EP | 0 421 421 A1 | 4/1991 |
| EP | 0 933 827 A1 | 8/1999 |
| EP | 1 231 651 | 8/2002 |
| EP | 1 231 653 | 8/2002 |
| JP | 04-58455 | 2/1992 |
| JP | 7101728 A | 4/1995 |
| JP | 8287914 | 1/1996 |
| JP | 9022693 A | 1/1997 |
| JP | 9035717 | 2/1997 |
| WO | WO98/16960 | 4/1998 |
| WO | WO99/56331 | 11/1999 |
| WO | WO 00/41256 | 7/2000 |
| WO | WO 01/53198 A1 | 7/2001 |
| WO | WO 01/54212 A1 | 7/2001 |
| WO | WO 01/77501 A2 | 10/2001 |
| WO | WO 02/27823 A1 | 4/2002 |
| WO | WO 02/27824 A1 | 4/2002 |
| WO | WO 02/43168 A2 | 5/2002 |
| WO | WO 03/012908 A2 | 2/2003 |
| WO | WO 03/056646 A1 | 7/2003 |

OTHER PUBLICATIONS

Arbizzani et al., "$Li_{1.03}Mn_{1.97}O_4$ Surface Modification by Poly (3,4-Ethylenedioxythiophene)," Poster presented at 11th Intl. Meeting on Lithium Batteries, Jun. 23-28, 2002, Monterey, CA.

Armand, M.B. et al., "Poly-Ethers as Solid Electrolytes," Proceedings of the Intl. Conference on Fast Ion Transport in Solids, Electrodes and Electrolytes, Lake Geneva, WI, 131-136 (1979).

Chiang, Y. et al., "High Capacity, Temperature-Stable Lithium Aluminum Manganese Oxide Cathodes for Rechargeable Batteries," Electrochem. and Solid-State Lett. 2(3):107 (1999).

Elliott, S.R., "Physics of Amorphous Materials," Longman Group Limited.

French, R.H. et al., "Full Spectral Calculation of Non-Retarded Hamaker Constants for Ceramic System from Interband Transition Strengths," Solid State Ionics 75:13 (1995).

French, R.H. et al., "Origins and Applications of London Dispersion Forces and Hamaker Constants in Ceramics," J. Am. Ceram. Soc. 83(9):2117 (2000).

Ghosh, S. et al., "Supramolecular Self-Assembly for Enhanced Conductivity in Conjugated Polymer Blends: Ionic Crosslinking in Blends of Poly(3,4-Ethylenedioxythiophene)-Poly(Styrenesulfonate) and Poly(vinylpyrrolidone)," Adv. Mater. 10(14):1097 (1998).

Gray, F.M., "Solid Polymer Electrolytes,"VCH Publishers Inc. (1991).

Idota, Y. et al., "Tin-Based Amorphous Oxide: A High-Capacity Lithium-Ion-Storage Material," Science 276:1395 (1997).

Kuwabata, S. et al., "Charge-Discharge Properties of Composites of $LiMn_2O_4$ and Polypyrole as Positive Electrode Materials for 4 V Class of Rechargeable Li Batteries," Electrochimica Acta 44:4593 (1999).

Limthongkul, P. et al., "Nanocomposite Li-Ion Battery Anodes Produced by the Partial Reduction of Mixed Oxides," Chem. Mater. 13:2397 (2001).

Milling, A. et al., "Direct Measurement of Repulsive Van Der Waals Interactions Using an Atomic Force Microscope," J. Colloid & Interface Science 180:460 (1996).

Neumann et al., "Negative Hamaker Coefficients," Colloid and Polymer Science 257(4):414 (1979).

Ohzuku, T. et al., "Synthesis and Characterization of $LiAl_{1/4}Ni_{3/4}O_2$ (R3m) for Lithium-Ion (Shuttlecock) Batteries," J. Electrochem. Soc. 142(12):4033 (1995).

Van Oss, C.J. et al., "Applications of Net Repulsive Van Der Waals Forces Between Different Particles, Macromolecules or Biological Cells in Liquids," Colloids and Surfaces 1:45 (1980)

Van Oss, C.J. et al., "Comparison Between Antigen-Antibody Binding Energies and Interfacial Free Energies," Immunological Communications 6(4):341 (1977).

Van Oss, C.J. et al., "Repulsive Van Der Waals Forces. I. Complete Dissociation of Antigen-Antibody Complexes by Means of Negative Van Der Waals Forces," Immunological Communications 8(1):11 (1979).

Van Oss, C.J. et al., "Repulsive Van Der Waals Forces. II Mechanism of Hydrophobic Chromatography," Separation Science and Technology 14(4):305 (1979).

Wang, C. et al., "All Solid-State $Li/Li_AMnO_2$ Polymer Battery Using Ceramic Modified Polymer Electrolytes," J. Electrochemical Soc. 149(8):A967 (2002).

Gaubicher, et al., "Li/β-$VOPO_4$:A new 4 V System for Lithium Batteries," J. Electrochem Soc. 146(12):4375 (1999).

Huang, et al., "Approaching Theoretical Capacity of $LiFePO_4$ at Room Termperature at High Rates," Electrochem. Sol. St. Lett. 4(10):A170 (2001).

International Search Report, from PCT/US02/41471, mailed Apr. 11, 2003.

International Preliminary Examination Report, from PCT/US02/41471.

Padhi, et al., "Phoso-olivines as Positive-Electrode Materials for Rechargeable Lithium Batteries," J. Electrochem. Soc. 144:1188 (1997).

Ravet, et al., "Improved Iron Based Cathode Material," Abstr. No. 127, ECS Fall Meeting, Hawaii (1999).

Ravet, et al., "Electroactivity of Natural and Synthetic Triphylite," J. Power Sources 97-98:503 (2001).

Tarascon, et al., "Issues and Challenges Facing Rechargeable Lithium Batteries," Nature 414:359 (2001).

Yamada, et al., "Crystal Chemistry of the Olivine-Type $Li(Mn_yFe_{1-y})PO_4$ and $(Mn_yFe_{1-y})PO_4$ as Possible 4 V Cathode Materials for Lithium Batteries," J. Electrochem. Soc. 148(8):A960 (2001).

Yamada, et al., "Optimized $LiFePO_4$ for Lithium Battery Cathodes," J. Electrochem. Soc. 148(3):A224 (2001).

Chen, Z., et al., "Reducing Carbon in $LiFePO_4$/C Composite Electrodes to Maximize Specific Energy, Volumetric Energy, and Tap Density", Journal of The Electrochemical Society, 149(9) (2002) A1184-A1189.

* cited by examiner 0.1% Ti/600°C/Ar/24 h

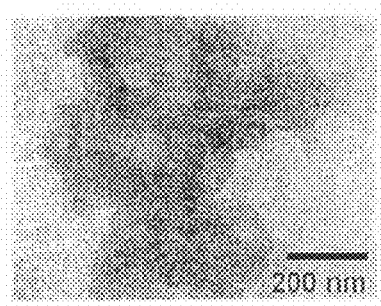
FIG. 7A
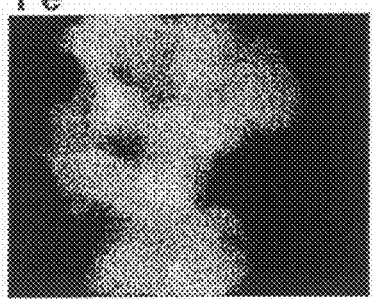
FIG. 7B Fe
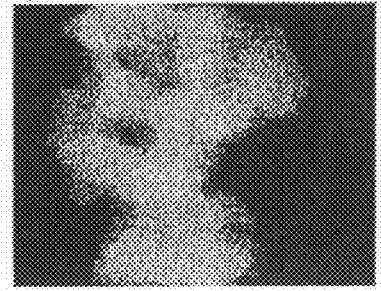
FIG. 7C P
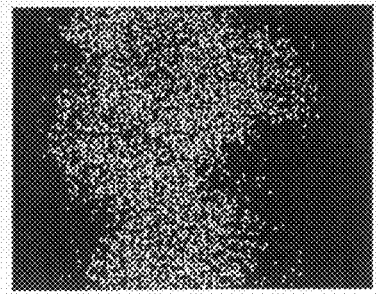
FIG. 7D Nb
Uniformly Distributed Niobium
$(Li_{0.99}Nb_{0.01})FePO_4$, 600°C, 20h, Ar

4-Point Contact Resistivity for Semi-infinite Body[1]
$$\rho = 2\pi sR$$

$R = \Delta V / I$
s = distance between inner probes (10 μm)
Valid when specimen thickness is >> s 1. L. B. Valdes, Proc. IRE, 42, 420-427 (1954).

1 % Nb doped

1 % Zr doped

1% Nb-doped, 600C
5 nm
1 nm
No surface coating observed 5 nm
1 nm

CONDUCTIVE LITHIUM STORAGE ELECTRODE

RELATED APPLICATIONS

This application claims priority under 35 U.S.C. §119(e) to U.S. Provisional Application Ser. No. 60/343,060, filed on Dec. 21, 2001, U.S. Provisional Application Ser. No. 60/388,721, filed on Jun. 14, 2002, and U.S. Provisional Application Ser. No. 60/412,656, filed on Sep. 20, 2002, the disclosures of which are herein incorporated by reference.

GOVERNMENTAL SUPPORT

This invention was made with government support under Grant Number DE-FG02-87ER45307 awarded by the Department of Energy. The government has certain rights in the invention.

BACKGROUND OF THE INVENTION

1. Field of the Invention

The present invention is directed to transition metal polyanion oxides that can be used as alkali ion combined materials and more particularly to lithium-ion intercalating structures that can be used as electrochemical compounds.

2. Description of the Related Art

The published literature contains many references by those skilled in the art to the insulating nature of these compounds, and the limitations on their utility as battery storage materials thereby created. For example, Gaubicher et al. (J. Gaubicher, T. Le Mercier, Y. Chabre, J. Angenault, and M. Quarton, "Li/β-VOPO$_4$: A New 4 V System for Lithium Batteries," *J. Electrochem. Soc.*, 146[12] 4375-4379 (1999)) comment with respect to the NASICON compounds that "unfortunately, the anionic units tend to isolate the transition elements, which consequently leads to low electronic conductivity."

In "Approaching Theoretical Capacity of LiFePO$_4$ at Room Temperature at High Rates," H. Huang, S.-C. Yin and L. F. Nazar, *Electrochem. Sol. St. Lett.*, 4[10] A170-A172 (2001), explain that "however, owing to their very poor conductivity, initial reports indicated that Li$^+$ can only be partially extracted/inserted at room temperature at modest rates." And, in "Issues and challenges facing rechargeable lithium batteries," J.-M. Tarascon and M. Armand, *Nature*, 414, 359-367 (2001), note that with respect to these compounds that "one of the main drawbacks with using these materials is their poor electronic conductivity, and this limitation had to be overcome through various materials processing approaches, including the use of carbon coatings, mechanical grinding or mixing, and low-temperature synthesis routes to obtain tailored particles."

Proposed solutions to the poor electronic conductivity have typically focused entirely on coating with carbon or adding a significant excess of carbon during synthesis. Coating with carbon has been described by N. Ravet et al. in "Improved iron-based cathode materials," Abstr. No. 12, ECS Fall meeting, Hawaii, 1999 and by Morcrette et al. in M. Morcrette, C. Wurm, J. Gaubicher, and C. Masquelier, "Polyanionic structures as alternative materials for lithium batteries," Abstr. No. 93, Li Battery Discussion Meeting, Bordeaux, Archachon, 27 May-1 Jun. 2001. Co-synthesizing with carbon has been discussed by H. Huang et al. at the Univ. of Waterloo and by Yamada et al. at the Electrochemical Society Fall Meeting, San Francisco, Calif., September 2001. However, the addition of carbon as a conductive additive can lower the gravimetric and volumetric capacity of the storage material. In some instances, about 20 wt % carbon is added to the electrode formulation (approximately 30% by volume). This significant volume of carbon does not typically store lithium storage at the potentials at which the polyanion compounds store lithium.

It is therefore clear and widely acknowledged by those skilled in the art that poor electronic conductivity is, firstly, an inherent feature of the lithium-metal-polyanion compounds discussed herein, and secondly, that this inherent feature limits the applicability of the materials in lithium storage applications, including lithium battery electrodes, especially at temperatures near room temperature. While published literature and patents describe the addition of various metal additives to such compounds, they are silent as to whether the critical and enabling property of improved electronic conductivity can be obtained.

SUMMARY OF THE INVENTION

The invention provides compounds, methods of forming compounds, electrodes that comprise compounds and storage battery cells that include an electrode that comprises a compound.

In one set of embodiments, a compound is provided. The compound comprises a composition $A_x(M'_{1-a}M''_a)_y(XD4)_z$, $A_x(M'_{1-a}M''_a)_y(DXD_4)_z$, or $A_x(M'_{1-a}M''_a)_y(X_2D_7)_z$, wherein A is at least one of an alkali metal or hydrogen, M' is a first-row transition metal, X is at least one of phosphorus, sulfur, arsenic, boron, aluminum, silicon, vanadium, molybdenum and tungsten, M" is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, and x is equal to or greater than 0, y and z are greater than 0 and have values such that x, plus y(1-a) times a formal valence or valences of M', plus ya times a formal valence or valence of M", is equal to z times a formal valence of the XD$_4$, X$_2$D$_7$, or DXD$_4$ group. In some of these embodiments, the compound has a conductivity at 27° C. of at least about 10$^{-8}$ S/cm. In some of these embodiments, the compound has a specific surface area of at least 15 m$^2$/g. In some of these embodiments, the compound crystallizes in an ordered or partially disordered structure of the olivine (A$_x$MXO$_4$), NASICON (A$_x$(M',M")$_2$(XO$_4$)$_3$), VOPO$_4$, LiFe(P$_2$O$_7$) or Fe$_4$(P$_2$O$_7$)$_3$ structure-types, and has a molar concentration of the metals (M'+M") relative to the concentration of the elements X that exceeds the ideal stoichiometric ratio y/z of the prototype compounds by at least 0.0001.

In another set of embodiments, a compound is provided. The compound comprises a composition $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)_z$, wherein A is at least one of an alkali metal or hydrogen, M' is a first-row transition metal, X is at least one of phosphorus, sulfur, arsenic, boron, aluminum, silicon, vanadium, molybdenum and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, and x, y, and z are greater than zero and have values such that (1-a)x plus the quantity ax times the formal valence or valences of M" plus y times the formal valence or valences of M' is equal to z tines the formal valence of the XD$_4$, X$_2$D$_7$ or DXD$_4$ group. In some of these embodiments, the compound has a conductivity at 27° C. of at least about 10$^{-8}$ S/cm. In some of these embodiments, the compound has a specific surface area of at least 15 m$^2$/g. In some of these embodiments, the compound crystallizes in an ordered or partially disordered structure of the olivine ($A_xMXO_4$), NASICON ($A_x(M',M'')_2(XO_4)_3$), $VOPO_4$, $LiFe(P_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

In another embodiment, a compound is provided. The compound comprises a composition $(A_{b-a}M''_a)_xM'_y(XD_4)_z$, $(A_{b-a}M''_a)_xM'_y(DXD_4)_z$, or $(A_{b-a}M''_a)_xM'_y(X_2D_7)_z$, wherein A is at least one of an alkali metal or hydrogen, M' is a first-row transition metal, X is at least one of phosphorus, sulfur, arsenic, boron, aluminum, silicon, vanadium, molybdenum and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, $a \leq b \leq 1$, and x, y, and z are greater than zero and have values such that $(b-a)_x$ plus the quantity ax times the formal valence or valences of M" plus y times the formal valence or valences of M' is equal to z times the formal valence of the $XD_4$, $X_2D_7$ or $DXD_4$ group. In some of these embodiments, the compound has a conductivity at 27° C. of at least about $10^{-8}$ S/cm. In some of these embodiments, the compound has a specific surface area of at least 15 $m^2$/g. In some of these embodiments, the compound crystallizes in an ordered or partially disordered structure of the olivine ($A_xMXO_4$), NASICON ($A_x(M',M'')_2(XO_4)_3$), $VOPO_4$, $LiFe(P_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

In another set of embodiments, methods of forming a compound are provided. The methods include mixing an alkali metal or hydrogen salt, a first-row transition metal salt, a salt of at least one of phosphorus, sulfur, arsenic, silicon, aluminum, boron, vanadium, molybdenum and tungsten, and a salt of any of a Group IIA, IIIA, IVA, VA, VIA, VIIA, VIIIA, IB, IIB, IIIB, IVB, VB, and VIB metal; milling the mixture; and heat treating the mixture at a temperature between 300-900° C.

In another set of embodiments, methods of doping a material to form a lithium or hydrogen storage compound are provided. The methods include selecting a starting material to be doped, in conjunction with selection of milling equipment comprising a dopant for doping the starting material at a predetermined level of dopant. The methods further include milling the starting material in the milling equipment; and recovering from the milling step a material suitable for forming a lithium or hydrogen storage compound comprising the starting material doped with the dopant at the predetermined level.

In another set of embodiments, an electrode comprising a lithium storage compound is provided. The electrode can comprise any of the compounds described above and has a material energy density (i.e., voltage vs. Lixcharge capacity) that while: charging or discharging at a rate $\geq 30$ mA per g of storage compound, is greater than 350 Wh/kg; or, charging or discharging at a rate $\geq 150$ mA per g of storage compound, is greater than 280 Wh/kg; or, charging or discharging at a rate $\geq 300$ mA per g of storage compound, is greater than 270 Wh/kg; or, charging or discharging at a rate $\geq 750$ mA per g of storage compound, is greater than 250 Wh/kg; or, charging or discharging at a rate $\geq 1.5$ A per g of storage compound, is greater than 180 Wh/kg; or, charging or discharging at a rate $\geq 3$ A per g of storage compound, is greater than 40 Wh/kg; or, charging or discharging at a rate $\geq 4.5$ A per g of storage compound, is greater than 10 Wh/kg.

In another set of embodiments, an electrode comprising a lithium storage compound is provided. The lithium storage compound is a compound other than one of ordered or partially ordered rocksalt crystal structure type, or spinel crystal structure type, or vanadium oxide or manganese oxide. The compound has a material energy density (i.e., voltage vs. Lixcharge capacity) that while: charging or discharging at a rate $\geq 800$ mA per g of storage compound, is greater than 250 Wh/kg; or, charging or discharging at a rate $\geq 1.5$ A per g of storage compound, is greater than 180 Wh/kg; or, charging or discharging at a rate $\geq 3$ A per g of storage compound, is greater than 40 Wh/kg; or, charging or discharging at a rate $\geq 4.5$ A per g of storage compound, is greater than 10 Wh/kg.

In another set of embodiments, an electrode is provided. The electrodes includes a current collector comprising any of the compounds described above.

In another set of embodiments, a storage battery cell is provided. The storage battery comprises a positive electrode, a negative electrode and a separator positioned between the positive electrode and the negative electrode. At least one of the positive electrode or negative electrode comprises any of the compounds described above.

Other embodiments and novel features of the invention should become apparent from the following detailed description when considered in conjunction with the accompanying drawings. In cases of conflict between an incorporated reference and the present specification, the present specification shall control.

BRIEF DESCRIPTION OF DRAWINGS

Preferred, non-limiting embodiments of the present invention will be described by way of example with reference to the accompanying drawings, in which:

FIG. 35A shows powders containing 1 atom % dopant in the stoichiometry Li$_{1-x}$M$_x$FePO$_4$ are single-phase by XRD and TEM/STEM analysis. FIG. 35B shows powders containing 1 atom % dopant in the stoichiometry LiFe$_{1-x}$M$_x$PO$_4$ show Li$_3$PO$_4$ precipitation by XRD, and secondary phases enriched in the dopant by TEM/STEM (not shown);

FIGS. 7A-7D show elemental maps obtained by STEM of a powder of composition Li$_{0.99}$Nb$_{0.01}$FePO$_4$ (fired 600° C., 20 h, in argon) which illustrate the uniform dopant solid solution observed in compositions of stoichiometry Li$_{1-x}$M$_x$FePO$_4$;

FIG. 18A shows results of cycle testing which indicates high and stable reversible capacity for more than 150 cycles at a variety of current rates. Significant capacity with high coulombic efficiency (>99.5%) is retained at rates as high as 3225 mA/g (21.5C). FIG. 18B shows charge-discharge curves indicating little polarization even at the highest current rates, attributed to the high electronic conductivity and high specific surface area of the olivine powder;

Figure 1:
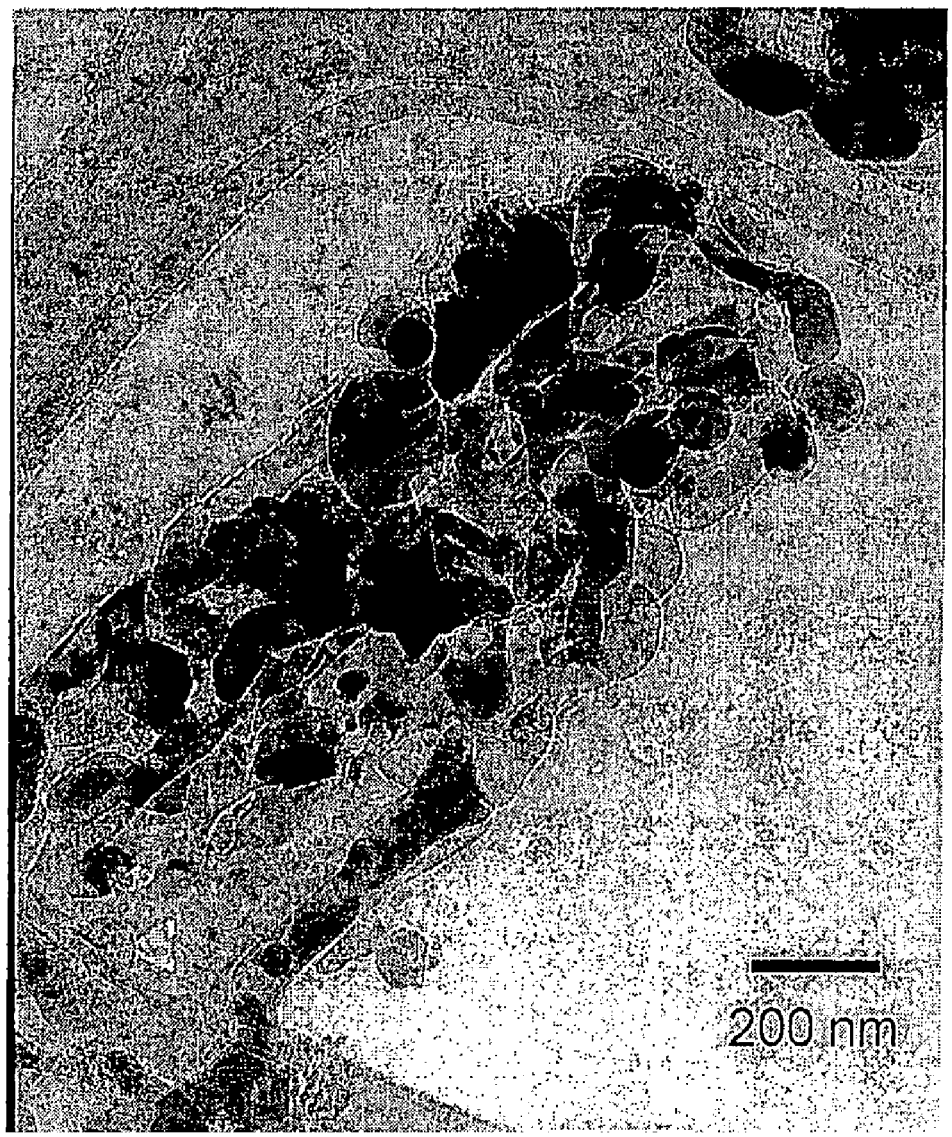
FIG. 1 is a copy of an TEM image of a compound with 0.1% Ti doping, prepared according to the method substantially described in Example 1 and heat treated at 600° C. in argon for twenty-four hours, showing that the primary crystallite size is about 100-200 nm and that the primary crystallites are aggregated into larger particles; and showing that there is no surface coating or other continuous phase which could provide improved electronic conductivity; thus, the improved electronic conductivity is likely due to an improvement in the compound itself.

DETAILED DESCRIPTION OF THE INVENTION $LiFePO_4$ and $Li(Mn,Fe)PO_4$ are ordered olivine structure compounds also known as the mineral triphylite. They belong to the general group known as polyanion compounds with tetrahedral "anion" structural units $(XO_4)^{n-}$, along with oxygen octahedra occupied by a transition metal M, and can include compounds of $Li_xMXO_4$ (olivine), $Li_xM_2(XO_4)_3$ (NASICON), $VOPO_4$, $LiFe(P_2O_7)$ or $Fe_4(P_2O_7)_3$ structure, and structures related to these by having additional metal ions occupying interstitial sites, symmetry-changing displacements, or minor changes in the connectivity of polyhedra. Here, X is comprised of a metal that can occupy tetrahedral sites within the polyanion groups and has a significant covalent bonding character. X can be P, S, As, Mo, W, Al, Si, or B. According to the present invention, these compounds can be used as lithium storage electrode materials because of their high lithium-insertion potential (relative to lithium metal), high theoretical capacity, low cost, ease of synthesis, and stability when used with common organic electrolyte systems. Despite these characteristics, it has been widely recognized that one of the limitations of this series of compounds is their low electronic conductivity, which greatly limits the practicality of these materials in battery systems. Related compounds such as $(Mg,Fe)SiO_4$ are also electronic insulators at an near room temperature, and only have appreciable electronic conductivity at greatly elevated temperatures.

It is therefore a surprising and unexpected discovery that certain compositions of $LiFePO_4$, prepared from starting materials of lithium salts, iron compounds, and phosphorous salts, including but not limited to, lithium carbonate, ammonium phosphate, and iron oxalate, and to which a low additional concentration of a metal supervalent to Li, such as, but not limited to, Mg, Al, Ti, Fe, Mn, Zr, Nb, Ta, and W, such as in the form of a metal oxide or metal alkoxide, have been added, and which is heat treated (HT) at a certain temperature range and atmosphere, exhibit increased electronic conductivity at and near room temperature to render the compounds useful as lithium storage materials.

As used herein, the electrical conductivity of materials will be given in units of S/cm, electrical resistivity in units of ohm-cm ($\Omega$-cm), resistance in ohms ($\Omega$), charge and discharge capacity in units of ampere hours per kilogram of the storage material (Ah/kg) or milliampere hour per gram of storage material (mAh/g), charge and discharge rate in units of both milliamperes per gram of the storage compound (mA/g), and C rate. When given in units of C rate, the C rate is defined as the inverse of the time, in hours, necessary to utilize the full capacity of the battery measured at a slow rate. A rate of 1C refers to a time of one hour; a rate of 2C refers to a time of half an hour, a rate of C/2 refers to a time of two hours, and so forth. Typically, the C rate is computed from the rate, in mA/g, relative to the capacity of the compound or battery measured at a lower rate of C/5 or less. For example, in some examples herein the nominal capacity of a doped $LiFePO_4$ compound at low rate is about 150 mAh/g, and therefore a rate of 1C corresponds to a current rate of 150 mA/g, a rate of C/5 corresponds to 30 mA/g, a rate of 5C corresponds to 750 mA/g, and so forth.

In one aspect, the present invention is directed to increasing the electronic conductivity of transition metal polyanion compounds so that they can be used as alkali ion storage materials, for example, rechargeable lithium ion batteries. The compounds of the invention have electronic conductivities near room temperature, for example at a temperature of 22° C.-27° C., of at least about $10^{-8}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, in preferred cases, at least about $10^{-3}$ S/cm, and in more preferred cases, at least about $10^{-2}$ S/cm. Where elements and groups in the Periodic Table are referred to, the Periodic Table catalog number S-18806, published by the Sargent-Welch company in 1994, is used as a reference.

In one aspect, the present invention is directed to increasing the electronic conductivity of transition metal polyanion compounds so that they can be used as alkali ion storage materials, for example, rechargeable lithium ion batteries, without adding excessive amounts of an additional conductive compound such as carbon. Accordingly, the present invention can include conductivity-enhancing additives, such as but not limited to conductive carbon black, at, for example, less than about 15 weight percent, or in some cases, less than about 10 weight percent, in other cases, less than about 7 weight percent, in other cases, less than 3 weight percent, in other cases, less than 1 weight percent and, in some cases, no conductivity-enhancing additive.

In another aspect, the present invention is directed to decreasing the particle or crystallite size, or increasing the specific surface area (typically given in square meters per gram of the material, $M^2/g$, and measured by such methods as the Brunauer-Emmett-Teller (BET) gas adsorption method) of transition metal polyanion compounds in order to provide improved electrochemical energy storage, including improved charge storage capacity, improved energy density and power density when used in an electrochemical cell, and improved cycle life when the electrochemical cell is reversibly charged and discharged. Compositions are provided for compounds of high specific surface area, including those that are substantially fully crystallized, or those that have substantial electronic conductivity. The materials of the invention have specific surface areas of at least 15 $m^2/g$. However, in other cases they have specific surface areas of at least 20 $m^2/g$, in other cases at least 30 $m^2/g$, and in other cases at least 40 $m^2/g$.

In another aspect, the present invention provides methods for preparing the transition metal polyanion compounds of the invention, including compounds with substantial electronic conductivity and/or high specific surface area and small particle or crystallite size.

In another aspect, the invention comprises storage electrodes, including those using the transition metal polyanion compounds of the invention. Such storage electrodes have useful properties for electrochemical energy storage including having high storage energy density, high power density, and long cycle life when used reversibly in an electrochemical device. Formulations of and methods for preparing said electrodes are provided.

In another aspect, the invention comprises storage battery cells, including those using the transition metal polyanion compounds of the invention. Such cells have useful energy storage characteristics including high energy density and high power density, and long cycle life.

Electronic Conductivity

In one embodiment, the present invention provides an electrochemical device comprising an electrode comprising a compound with a formula $Li_xFe_{1-a}M''_aPO_4$, and a conductivity at 27° C., of at least about $10^{-8}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, in preferred cases, at least about $10^{-3}$ S/cm, and in more preferred cases, at least about $10^{2}$S/cm.

In another embodiment, the present invention provides an electrochemical device comprising an electrode comprising a compound with a formula $Li_xFe_{1-a}M''_aPO_4$, the compound having a gravimetric capacity of at least about 80 mAh/g while the device is charging/discharging at greater than about C rate. However, in some embodiments, the capacity is at least about 100 mAh/g, or in other embodiments, at least about 120 mAh/g, in preferred embodiments, at least about 150 mAh/g, and in still other embodiments, at least about 160 mAh/g. The present invention can, in some embodiments, also provide a capacity up to the theoretical gravimetric capacity of the compound.

In another embodiment, the present invention provides an electrochemical device comprising an electrode comprising a compound with a formula $Li_{x-a}M''_aFePO_4$.

In another embodiment, the present invention provides an electrochemical device comprising an electrode comprising a compound with a formula $Li_{x-a}M''_aFePO_4$, and a conductivity at 27° C. of at least about $10^{-8}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, and in preferred cases, at least about $10^{-3}$ S/cm, and in more preferred cases, at least about $10^{-2}$ S/cm.

In another embodiment, the present invention provides an electrochemical device comprising an electrode comprising a compound with a formula $Li_{x-a}M''_aFePO_4$, the compound having a gravimetric capacity of at least about 80 mAh/g while the device is charging/discharging at greater than about C rate. However, in some embodiments, the capacity is at least about 100 mAh/g, or in other embodiments, at least about 120 mAh/g, in preferred embodiments, at least about 150 mAh/g and in still other preferred embodiments, at least about 170 mAh/g. The present invention can, in some embodiments, also provide a capacity up to the theoretical gravimetric capacity of the compound.

According to one embodiment, a composition comprising a compound with a formula $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, has a conductivity at about 27° C. of at least about $10^{-8}$ S/cm, wherein A is at least one of an alkali metal and hydrogen, M' is a first-row transition metal, X is at least one of phosphorus, sulfur, arsenic, molybdenum and tungsten, M" is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, and x, y, and z have values such that x plus the quantity y(1-a) times a formal valence or valences of M', plus the quantity ya times a formal valence or valence of M", is equal to z times a formal valence of the $XD_4$, $X_2D_7$, or $DXD_4$ group. x, y, and z are typically greater than 0. The conductivity of the compound can be at least about $10^{-5}$ S/cm, at least about $10^{-4}$ S/cm, and, in some cases, at least about $10^{-2}$ S/cm. In some embodiments, A is lithium and x/(x+y+z) can range from about zero to about one third, or about zero to about two thirds. In one embodiment, X is phosphorus, while in other embodiments, M' is iron. M" can be any of aluminum, titanium, zirconium, niobium, tantalum, tungsten, or magnesium. M" can be substantially in solid solution in the crystal structure of the compound. Typically, the compound has at least one of an olivine, NASICON, $VOPO_4$, $LiFe(P_2O_7)$ or $Fe_4(P_2O_7)_3$ structure, or mixtures thereof.

In some embodiments, the compound is $LiFePO_4$.

In some embodiments, M" is at least partially in solid solution in the crystal structure of the compound at a concentration of at least 0.01 mole % relative to the concentration of M', the balance appearing as an additional phase, at least 0.02 mole % relative to the concentration of M', the balance appearing as an additional phase, and in yet other embodiments, at least 0.05 mole % relative to the concentration of M', the balance appearing as an additional phase and, in still other embodiments, at a concentration of at least 0.1 mole % relative to the concentration of M', the balance appearing as an additional phase.

In some embodiments, the compound can be formed as particles or crystallites wherein at least 50% of which have a smallest dimension that is less than about 500 nm. However, in some cases, the smallest dimension is less than 200 nm, in yet other cases, the smallest dimension is less than 100 nm, in still other cases, the smallest dimension is less than 50 nm, in still other cases, the smallest dimension is less than 20 nm, and in still other cases, the smallest dimension is less than 10 nm. In some embodiments, the compound forms an interconnected porous network comprising crystallites with a specific surface area of at least about 10 m²/g. However, in some cases, the specific surface area is at least about 20 m²/g, in other cases, the specific surface area is at least about 30 m²/g, in other cases, the specific surface area is at least about 40 m²/g, in other cases, the specific surface area is at least about 50 m²/g. Smallest dimension, in this context, means a cross-section. In some cases, the present invention provides a compound with a formula $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)_z$, that has a conductivity at 27° C. of at least about $10^{-8}$ S/cm, wherein A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0002 < a > 0.1$, and x, y, and z have values such that $(1-a)_x$ plus the quantity ax times the formal valence or valences of M" plus y times the formal valence or valences of M' is equal to z times the formal valence of the $XD_4$, $X_2D_7$ or $DXD_4$ group. x, y, and z are typically greater than zero. The conductivity of the compound can be at least about $10^{-5}$ S/cm, at least about $10^{-4}$ S/cm, and, in some cases, at least about $10^{-2}$ S/cm. In some embodiments, A is lithium and x/(x+y+z) can range from about zero to about one third. In one embodiment, X is phosphorus, while in other embodiments, M' is iron. M" can be any of aluminum, titanium, zirconium, niobium, tantalum, tungsten, or magnesium. M" can be substantially in solid solution in the crystal structure of the compound. Typically, the compound has at least one of an olivine, NASICON, $VOPO_4$, $LiFe(P_2O_7)$ or $Fe_4(P_2O_7)_3$ structure, or mixtures thereof. In some embodiments, the compound is $LiFePO_4$. In some embodiments, M" is at least partially in solid solution in the crystal structure of the compound at a concentration of at least 0.01 mole % relative to the concentration of M', the balance appearing as an additional phase, at least 0.02 mole % relative to the concentration of M', the balance appearing as an additional phase, and in yet other embodiments, at least 0.05 mole % relative to the concentration of M', the balance appearing as an additional phase and, in still other embodiments, at a concentration of at least 0.1 mole % relative to the concentration of M', the balance appearing as an additional phase.

In some embodiments, the electronically conductive lithium transition metal phosphate olivine compound has a suitable electronic conductivity greater than about $10^{-8}$ S/cm. The electronically conductive lithium transition metal phosphate compound can be a composition $Li_x(M_{1-a}M''_a)PO_4$ or $Li_{x-a}M''_aM'PO_4$, and can crystallize in the ordered-olivine or triphylite structure, or a structure related to the ordered olivine or triphylite structure with small displacements of atoms without substantial changes in the coordination number of anions around cations, or cations around anions. In such compounds $Li^+$ substantially occupies the octahedral site typically designated as M1, and a substantially divalent cation M' substantially occupies the octahedrally-coordinated site typically designated as M2, as described in the olivine structure given in "Crystal Chemistry of Silicate Minerals of Geophysical Interest," by J. J. Papike and M. Cameron, *Reviews of Geophysics and Space Physics*, Vol. 14, No. 1, pages 37-80, 1976. In some embodiments, the exchange of Li and the metal M' between their respective sites in a perfectly ordered olivine structure is allowed so that M' may occupy either site. M' is typically one or more of the first-row transition metals, V, Cr, Mn, Fe, Co, or Ni. M" is typically a metal with formal valence greater than 1+ as an ion in the crystal structure.

In some embodiments, M', M", x, and a are selected such that the compound is a crystalline compound that has in solid solution charge compensating vacancy defects to preserve overall charge neutrality in the compound. In the compositions of type $Li_x(M_{1-a}M''_a)PO_4$ or $Li_{x-a}M''_aM'PO_4$, this condition can be achieved when a times the formal valence of M" plus (1-a) times the formal valence of M' plus x is greater than 3+, necessitating an additional cation deficiency to maintain charge neutrality, such that the crystal composition is $Li_x(M'_{1-a-y}M''_a vac_y)PO_4$ or $Li_{x-a}M''_aM'_y vac_y PO_4$, where vac is a vacancy. In the language of defect chemistry, the dopant can be supervalent and can be added under conditions of temperature and oxygen activity that promote ionic compensation of the donor, resulting in nonstoichiometry. The vacancies can occupy either M1 or M2 sites. When x<1, the compound also has additional cation vacancies on the M1 site in a crystalline solid solution, said vacancies being compensated by increasing the oxidation state of M" or M'. In order to increase the electronic conductivity usefully, a suitable concentration of said cation vacancies should be greater than or equal to $10^{18}$ per cubic centimeter.

In some cases, the compound has an olivine structure and contains in crystalline solid solution, amongst the metals M' and M", simultaneously the metal ions $Fe^{2+}$ and $Fe^{3+}$, $Mn^{2+}$ and $Mn^{3+}$, $Co^{2+}$ and $Co^{3+}$, $Ni^{2+}$ and $Ni^{3+}$, $V^{2+}$ and $V^{3+}$, or $Cr^{2+}$ and $Cr^{3+}$, with the ion of lesser concentration being at least 10 parts per million of the sum of the two ion concentrations.

In some embodiments, the compound has an ordered olivine structure and A, M', M", x, and a are selected such that there can be Li substituted onto M2 sites as an acceptor defect. In the compositions of type $Li_x(M'_{1-a}M''_a)PO_4$ or $Li_{x-a}M''_aM'PO_4$, typical corresponding crystal compositions are $Li_x(M'_{1-a-y}M''_aLi_y)PO_4$ or $Li_{x-a}M''_aM'_{1-y}Li_yPO_4$. In this instance, the subvalent Li substituted onto M2 sites for M' or M" can act as an acceptor defect. In order to increase the electronic conductivity usefully, a suitable concentration of said Li on M2 sites should be greater than or equal to $10^{18}$ per cubic centimeter.

In some embodiments, the present invention provides a p-type semiconducting composition, $Li_x(M'_{1-a}M''_a)PO_4$, $Li_xM''_aM'PO_4$, $Li_x(M'_{1-a-y}M''_a vac_y)PO_4$, $Li_{x-a}M''_aM'_{1-y}vac_yPO_4$, $Li_x(M'_{1-a-y}M''_aLi_y)PO_4$ or $Li_{x-a}M''_aM'_{1-y}Li_yPO_4$. M" is a group IIA, IIIA, IVA, VA, VIA, VIIA, VIIIA, IB, IIB, IIIB, IVB, VB, and VIB element of the Periodic Table (catalog number S-18806, published by the Sargent-Welch company in 1994.) Magnesium is an example of a dopant from Group IIA, Y is an example of a dopant from Group IIIA, Ti and Zr are examples of dopants from Group IVA, Nb and Ta are examples of dopants from Group VA, W is an example of a dopant from Group VIA, Fe is an example of a metal from Group VIIIA, and Al is an example of a dopant from Group IIIB.

x can have a value between zero and 1.1 in the initially prepared material, and during its use as an lithium ion storage compound, x can vary between about zero and about 1.1. a can have a value between about 0.0001 and 0.1. In some embodiments, out of the total amount a of M", at least 0.0001 is in solid solution in the crystalline structure of the compound.

In some embodiments, M' is Fe and the solubility of M" in the lattice can be improved if M" has an ionic radius, in octahedral coordination, that is less than that of $Fe^{2+}$. Achieving solid solubility sufficient to increase the electronic conductivity above $10^{-8}$ S/cm can require that processing conditions (for example, temperature, atmosphere, starting materials) allow M" to be stabilized in a particular valence state that would provide an ionic radius less than that of $Fe^{2+}$. In some cases, for example, when solid solubility is achieved, the M" ion may occupy the M1 site, or it may preferentially occupy the M2 site and cause $Fe^{2+}$ or $Fe^{3+}$, which would normally occupy the M2 site, to occupy the M1 site.

Generalizing the M" solubility requirement to other olivines of composition $Li_{x-a}M''_aM'PO_4$, M" typically has an ionic radius that is less than the average ionic radius of ions M' at the Li concentration x at which the compound is first synthesized.

Electrochemical insertion and removal can later change the valence distribution amongst the M' and M" ions.

In some cases, M" can be in the desired valence state and concentration by adding, to the starting material, a salt of M" having the desired final valence. However, the desired valence distribution amongst metals M' and M" can be obtained by synthesizing or heat treating under appropriate conditions of temperature and gas atmosphere. For example, if M' is Fe, heat treatment should be conducted under temperature and atmosphere conditions that preserve a predominantly 2+valence state, although some $Fe^{3+}$ is allowable and can even be beneficial for increasing conductivity.

In other cases, for example, for $Li_x(M'_{1-a}M''_a)PO_4$ compositions, firing or heat treating at 600° C., can render the compositions conductive, even if M", or M', is a divalent cation, such as $Mg^{2+}$ or $Mn^{2+}$. In some cases, a $Li_3PO_4$ secondary phase can be present. Thus, the olivine composition according to some embodiments of the present invention may have a lithium deficiency that can result in a $Li_{x-a}M''_aM'PO_4$ crystal composition.

The possible dopants M" are not limited to those Groups of the Periodic Table that were previously identified, rather, M" can be any metal that satisfies the above requirements of size and valence. Specifically, for compositions $Li_{x-a}M'_aM''PO_4$, where M' is Fe, M'' may be $Mg^{2+}$, $Mn^{2+}$, $Fe^{3+}$, $Al^{3+}$, $Ce^{3+}$, $Ti^{4+}$, $Zr^{4+}$, $Hf^{4+}$, $Nb^{5+}$, $Ta^{5+}$, $W^{4+}$, $W^{6+}$, or combinations thereof.

In another embodiment, the compounds of this invention can be used as mixed protonic-electronic conductors for such applications as fuel cell electrodes and gas-separation membranes. Phospho-olivines, such as $LiFePO_4$, can be doped to be highly electronically conducting, while at the same time they can be sufficiently lithium-ion conducting to provide good performance as a lithium battery electrode. Electrochemical results show good cycling and also demonstrate that the compound can be delithiated while retaining good electronic conductivity. In some cases, the olivine structure can be retained in the fully delithiated state. That is, $FePO_4$ has an olivine structure-type polymorph. Therefore, a doped $FePO_4$ may be protonatable to be a good mixed protonic-electronic conductor, since phosphates are good protonic conductors.

The conductive $LiMPO_4$ compounds of this invention may also be protonatable to form $H_xFePO_4$ conductors, where $0<x<1.1$. Such compounds can be used as the electrode in a proton-conducting fuel cell. Typically such an electrode can be used with a proton-conducting and electronically insulating electrolyte. Such compounds can also be used as a solid membrane for separating hydrogen gas from gas mixtures. For example, hydrogen can be dissociated to protons and electrons at one surface of the membrane that is under a higher hydrogen partial pressure, the protons would typically diffuse through the membrane to a second surface at lower hydrogen partial pressure, and are recombined with electrons to form hydrogen gas that would be released to the atmosphere from the second surface.

In some embodiments, compounds of the invention have a structure comprising a continuous network of transition-metal filled anion polyhedral units. The polyhedral units may be octahedrals or distorted octahedrals. The polyhedral units in the structure can, for example, share at least one of vertices, corners, edges, or faces with other polyhedral units. In some cases, the polyhedral units share corners and edges with other polyhedral units.

In some embodiments, the compound is an n-type conductor. In others, the compound is a mixture of an n-type conductor and a p-type conductor. In still others, the compound is a p-type conductor.

In some embodiments, the compound is substantially fully delithiated. The compound may be a p-type conductor when substantially fully lithiated and an n-type conductor when substantially fully delithiated. In some cases, the compound, upon delithiation, undergoes phase-separation into a substantially lithiated compound and a substantially delithiated compound, each of which have an electronic conductivity of at least $10^{-6}$ S/cm.

The compounds of the present invention can be prepared through a variety of techniques, including, for example, solid-state reactions, co-precipitation from liquid solutions, so-called sol-gel methods, or deposition from the vapor phase by methods such as sputtering, laser ablation, electron-beam evaporation, thermal evaporation, and chemical vapor deposition. For large volume production, for example, such compositions can be prepared by solid state reaction methods. For such reactions, numerous possible starting materials are possible, the use of which allows a general classification of the methods.

Salts of each of the metals are typically selected so that they can react and decompose upon heating. Examples include salts such as $NH_4H_2PO_4$, $Li_2CO_3$, and $FeC_2O_4 \cdot 2H_2O$ for the main constituents (when, for example, M'' is Fe), and an alkoxide or metallorganic compound such as $Zr(OC_2H_4)_4$, $Ti(OCH_3)_4(CH_3OH)_2$, $Nb(OC_6H_5)_5$, $Ta(OCH_3)_5$, $W(OC_2H_5)_6$, $Al(OC_2H_5)_3$, or $Mg(OC_2H_5)_2$ as the source of the metal M''. When using one or more of these materials as the starting materials, gaseous species such as carbon oxides, hydrogen, water, and ammonia can be generated and removed, if necessary, during preparation.

The oxide $Li_2O$, a divalent oxide of the metal M'' (such as FeO, MnO, or CoO), and $P_2O_5$ can be used as the source of the main constituents. The metal M'' is typically added as its oxide in the preferred valence state, for example, as MgO, $TiO_2$, $ZrO_2$, $Fe_2O_3$, $Nb_2O_5$, $Ta_2O_5$, $Al_2O_3$, $WO_3$, or $WO_6$. When using such exemplary starting materials, the compound can be crystallized with substantially little or no evolution, or introduction, of gaseous species. That is, the reaction of the starting can be conducted in a closed-reaction system, typically without substantial mass transport in, or out.

The present invention allows any mixture of starting materials, some of which will yield a decomposition product, and some of which will not. For example, a portion of the starting materials can react to evolve or absorb gaseous species during formation thereof. If $Li_2CO_3$ or $LiOH \cdot nH_2O$ is used as the lithium source, carbon oxide, or water, or both can be generated during formation. Other constituents of the compound are typically provided as oxide thereof, typically in the preferred formal valence, (for example, as FeO, $P_2O_5$, and $Nb_2O_5$), which typically do not evolve or absorb gaseous species during the reaction. In other instances, starting materials may be used that substantially comprise a closed system in which there is little or no mass transport in or out of the reactants during formation of the materials of the invention. One preferred such reaction uses $LiPO_3$ and FeO to form $LiFePO_4$ as the product. Adjustments to the relative amounts of the reactants, and the addition of other constituents such as the dopants in the form of oxides in which the cations have their preferred formal valence state, are readily used in order to obtain compositions comprising the materials of the invention.

The dopants M'' can also be added by milling the starting materials in milling media comprising the desired doping materials. For example, zirconia or alumina milling balls or cylinders can be used to introduce Zr or Al as the dopant. Milling equipment, such as a milling container, made of such materials can also be used as the source of dopant. The amount of dopant can be controlled by monitoring the extent, intensity or duration or both, of milling and controlling such until a predetermined dopant level is achieved.

Further, milling media or containers can be used to add carbon, for example, to the materials of the invention in small quantities that can have a beneficial effect on the conductivity of the material without substantially decreasing the energy density of the material. The amount of carbon added in this instance is preferably less than about 10 weight percent of the total mass of the material, more preferably less than about 5 weight percent, and still more preferably less than about 3 weight percent. Milling containers or milling media that have such effect include those made from polypropylene, polyethylene, polystyrene, and fluoropolymers such as Teflon® (E.I du Pont de Nemours and Company, Wilmington, Del.).

For $Li_x(M'_{1-a}M''_a)PO_4$ compositions, a is preferably less than about 0.05 and the compound is preferably heat treated under various conditions.

A substantially reducing or inert gas atmosphere can be used, for example, nitrogen, argon, nitrogen-hydrogen mixtures, carbon dioxide-carbon monoxide mixtures, or mixtures of nitrogen with oxygen or argon with oxygen. The oxygen partial pressure in the gas mixture under the firing conditions applied to the composition is typically less than about $10^{-3}$ atm, preferably less than about $10^{-4}$ atm, more preferably less than about $10^{-5}$ atm, and still preferably less than about $10^{-6}$ atm. When using salts that can decompose to yield gaseous products upon heating, the compounds can be exposed to a first heat treatment to decompose, in some cases, the salts leaving substantially only the oxides of each metal, at a lower temperature than the final crystallization heat treatment. For example, heat treatment at 350° C. for ten hours in flowing nitrogen or argon is typically sufficient to transform the starting materials if the batch size is a few grams. A final heat treatment at a higher temperature typically follows. In some cases, the material is not heated to temperatures greater than about 800° C. for longer than about four hours. Preferably, the material is heated at less than about 750° C. but greater than about 500° C., and is held at that temperature between four and twenty-four hours.

For $Li_{x-a}M''_aM'PO_4$ compositions, a is preferably less than 0.1 and the material can be heated to higher temperatures and for longer times than described above, without losing electronic conductivity. That is, these compositions can be subjected to much wider ranges of heat treatment temperature and time while still yielding high electronic conductivity. Various heat treatments can also be used. For example, a substantially reducing or inert gas atmosphere is used, for example, nitrogen, argon, nitrogen-hydrogen mixtures, carbon dioxide-carbon monoxide mixtures, or mixtures of nitrogen with oxygen or argon with oxygen. The oxygen partial pressure in the gas mixture under the firing conditions applied to the composition is typically less than about $10^{-4}$ atmosphere, preferably less than about $10^{-5}$ atm, and still preferably less than about $10^{-6}$ atm. When using salts that decompose to yield gaseous products upon heating, the compounds may be exposed to a first heat treatment to decompose, in some cases, the salts leaving substantially only the oxides of each metal, at a lower temperature than the final crystallization heat treatment. For example, a heat treatment at 350° C. for ten hours in flowing nitrogen or argon can be sufficient to transform the starting materials if the batch size is a few grams. A final heat treatment at a higher temperature typically follows. In some cases, the material is heated to a temperature preferably greater than 500° C. and less than about 900° C., still preferably greater than about 550° C. and less than about 800° C., and is held at that temperature between four and twenty-four hours.

While a detailed understanding of the conduction mechanism in the materials of the present invention is not necessary to define or to practice the invention, it is useful to elaborate a possible mechanism that is consistent with the experimental observations.

Measurements show that the highly conductive compositions are typically p-type, not necessarily n-type, while the undoped compositions can be n-type. This shows that acceptor defects can be introduced by doping and heat treating as described herein. Having a supervalent cation on the M1 site can introduce a donor on that site. However, since the resulting materials are p-type, it is believed that electronic compensation of a donor cation is not necessarily the mechanism by which conductivity increases. Having vacancies on the M2 iron sites, for ionic compensation of supervalent cations on the M1 sites, or in order to charge-compensate an excess of $Fe^{3+}$ introduced on the M2 sites, can introduce acceptor states on the M2 sites. This is analogous to having a subvalent dopant on the Fe site, and can create an acceptor defect on the M2 sites. Having lithium substituted for a cation of higher valence on the M2 sites can also create acceptor defects on those sites. Having lithium deficiency on the M1 site can also create acceptor defects on those sites.

Therefore, highly conductive p-type behavior can be obtained when there are acceptor defects or ions on the M1 or M2 sites that are not simultaneously charge-compensated by other solutes or defects. However, for increased p-type conductivity to be obtained in the compound, it is preferred that such acceptor defects form a crystalline solid solution of the compound. For instance, in the undoped and insulating compound $LiFePO_4$, if upon delithiation to an overall composition $Li_xFePO_4$ where x<1, the compound forms two compositions or phases, $LiFePO_4$ in which Fe is substantially all in the ferrous (2+) state, and $FePO_4$ in which Fe is substantially all in the ferric (3+) state, then each individual compound comprising the material is substantially insulating, resulting in a whole material that is also insulating.

Thus, in one embodiment, the present invention provides a compound comprising a composition with a formula $A_x(M'_{1-a}M''_a)_y(XD_4)_z$, $A_x(M'_{1-a}M''_a)_y(DXD_4)_z$ or $A_x(M'_{1-a}M''_a)_y(X_2D_7)_z$, having a conductivity at 27° C. of at least about $10^{-8}$ S/cm. In some embodiments, A is at least one of an alkali metal and hydrogen, M' is a first-row transition metal, X is at least one of phosphorus, sulfur, arsenic, molybdenum and tungsten, M" is any of a Group IIA, IIIA, IVA, VA, VIA, VIIA, VIIIA, IB, IIB, IIIB, IVB, VB, and VIB metal of the Periodic Table (catalog number S-18806, published by Sargent-Welch, 1994), D is at least one of oxygen, nitrogen, carbon, or a halogen, $0.0001<a\leq0.1$, and x, y, and z are greater than 0 and have values such that x, plus y(1-a) times a formal valence or valences of M', plus ya times a formal valence or valence of M", is equal to z times a formal valence of the $XD_4$, $X_2D_7$, or $DXD_4$ group. In another embodiment, the present invention provides a compound comprising a composition with a formula $(A_{1-a}M''_a)_xM'_y(XD4)_z$, $(A_{1-a}M''_a)_xM'_y(DXD_4)_z$, or $(A_{1-a}M''_a)M'_y(X_2D_7)_z$, having a conductivity at 27° C. of at least about $10^{-8}$ S/cm. In some embodiments, A is at least one of an alkali metal and hydrogen, M' is a first-row transition metal, X is at least one of phosphorus, sulfur, arsenic, molybdenum and tungsten, M" is any of a Group IIA, IIIA, IVA, VA, VIA, VIIA, VIIIA, IB, IIB, IIIB, IVB, VB, and VIB metal, $0.0001<a\leq0.1$, and x, y, and z are greater than 0 and have values such that x, plus y(1-a) times a formal valence or valences of M', plus ya times a formal valence or valence of M", is equal to z times a formal valence of the $XD_4$, $X_2D_7$, or $DXD_4$ group.

In yet another embodiment, the present invention provides a fuel cell comprising a mixed proton conducting and electronically conducting material having a formula $A_x(M'_{1-a}M''_a)_y(XD_4)_z$, $A_x(M'_{1-a}M''_a)_y(DXD_4)_z$, $A_x(M'_{1-a}M''_a)_y(X_2D_7)_z$, $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)_z$. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001<a\leq0.1$, and x, y, and z are greater than 0 and have values such that x, plus y(1-a) times the formal valence or valences of M', plus ya times the formal valence or valences of M", is equal to z times the formal valence of the $XD_4$, $X_2D_7$ or $DXD_4$ group.

In some embodiments of the invention, it may be preferable for the compound to be substantially free of silicon. That is, silicon is not present in amounts greater than trace amounts.

In a further embodiment, the present invention provides a composition having a conductivity at about 27° C. of at least about $10^{-8}$ S/cm comprising primary crystallites with a formula LiFePO$_4$. The primary crystallites having an olivine structure that can form at least a part of an interconnected porous network.

In still another embodiment, the present invention provides a method of providing electrical energy. The method comprises the step of providing a battery having an electrode comprising a compound having a conductivity at 27° C. of at least about $10^{-8}$ S/cm and a capacity of at least about 80 mAh/g. The method further comprises the step of charging the battery at a rate that is greater than about C rate of the compound.

In still another embodiment, the present invention provides a method of forming a compound. The methods include mixing an alkali metal or hydrogen salt, a first-row transition metal salt, a salt of at least one of phosphorus, sulfur, arsenic, silicon, aluminum, boron, vanadium, molybdenum and tungsten, and a salt of any of a Group IIA, IIIA, IVA, VA, VIA, VIIA, VIIIA, IB, IIB, IIIB, IVB, VB, and VIB metal. The method further includes milling the mixture and heat treating the mixture at a temperature between 300-900° C. This method may be used to form any suitable compound described herein.

In yet another embodiment, the present invention is directed to a method of doping a material to form a conductive material. The method comprises the steps of mixing powders of a lithium salt and an iron oxide and adding an oxide of a dopant, the dopant having the same valence state in the oxide as in the conductive material. The method also comprises the step of heat treating the mixed powders to form the doped conductive material.

And, in one embodiment, the present invention is directed to a method of doping a material to form a conductive compound. The method comprises the steps of selecting a starting material to be doped, in conjunction with selection of milling equipment comprising a dopant for doping the starting material at a predetermined level of dopant and milling the starting material in the milling equipment. The method further comprises the step of recovering from the milling step a material suitable for forming a conductive material comprising the starting material doped with the dopant at the predetermined level.

Amongst other applications, the compounds, electrodes, and battery cells of the invention are useful for high power, safe, rechargeable lithium batteries for applications such as hybrid and electric vehicles, back-up power, implantable medical devices, and applications that currently use supercapacitor technology. The combination of high electronic and ion transport at reduced temperatures in these compounds also makes proton conducting analogs useful as electrode materials for other electrochemical applications such as low-temperature protonic fuel cell electrodes or hydrogen gas separation membranes.

In some embodiments, electrodes are formed from any of the compounds described herein. In some embodiments, though not all, it may be preferable for the electrode materials to be lithium storage compounds other than one of ordered or partially ordered rocksalt crystal structure type, or spinel crystal structure type, or vanadium oxide or manganese oxide. Examples of ordered or partially ordered rocksalt crystal structure types include LiCoO2, LiNiO2, LiMnO2, and their solid solutions. Examples of spinel crystal structure type include LiMn2O4 and its solid solutions.

The electrode materials of the invention may have a variety of material energy densities at different charging or discharging rates. In one set of embodiments, the electrode has a material energy density that, while charging or discharging at a rate $\geq 800$ mA per g of storage compound, is greater than 250 Wh/kg, or charging or discharging at a rate $\geq 1.5$ A per g of storage compound, is greater than 180 Wh/kg, or charging or discharging at a rate $\geq 3$ A per g of storage compound, is greater than 40 Wh/kg, or charging or discharging at a rate $\geq 4.5$ A per g of storage compound, is greater than 10 Wh/kg.

In another set of embodiments, the electrode has a material energy density that, while charging or discharging at a rate $\geq 800$ mA per g of storage compound, is greater than 350 Wh/kg, or charging or discharging at a rate $\geq 1.5$ A per g of storage compound, is greater than 270 Wh/kg, or charging or discharging at a rate $\geq 3$ A per g of storage compound, is greater than 150 Wh/kg, or charging or discharging at a rate $\geq 4.5$ A per g of storage compound, is greater than 80 Wh/kg, or charging or discharging at a rate $\geq 6$ A per g of storage compound, is greater than 35 Wh/kg, or charging or discharging at a rate $\geq 7.5$ A per g of storage compound, is greater than 50 Wh/kg, or charging or discharging at a rate $\geq 15$ A per g of storage compound, is greater than 10 Wh/kg.

In another set of embodiments, the electrode has a material energy density that, while charging or discharging at a rate $\geq 800$ mA per g of storage compound, is greater than 390 Wh/kg, or charging or discharging at a rate $\geq 1.5$ A per g of storage compound, is greater than 350 Wh/kg, or charging or discharging at a rate $\geq 3$ A per g of storage compound, is greater than 300 Wh/kg, or charging or discharging at a rate $\geq 4.5$ A per g of storage compound, is greater than 250 Wh/kg, or charging or discharging at a rate $\geq 7.5$ A per g of storage compound, is greater than 150 Wh/kg, or charging or discharging at a rate $\geq 11$ A per g of storage compound, is greater than 50 Wh/kg, or charging or discharging at a rate $\geq 15$ A per g of storage compound, is greater than 30 Wh/kg.

Electrodes of the invention may have a variety of different configurations depending on the application in which the electrode is used. In some cases, the electrode may comprise a sheet or a mesh coated or impregnated with the storage compound. In other cases, the electrode comprises a metal foil coated one or both sides with the storage compound.

The electrode may include different loading amounts of the storage compound. For example, the electrode may include a loading of at least 4 mg, 8 mg, 10 mg, 14 mg, or 20 mg per square centimeter of projected area of the sheet or mesh.

The electrode may be a sheet or a mesh having a total thickness of at least 20 micrometers, 40 micrometers, 60 micrometers, 80 micrometers, 100 micrometers, 150 micrometers, or 200 micrometers.

It should be understood that the electrodes of the invention may have other configurations and structures than those described herein.

Figure 28:
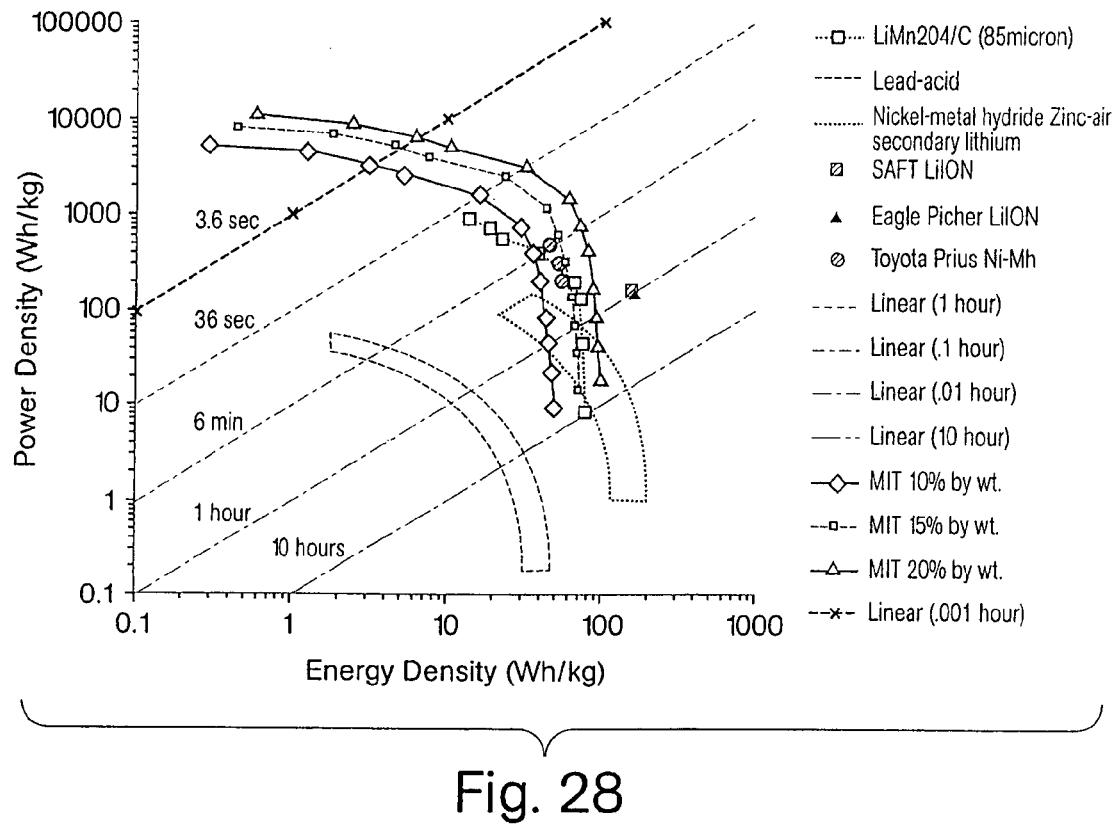
FIG. 28 shows a Ragone plot of log power density vs. log energy density for storage battery cells based on the lithium storage materials and electrodes of the invention, compared with other storage battery technology, showing the improved power density that is available while still having high energy density.
Figure 29:
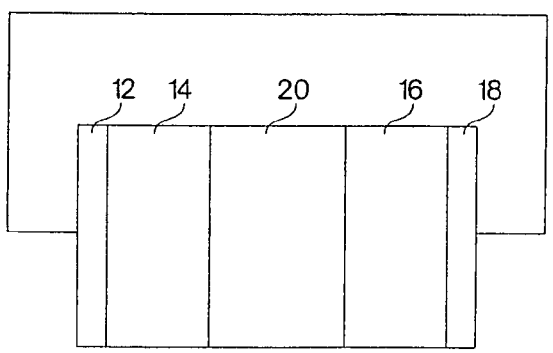
FIG. 29 shows a schematic storage battery cell according to one embodiment of the present invention.

FIG. 28 schematicaly illustrates a storage battery cell 10 according to one embodiment of the present invention. Storage battery cell 10 includes a positive current collector 12 in contact with a positive electrode 14. The storage battery cell further includes a negative current collector 18 in contact with a negative electrode 16. A separator 20 is positioned between the positive electrode and the negative electrode. Either the positive or the negative electrode (or both) may be comprised of any of the compositions described herein.

Storage battery cells of the present invention may exhibit different properties. For example, the cell may exhibit, upon discharge, an energy of at least 0.25 Wh; in other cases, at least 1 Wh; in other cases, at least 5 Wh; in other cases, at least 10 Wh; in other cases, at least 20 Wh; in other cases, at least 30 Wh; in other cases, at least 40 Wh; in other cases, at least 60 Wh; and, in other cases, at least 100 Wh.

The storage battery cells may also exhibit a variety of combinations of gravimetric energy and/or volumetric energy density upon discharge. For example, the storage battery cell may exhibit a discharge a gravimetric energy density of at least 30 Wh/kg or a volumetric energy density of at least 100 Wh/liter; a gravimetric energy density of at least 50 Wh/kg or a volumetric energy density of at least 200 Wh/liter; a gravimetric energy density of at least 90 Wh/kg or a volumetric energy density of at least 300 Wh/liter; a gravimetric power density of at least 500 W/kg or a volumetric power density of at least 500 W/liter; a gravimetric power density of at least 1000 W/kg or a volumetric power density of at least 1000 W/liter; a gravimetric power density of at least 2000 W/kg or a volumetric power density of at least 2000 Wh/liter.

Storage battery cells of the invention may also exhibit a variety of gravimetric energy density at different power densities. For example, the storage cells may exhibit, upon discharge, a gravimetric energy density of at least 30 Wh/kg at a power density of at least 500 W/kg, or 20 Wh/kg at a power density of at least 1000 W/kg, or 10 Wh/kg at a power density of at least 1500 W/kg, or 5 Wh/kg at a power density of at least 2000 W/kg, or 2 Wh/kg at a power density of at least 2500 W/kg, or 1 Wh/kg at a power density of at least 3000 W/kg.

In another embodiment, the storage cells may exhibit, upon discharge, a gravimetric energy density of 50 Wh/kg at a power density of at least 500 W/kg, or 40 Wh/kg at a power density of at least 1000 W/kg, or 20 Wh/kg at a power density of at least 2000 W/kg, or 10 Wh/kg at a power density of at least 3000 W/kg, or 4 Wh/kg at a power density of at least 4000 W/kg, or 1 Wh/kg at a power density of at least 5000 W/kg.

In another embodiment, the storage cells may exhibit, upon discharge, a gravimetric energy density of at least 80 Wh/kg at a power density of at least 1000 W/kg, or 70 Wh/kg at a power density of at least 2000 W/kg, or 60 Wh/kg at a power density of at least 3000 W/kg, or 55 Wh/kg at a power density of at least 4000 W/kg, or 50 Wh/kg at a power density of at least 5000 W/kg, or 30 Wh/kg at a power density of at least 6000 W/kg, or 10 Wh/kg at a power density of at least 8000 W/kg.

It should be understood that certain storage cells of the invention may have a variety of different structures than those described herein and exhibit different properties than those described herein.

The present invention will be further illustrated through the following examples, which are illustrative in nature and are not intended to limit the scope of the invention.

EXAMPLE 1

Metal-Doped Compositions

This example demonstrates the preparation of compositions having the formulation $Li(Fe_{1-a}M''_a)PO_4$, where M'' is Al, Ti, Zr, Mn, Nb, Ta, W, Mg, or Li. Specific compositions, heat treatments, and results are listed in Tables 2 and 3, respectively. It was found that the electronic conductivity increased only for certain low concentrations of the metal additive or dopant. The specific range of concentration providing a high electronic conductivity (greater than about $10^{-5}$ S/cm) varied for each dopant but was generally less than about 5 mole % of the Fe concentration. In addition to having a low concentration of the dopant, it was necessary to heat treat the material under conditions such that high electronic conductivity was obtained. These conditions included heat treatment in a non-oxidizing gas atmosphere, including but not limited to argon, nitrogen, and nitrogen-hydrogen mixtures. Moreover, the temperature of heat treatment was less than about 800° C. At 600° C., the firing time in the above described gas atmosphere was less than about 100 hours.

Sample Preparation

Compositions as listed in Table 2 or otherwise described herein were prepared as follows or as adjusted to suit the particular composition by procedures illustrated for the following compositions. The starting materials of this Example are listed in Table 1.

TABLE 1

Starting materials for a synthesis method for doped $LiFePO_4$

| Compound | Manufacturer/Purity (wt %) | Element | Theoretical content (wt %) | *Analyzed content (wt %) |
|---|---|---|---|---|
| $Li_2CO_3$ | Alfa-Aesar, 99.999 | Li | 18.8 | 18.9 |
| $FeC_2O_4 \cdot 2H_2O$ | Aldrich, 99.99 | Fe | 31.0 | 30.7 |
| $NH_4H_2PO_4$ | Alfa-Aesar, 99.998 | P | 26.9 | 27.2 |

*The metals content was analyzed using Direct Current Plasma (DCP) emission spectroscopy following ASTM E1097.

The starting materials were weighed to high precision using a laboratory balance. For example, Zr-doped $LiFePO_4$ samples of the following doping levels and batch sizes were prepared using the following starting materials, wherein zirconium ethoxide served as the source of the dopant:

|  | 5 mole % Zr, 5 g batch | 1 mole % Zr 2.5 g batch | 2 mole % Zr 2.5 g batch |
|---|---|---|---|
| $NH_4H_2PO_4$ | 3.6465 g | 1.7254 g | 1.7254 g |
| $Li_2CO_3$ | 1.1171 g | 0.554 g | 0.554 g |
| $FeC_2O_4 \cdot 2H_2O$ | 5.4177 g | 2.6715 g | 2.6715 g |
| $Zr(OC_2H_5)_4$ | 0.4303 g | 0.0407 g | 0.0814 g |

Similarly, 1 mole % and 2 mole % Ti-doped $LiFePO_4$ were prepared using the starting materials as above, except that titanium methoxide, $Ti(OCH_3)_4(CH_3OH)_2$ was used as the source of Ti (in place of the $Zr(OC_2H_5)_4$):

|  | 1 mole % Ti 2.5 g batch | 2 mole % Ti 2.5 g batch |
|---|---|---|
| $NH_4H_2PO_4$ | 1.7254 g | 1.7254 g |
| $Li_2CO_3$ | 0.554 g | 0.554 g |
| $FeC_2O_4 \cdot 2H_2O$ | 2.6715 g | 2.6715 g |
| $Ti(OCH_3)_4(CH_3OH)_2$ | 0.0354 g | 0.0708 g |

Undoped $LiFePO_4$ samples were prepared from the same materials except without the dopant salt. For the other samples, with the dopants as listed in Table 2, an appropriate metal salt was used. In particular, to prepare the Nb-doped samples, niobium phenoxide, $Nb(OC_6H_5)_5$, was used as the dopant salt; to prepare the Ta-doped samples, tantalum methoxide, $Ta(OCH_3)_5$, was used as the dopant salt; to prepare the W-doped samples, tungsten ethoxide, $W(OC_2H_5)_6$, was used as the dopant salt; to prepare the Al-doped sample, aluminum ethoxide, $Al(OC_2H_5)_3$, was used as the dopant salt; and to prepare the Mg-doped samples, magnesium ethoxide, $Mg(OC_2H_5)_2$, was used as the dopant salt.

To prepare each sample, each of the components was weighed in an argon-filled glove box. They were then removed from the glove box and ball milled, using zirconia milling balls, in a polypropylene jar for about twenty hours in acetone. The milled mixture was dried at a temperature not exceeding 100° C., and then ground with a mortar and pestle in the argon-filled glove box. Each of the mixtures was then heat treated, given as "HT1" through "HT7" under the conditions listed in Table 3. In each case, a first heat treatment at 350° C. for ten hours was conducted in a flowing atmosphere of the specified gas. Each of the powder samples was then ground, using a mortar and pestle, and subjected to a second heat treatment at a higher temperature, in a flowing atmosphere of the specified gas.

Conductivity Measurements

It is well-known that the electrical conductivity of solid compounds is difficult to accurately measure from a finely divided powder form of the compound. On the other hand, powders that have been compacted and fired so as to achieve sintered contacts between the powder particles, or have been partially or completely densified, allow more accurate measurement of the conductivity of the compound. For sintered pellets of reasonably high density, and in which the particle contacts do not have a higher specific resistance, the conductivity of the pellet is reduced from that of the compound itself in approximately linear proportion to the amount of porosity that is present. For example, a pellet that has 10% porosity may be judged to have about 90% of the conductivity of the compound. In order to measure the conductivity when samples were prepared in a powder form, pellets were pressed out of the heat treated powder sample prior to the second heat treatment, and placed in alumina crucibles during the second heat treatment so that the powders and sintered pellets were heat treated together. The density of the fired pellets were from about 60% to about 95% of the crystal density, depending on composition and heat treatment.

In order to measure electrical conductivity, 2-point and 4-point (van der Pauw, vdP) conductivity measurements were performed according to known conventional procedures. Because metal contacts that are blocking to lithium ions and conductive to electrons were used, the resulting conductivities are understood to reflect the electronic conductivity of the compound. The room temperature conductivities of several of the doped samples are listed in Table 2.

X-ray Diffraction, Electron Microscopy, Specific Surface Area Measurement, and Chemical Analysis Several methods were used to determine the crystalline phase, extent of crystallization, powder particle size and morphology, specific surface area of the powder, and the location of dopants. Samples were evaluated by x-ray diffraction after heat treatment to determine the crystalline structure as well as to determine if there was a detectable secondary phase. In some cases, some of the powder samples were examined at higher resolution by transmission electron microscopy (TEM) and/or scanning transmission electron microscopy (STEM) to determine whether secondary phases were present, whether a surface coating of another phase were present, and to measure the concentration of the dopant metal within the crystalline grains of the $LiFePO_4$ phase. This allowed a determination of whether the metal dopant, at the added concentration and heat treatment, was soluble or had exceeded its solubility limit in the $LiFePO_4$ phase. It was also possible to determine whether the particles of crystallized compound had a surface coating of another material. In some cases, the composition of the powders or pellets were determined using direct current plasma (DCP) emission spectroscopy according to ASTM ASTM E1097, or combustion IR detection according to ASTM E1019.

In the samples listed in Table 2, the first numeral indicates the dopant, the second the concentration, and the third, the heat treatment. For example, sample 3c1 refers to a Ti-doped sample of 0.1 mole % concentration subjected to the heat treatment HT1. Where the concentration of dopant is given herein in mole percent, it refers to the relative molar fraction, Ti/(Ti+Fe) multiplied by 100.

TABLE 2

Results for Undoped and Doped Lithium Iron Phosphates

| Composition (Sample) | Heat Treatment | Room Temperature Conductivity (S/cm) 2-point | van der Pauw | XRD/TEM/STEM observations | Minor phases (by XRD) |
|---|---|---|---|---|---|
| 1. Undoped | | | | | |
| (1a1) $LiFePO_4$ | HT1 | $<10^{-6}$ | — | Single phase olivine | None detected |
| (1b2) $LiFePO_4$ | HT2 | $<10^{-6}$ | — | Single phase olivine | None detected |
| (1c3) $LiFePO_4$ | HT3 | $<10^{-6}$ | — | Single phase olivine | None detected |
| (1d6) $LiFePO_4$ | HT6 | $2.2 \times 10^{-9\dagger}$ | — | Single phase olivine | None detected |
| (1e6) $LiFePO_4$ | HT6 | $3.74 \times 10^{-10\ddagger}$ | — | Single phase olivine | None detected |
| (1f7) | HT7 | $2.22 \times 10^{-9\dagger}$ | — | — | — |

TABLE 2-continued

Results for Undoped and Doped Lithium Iron Phosphates

| Composition (Sample) | Heat Treatment | Room Temperature Conductivity (S/cm) 2-point | Room Temperature Conductivity (S/cm) van der Pauw | XRD/TEM/STEM observations | Minor phases (by XRD) |
|---|---|---|---|---|---|
| LiFePO$_4$ (1g8) | HT8 | $1.8 \times 10^{-10}$ | — | Multi-phase | Li$_3$PO$_4$, Fe$_3$P |
| LiFePO$_4$ 2. Aluminum | | | | | |
| (2a1) Li(Al$_{.002}$Fe$_{.998}$)PO$_4$ | HT1 | $8.2 \times 10^{-5}$ | — | Dopant soluble | None detected |
| (2b6) (Li$_{.99}$Al$_{.01}$)FePO$_4$ | HT6 | $\sim 10^{-3}$ | — | Dopant soluble | None detected |
| 3. Titanium | | | | | |
| (3c5) Li(Ti$_{.001}$Fe$_{.999}$)PO$_4$ | HT5 | $<10^{-5}$ | — | Dopant soluble | None detected |
| (3d1) Li(Ti$_{.002}$Fe$_{.998}$)PO$_4$ | HT1 | $1.7 \times 10^{-4}$ | — | Exceeds solubility | Not identified |
| (3e1) Li(Ti$_{.01}$Fe$_{.99}$)PO$_4$ | HT1 | $2.0 \times 10^{-4}$ | — | Exceeds solubility | Li$_3$PO$_4$ |
| (3e2) Li(Ti$_{.01}$Fe$_{.99}$)PO$_4$ | HT2 | $1.9 \times 10^{-4}$ | — | Exceeds solubility | Li$_3$PO$_4$ |
| (3e3) Li(Ti$_{.01}$Fe$_{.99}$)PO$_4$ | HT3 | $<10^{-6}$ | — | Exceeds solubility | Not identified |
| (3f2) Li(Ti$_{.02}$Fe$_{.98}$)PO$_4$ | HT2 | $1.4 \times 10^{-6}$ | — | Exceeds solubility | Not identified |
| (3g6) (Li$_{.99}$Ti$_{.01}$)FePO$_4$ | HT6 | $1.3 \times 10^{-3\ddagger}$ | — | Dopant soluble | None detected |
| (3g7) (Li$_{.99}$Ti$_{.01}$)FePO$_4$ | HT7 | $2.3 \times 10^{-2\ddagger}$ | — | Exceeds solubility | Li$_3$PO$_4$, Fe$_2$P |
| 4. Zirconium | | | | | |
| (4a1) Li(Zr$_{.002}$Fe$_{.998}$)PO$_4$ | HT1 | $5.0 \times 10^{-5}$ | — | Dopant soluble | None detected |
| (4b1) Li(Zr$_{.01}$Fe$_{.99}$)PO$_4$ | HT1 | $3.7 \times 10^{-4}$ | — | Exceeds solubility | Li$_3$PO$_4$ |
| (4b2) Li(Zr$_{.01}$Fe$_{.99}$)PO$_4$ | HT2 | $4.5 \times 10^{-5}$ | — | Exceeds solubility | Li$_3$PO$_4$ |
| (4b3) Li(Zr$_{.01}$Fe$_{.99}$)PO$_4$ | HT3 | $<10^{-6}$ | — | Exceeds solubility | Not identified |
| (4c2) Li(Zr$_{.02}$Fe$_{.98}$)PO$_4$ | HT2 | $1.8 \times 10^{-4}$ | — | Exceeds solubility | Li$_2$ZrO$_3$ |
| (4d2) Li(Zr$_{.05}$Fe$_{.95}$)PO$_4$ | HT2 | $\sim 10^{-5}$ | — | Exceeds solubility | Li$_2$ZrO$_3$ |
| (4e1) Li$_{.99}$Zr$_{.01}$)FePO$_4$ | HT1 | $\sim 10^{-4}$ | — | Dopant soluble | None detected |
| (4e2) Li$_{.99}$Zr$_{.01}$)FePO$_4$ | HT8 | $1.6 \times 10^{-2}$ | — | Exceeds solubility | Li$_3$PO$_4$, Fe$_2$P |
| 5. Niobium | | | | | |
| (5b1) Li(Nb$_{.001}$Fe$_{.999}$)PO$_4$ | HT1 | $1.3 \times 10^{-4}$ | — | Dopant soluble | None detected |
| (5c1) Li(Nb$_{.002}$Fe$_{.998}$)PO$_4$ | HT1 | $5.8 \times 10^{-4}$ | — | Dopant soluble | None detected |
| (5c4) Li(Nb$_{.002}$Fe$_{.998}$)PO$_4$ | HT4 | $<10^{-6}$ | — | — | — |
| (5e6) (Li$_{.998}$Nb$_{.002}$)FePO$_4$ | HT6 | $1.1 \times 10^{-3}$ | — | Dopant soluble | None detected |
| (5e7) (Li$_{.998}$Nb$_{.002}$)FePO$_4$ | HT7 | $1.1 \times 10^{-2\ddagger}$ | — | Dopant soluble | None detected |
| (5f6) (Li$_{.995}$Nb$_{.005}$)FePO$_4$ | HT6 | $4.1 \times 10^{-2}$ | — | Dopant soluble | None detected |
| (5g6) (Li$_{.99}$Nb$_{.01}$)FePO$_4$ | HT6 | $2.2 \times 10^{-2}$ | $2.73 \times 10^{-2}$ | Dopant soluble | None detected |
| (5g7) (Li$_{.99}$Nb$_{.01}$)FePO$_4$ | HT7 | $4.3 \times 10^{-2\ddagger}$ | — | Exceeds solubility | Li$_3$PO$_4$, Fe$_2$P |
| (5h6) (Li$_{.98}$Nb$_{.02}$)FePO$_4$ | HT6 | $2.8 \times 10^{-3}$ | — | Exceeds solubility | Fe$_2$P |
| (5i6) (Li$_{.96}$Nb$_{.04}$)FePO$_4$ | HT6 | $\sim 10^{-6}$ | — | Exceeds solubility | Fe$_2$P |

TABLE 2-continued

Results for Undoped and Doped Lithium Iron Phosphates

| Composition (Sample) | Heat Treatment | Room Temperature Conductivity (S/cm) 2-point | Room Temperature Conductivity (S/cm) van der Pauw | XRD/TEM/STEM observations | Minor phases (by XRD) |
|---|---|---|---|---|---|
| 6. Tantalum | | | | | |
| (6a1) Li(Ta$_{.002}$Fe$_{.998}$)PO$_4$ | HT1 | $3.0 \times 10^{-5}$ | — | Dopant soluble | None detected |
| 7. Tungsten | | | | | |
| (7a1) Li(W$_{.002}$Fe$_{.998}$)PO$_4$ | HT1 | $1.5 \times 10^{-4}$ | — | Dopant soluble | None detected |
| 8. Magnesium | | | | | |
| (8a1) Li(Mg$_{.002}$Fe$_{.998}$)PO$_4$ | HT1 | $\sim 10^{-4}$ | — | Dopant soluble | None detected |
| (8b6) (Li$_{.99}$Mg$_{.01}$)FePO$_4$ | HT6 | $6.8 \times 10^{-4}$‡ | — | Dopant soluble | None detected |
| (8b7) (Li$_{.99}$Mg$_{.01}$)FePO$_4$ | HT7 | $2.4 \times 10^{-2}$‡ | — | Exceeds solubility | Li$_3$PO$_4$, Fe$_2$P |
| (8b8) (Li$_{.99}$Mg$_{.01}$)FePO$_4$ | HT8 | $3.8 \times 10^{-3}$‡ | — | Exceeds solubility | Li$_3$PO$_4$, Fe$_2$P |
| 9. Manganese (2+) | | | | | |
| (9a1) Li(Mn$_{.002}$Fe$_{.998}$)PO$_4$ | HT1 | $\sim 10^{-4}$ | — | Dopant soluble | None detected |
| 10. Iron (2+) | | | | | |
| (10a6) (Li$_{.99}$Fe$_{.01}$)FePO$_4$ | HT6 | $<10^{-6}$ | — | Exceeds solubility | Li$_3$PO$_4$, Fe, Fe$_3$P |
| 11. Iron (3+) | | | | | |
| (11a6) (Li$_{.99}$Fe$_{.01}$)FePO$_4$ | HT6 | $3.3 \times 10^{-2}$ | $4.1 \times 10^{-2}$ | Exceeds solubility | Li$_3$PO$_4$, Fe, Fe$_3$P |
| 12. Lithium | | | | | |
| (12a6) Li(Fe$_{.99}$Li$_{.01}$)PO$_4$ | HT6 | $<10^{-6}$ | — | Exceeds solubility | Li$_3$PO$_4$, Fe, Fe$_3$P |

†measurement by AC Impedance Spectroscopy
‡measurement by two point method, using sputtered Au electrodes.

TABLE 3

Heat Treatment Conditions

| Heat Treatment | Conditions (all gases at 1 atm total pressure) | | |
|---|---|---|---|
| HT1 | 350° C., 10 hours, Ar | 600° C., 24 hours, Ar | — |
| HT2 | 350° C., 10 hours, N$_2$ | 600° C., 24 hours, N$_2$ | — |
| HT3 | 350° C., 10 hours, N$_2$ | 800° C., 24 hours, N$_2$ | — |
| HT4 | 350° C., 10 hours, N$_2$ | 800° C., 24 hours, N$_2$ | — |
| HT5 | 350° C., 10 hours, Ar | 600° C., 24 hours, Ar | 600° C., 76 hours, Ar |
| HT6 | 350° C., 10 hours, Ar | 700° C., 20 hours, Ar | — |
| HT7 | 350° C., 10 hours, Ar | 850° C., 20 hours, Ar | — |
| HT8 | 350° C., 10 hours, Ar | 800° C., 15 hours, Ar | — |

Results

X-ray diffraction showed that after the 350° C. heat treatment, the powders of this example were poorly crystallized and not of a single major crystalline phase. After the second, higher temperature heat treatment, all samples subjected to XRD showed peaks associated with the olivine structure. The relative intensity of X-ray peaks showed that the olivine phase was the major crystalline phase. Visual observation of the heat treated powders and pellets proved to be a reliable indication of whether or not increased electronic conductivity had been obtained. While the undoped LiFePO$_4$ was light to medium gray, the conductive doped powders and sintered pellets, regardless of specific dopant, concentration, or heat treatment, were colored black. Conductive sintered pellets were also easily distinguished from insulating pellets with a simple ohmmeter measurement using two steel probes placed 0.5-1 cm apart. Insulating compositions had resistances too great to measure (being greater than the instrument limit of 200 MΩ), while conductive samples had resistances of typically 30 kΩ to 300 kΩ.

The results in Table 2 show that heat treating undoped LiFePO$_4$ was not effective in producing an acceptable conductive material; each of the conductivities of sintered pellets was less than about $10^{-6}$ S/cm. The undoped compound was also found to have a very narrow range of cation nonstoichiometry, with as little as 1% deficiency of the ferrous iron oxalate resulting in a detectable amount of Li$_3$PO$_4$ phase.

In contrast, for the dopants listed, at low concentrations, it was possible to produce a sample having a room temperature conductivity greater than about $10^{-5}$ S/cm. These conductivity values exceed known values for the positive electrode compound LiMn$_2$O$_4$. Further, Al, Ti, Zr, Nb, W, Mg, Mn, and Fe(3+)-doped samples could be produced with a conductivity greater than $10^{-4}$ S/cm.

Electron microscopy showed that the highly electronically conductive samples did not have a surface coating or other form of an additional conductive phase. A typical image is shown in FIG. 1, which is a copy of a TEM image of a 0.01% Ti-doped sample.

The figures show that the doped compositions of LiFePO$_4$, synthesized in non-oxidizing or inert atmosphere at temperatures below about 800° C., had increased electronic conductivity compared to the undoped LiFePO$_4$ compositions, thus making them useful as lithium storage electrodes especially at practical charge/discharge rates. At the low doping levels used, the doping does not limit the ability of the material to store lithium at a high voltage (about 3.5V relative to lithium metal) or achieve a high lithium storage capacity.

Figure 2:
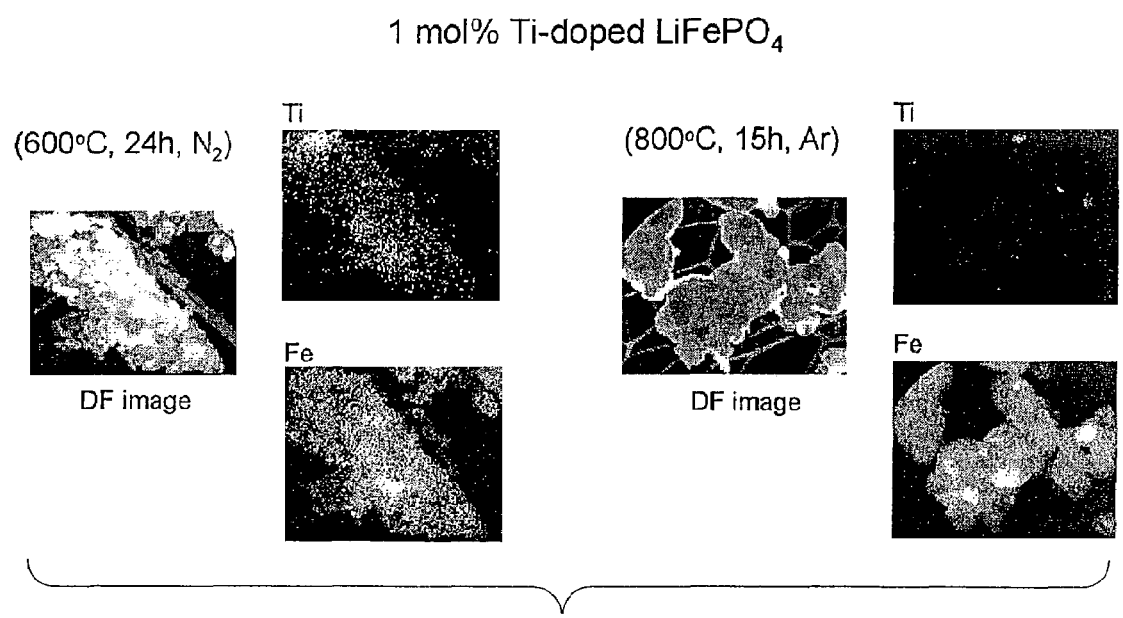
FIG. 2 are copies of scanning transmission electron microscope images and energy-dispersive x-ray composition maps of a 1% Ti-doped sample prepared according to the method substantially described in Example 1 and heat treated at 600° C. in nitrogen for twenty-four hours or 800° C. in argon for sixteen hours. In the sample heat treated at 600° C., there is detectable Ti in solid solution in the compound as well as an excess of Ti appearing as an additional phase whereas the sample heat treated at 800° C. shows no Ti detectable in the phase itself, thus showing that the solid solubility of Ti under these conditions is likely less than about 0.1%.
Figure 3:
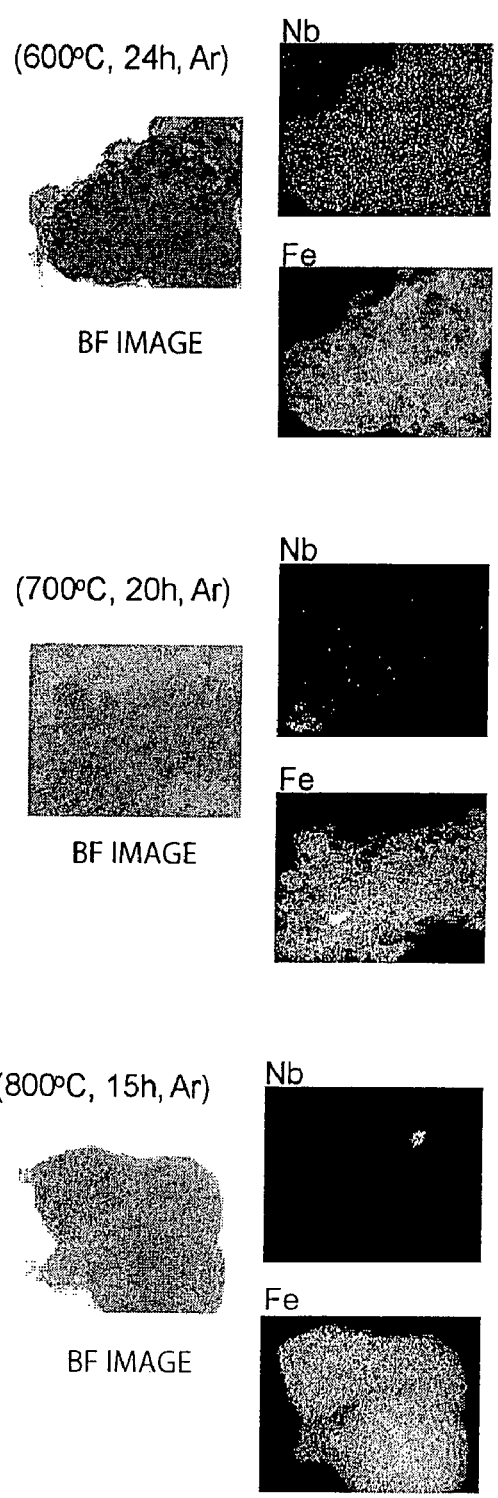
FIG. 3 are copies of scanning transmission electron microscope images and energy-dispersive x-ray composition maps of an 0.2% Nb-doped sample prepared according to the method substantially described in Example 1 and heat treated at 600° C. for twenty-four hours, 700° C. for twenty hours, and 800° C. for fifteen hours, all in argon, showing that in the sample heat treated at 600° C., substantial amounts of Nb can be detected within the LiFePO$_4$ grains and a Nb-rich additional phase is substantially absent; in the samples heat treated at 700° C. and 800° C., substantially less Nb is detectable in the grains and Nb-rich additional phase has appeared, and thus showing that the solubility of Nb is at least about 0.2% when the material is prepared according to Example 1 and heat treated at 600° C., whereas heat treating at a temperature of 700° C., or greater, causes exsolution of Nb.

The results also showed that too high a heat treatment temperature, and/or too long a heat treatment period, can result in insulating materials. As a specific comparison, the Ti-doped sample, sample 3e3, which was heat treated at 800° C. for twenty-four hours, was insulating (less than $10^{-6}$ S/cm) whereas a similar 1% Ti-doped composition, samples 3e1 and 3e2, which were heat treated at 600° C. for twenty-four hours, were highly conductive ($2\times10^4$ and $1.9\times 10^{-4}$ S/cm). The insulating sample 3e3 was examined using an STEM, which showed that, unlike the conductive samples, the amount of Ti in solid solution in the parent phase was not detectable (by energy-dispersive x-ray analysis). Titanium appeared to aggregate as a second phase, as shown in FIG. 2 (right side images). Thus, a high temperature heat treatment can cause the dopant to become insoluble. Similarly, the Zr-doped sample, 4b3, was also heat treated at 800° C. for twenty-four hours, and was insulating (less than $10^{-6}$ S/cm). A similar 1% Zr-doped composition, which was heat treated at 600° C. for twenty-four hours in argon or nitrogen, 4b1 and 4b2, was conductive. The Nb-doped sample, 5c4, was heat treated at 800° C. for twenty-four hours and was found to be insulating, whereas a similar 0.2% Nb-doped composition that was heat treated at 600° C. for twenty-four hours in argon or nitrogen, 5a1 and 5b1, was highly conductive. Copies of STEM images of the Nb-doped samples are shown in FIG. 3. Notably, Nb appears to have a higher solubility limit than either Ti or Zr.

Moreover, even at a lower heat treatment temperature (600° C.), too long a heat treatment time can convert a conductive composition to insulating composition. For example, sample 3c5 was initially heat treated at HT1. A pellet was then pressed and heat treated an additional 76 hours, in argon, and was found to be less conductive relative to sample 3c1, which had a similar composition but was not heat treated an additional 76 hours.

Figure 4:
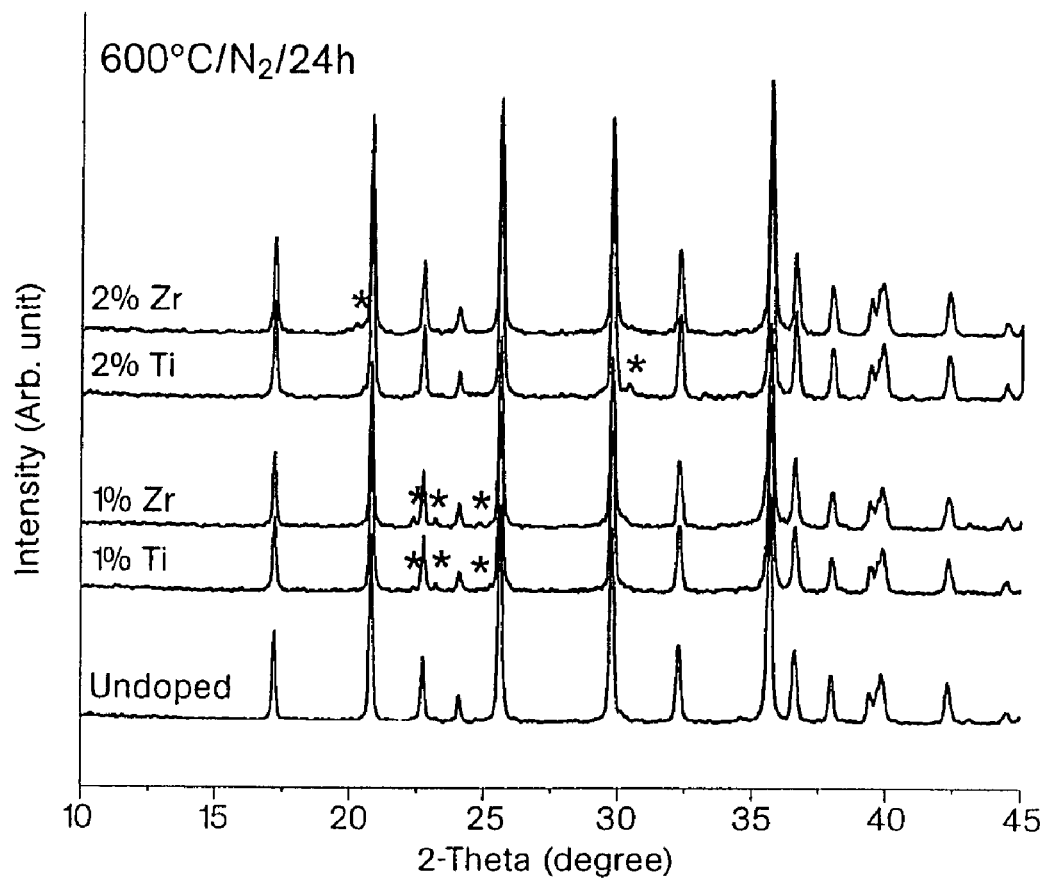
FIG. 4 is a graph showing x-ray diffraction patterns of materials prepared according to Example 1, undoped samples and samples containing 1% Ti, 1% Zr, 2% Ti, and 2% Zr, heat treated at 600° C. in nitrogen for twenty-four hours, showing that additional phases can be detectable in all of the doped samples and thus that, the solubility limit of the dopants is less than 1% under these preparation conditions; the composition heat treated in argon and nitrogen being substantially similar to that shown in FIG. 15; thus showing that multiple non-oxidizing gas atmospheres can be used to prepare the electronically conductive materials of the invention.

Further, the results also showed that there is a dopant limit and that too much dopant can result in an insulating composition. For example, a 2 mole % Ti-doped composition, 3f2, is less conductive than a 1 mole % Ti-doped composition, 3e2. Notably, a 2 mole % Zr-doped composition, 4c2, is still relatively conductive, if not more conductive, compared to a 1 mole % Zr-doped composition, 4b2. However, increasing the Zr concentration to 5 mole %, as in sample 4d2, reduced the conductivity. X-ray diffraction analysis showed that the 5 mole % Zr-doped sample had a small amount of secondary phase, which appeared to be Li$_2$ZrO$_3$. In contrast, the 2 mole % Zr-doped sample had peaks, corresponding to the latter phase, which were negligible, as shown in FIG. 4.

Figure 5:
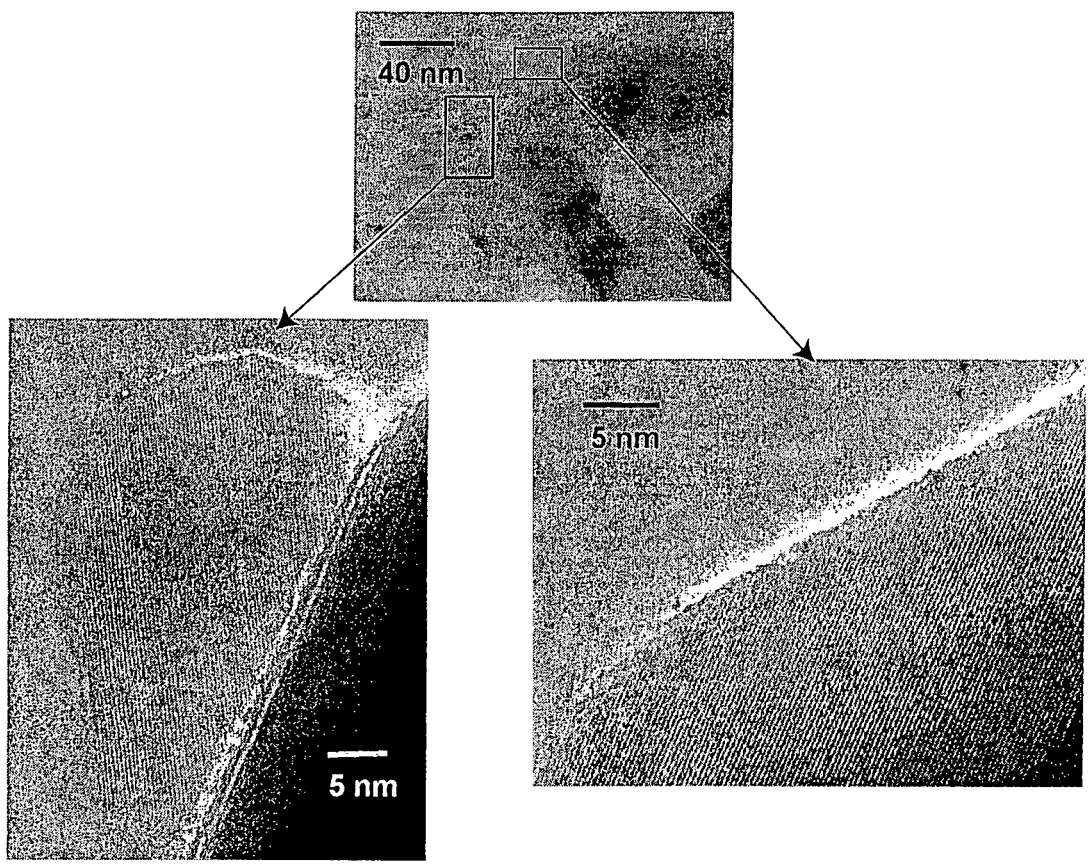
FIG. 5 is a copy of TEM images of a powder of nominal composition LiFe$_{0.99}$Zr$_{0.01}$PO$_4$ and prepared according to the Example 1, showing crystalline particles in which lattice fringes are visible and which do not possess a distinguishable surface phase of another material such as carbon.

Further, the results showed that the powders prepared were free of coatings of carbon or other conductive additive phases. TEM and STEM showed that the powders of Examples 1 and 2 typically contained a small fraction of unreacted precursors in addition to the majority phase of the olivine structure. However, TEM images at resolution levels high enough to image the lattice planes of the olivine phase, an example of which is shown in FIG. 5, showed that the surfaces of the particles were not coated with another distinguishable phase of material. Thus the increased conductivity of the conductive powders of this Example was obtained in the absence of a continuous phase of a conductive additive.

Other polyanion compounds, aside from those having the olivine structure, such as those of the NASICON VOPO$_4$, LiFe(P$_2$O$_7$) or Fe$_4$(P$_2$O$_7$)$_3$ structures, can be similarly doped and synthesized to achieve high electronic conductivity. Further, based on the results obtained using Mg as a dopant, it is believed that other Group IIA alkaline earth metals, such as Be, Ca, Sr, and Ba, should have similar effects. Based on the results obtained using Ti and Zr, which are Group IVA elements, it is believed that other Group IVA elements, such as Hf, should have similar effects. Based on the results obtained using Nb and Ta, which are Group VA elements, it is believed that other Group VA elements, such as V, should have similar effects. Based on the results obtained using W, which is a Group VIA element, it is understood that other Group VIA elements, such as Cr and Mo, should have similar effects. Based on the results obtained using Al, it is believed that other Group IIIB elements, such as B, Ga, and In, should have similar effects.

EXAMPLE 2

Lithium Deficient and Substituted Compositions

Several compositions were prepared with an overall composition of the formula Li$_{1-a}$M"$_a$FePO$_4$, included in Table 2. The starting materials and synthesis procedure of Example 1 were used, with the exception that both plastic and porcelain milling containers were used with the zirconia milling media. Because the abrasion of polymeric milling containers and milling media can be a source of carbon, the porcelain containers were used to compare results with and without this potential carbon source.

As shown in Table 2 and also in Table 4, the doped samples of this doping formulation generally had higher conductivity than those of Example 1, with room-temperature conductivities of as much as about $4\times10^{-2}$ S/cm being measured by a two-point method (samples 5f6 and 5 g7). Highly conductive samples were obtained using either plastic or porcelain milling containers, showing that excess carbon added from the milling container is not necessary to achieve such conductivities. The results show that introducing Li/metal cation nonstoichiometry can promote Li deficiency, relative to the ideal LiMPO$_4$ stoichiometry, which, combined with doping with selected metals, can increase electronic conductivity. Also, higher temperature heat treatments, such as HT6 and HT7, can be used with these lithium-deficient cation stoichiometry compositions without losing electronic conductivity or exsolving the dopant, in comparison to the LiFe$_{1-a}$M"$_a$PO$_4$ compositions (Example 1). STEM observations showed that compositions exhibiting a detectable concentration of the added dopant in the crystalline LiFePO$_4$ grains were conductive.

Figure 6A:
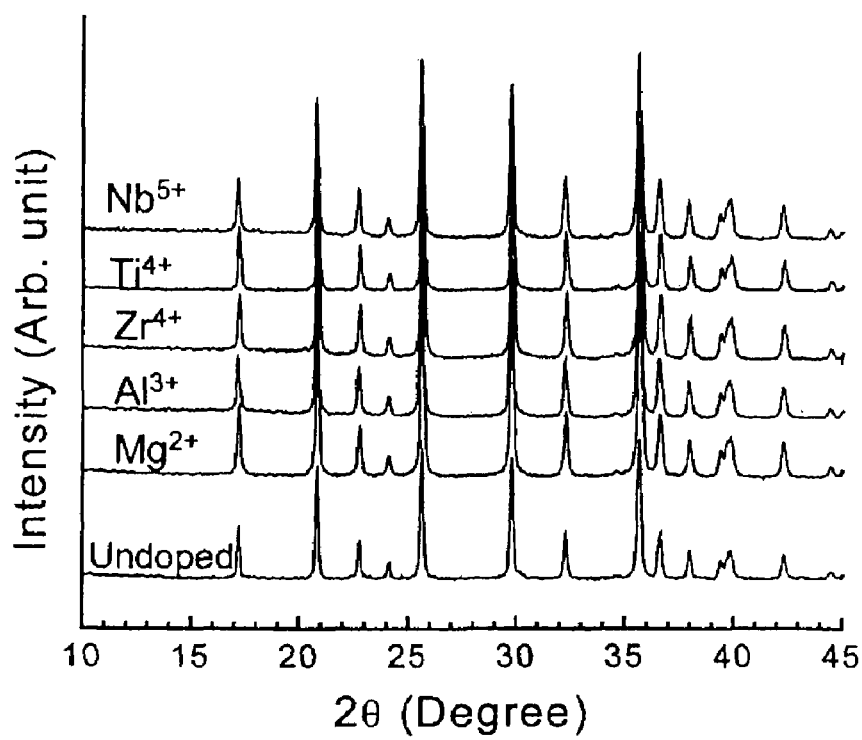
FIGS. 6A and 6B show X-ray diffraction patterns of various powders showing the effect of cation stoichiometry on dopant solid-solubility.
Figure 6B:
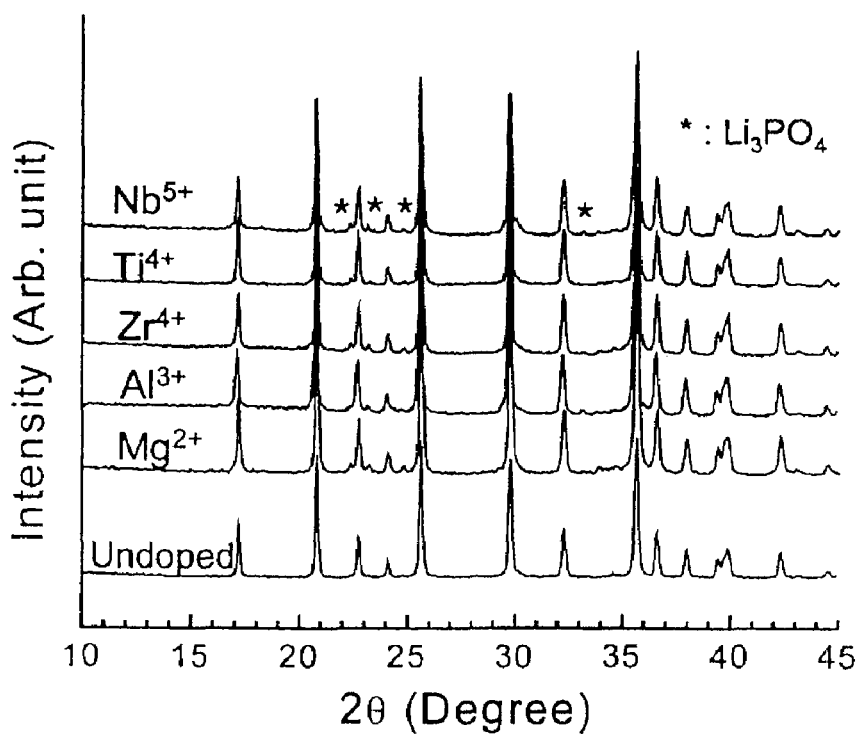

Compositions Li$_{1-x}$M$_x$FePO$_4$, that, while not being bound by any particular crystal chemical interpretation, have a formulation that allows substitution onto the M1 sites by a cation supervalent to Li$^+$, exhibited higher solubility for several dopants (Mg$^{2+}$, Al$^{3+}$, Ti$^{4+}$, Nb$^{5+}$, and W$^{6+}$) than did compositions LiFe$_{1-x}$M$_x$PO$_4$. FIG. 6 compares the X-ray diffraction patterns for several 1 mol % doped powders of each cation stoichiometry; in each case the lithium-deficient stoichiometry (FIG. 6a) exhibits no detectable impurity phases. By contrast, samples with the same dopants and concentrations in the iron-deficient stoichiometry showed detectable precipitation of Li$_3$PO$_4$ by XRD (FIG. 6b) and impurity phases enriched in the dopant, using electron microscopy. FIG. 7 shows an example of the first stoichiometry, Li$_{0.99}$Nb$_{0.01}$FePO$_4$, in which elemental mapping shows a uniform distribution of the Nb dopant. The amount of the dopant in solid solution may be less than the total amount of dopant added to the sample. For example, in the Li$_{1-a}$Nb$_a$FePO$_4$ compositions, heat treated at 850° C., a concentration x about 0.0023 was detected in solid solution for an overall composition a about 0.01. This shows that the solid solubility was limited to about a=0.0023 at 850° C. Nonetheless, compositions with a values, both greater than or less than 0.0023, were made conductive. In the Li$_x$(Fe$_{1-a}$M"$_a$)PO$_4$ compositions, samples processed at 600° C. were conductive while those processed at 700° C. and higher were not. Correspondingly, the samples processed at 600° C. had detectable dopants in solid solution when examined by STEM, while those processed at 700° C. did not.

The observed results that the increase in conductivity is not directly proportional to dopant concentration is consistent with a limited dopant solubility in some cases. That is, for those dopants that increased electronic conductivity, there was a large increase in conductivity at lower doping levels and weaker conductivity-concentration dependence at slightly higher dopant levels. For example, in the case of LiFe$_{1-a}$M"$_a$PO$_4$, the greater than 100 times increase in conductivity, compared to the undoped material, at dopant concentrations as low as 0.02% (for M"=Ti, Nb, and Mg), is followed by much smaller changes in conductivity with further increases in dopant concentration. For compositions Li$_{1-a}$M"$_a$FePO$_4$, the electronic conductivity is firstly higher overall by at least about an order of magnitude than for any of the LiFe$_{1-a}$M"$_a$PO$_4$ compositions. Compared to the undoped material, the increase in conductivity is significant, greater by a factor of more than 10$^7$ times, with a doping level as low as 0.2% (Nb-doped). However, further doping increases the conductivity only modestly.

Materials were also synthesized that contained an excess of Fe, typically in the form of an Fe$^{2+}$ or Fe$^{3+}$ salt, as shown in Table 2. While an excess of either Fe$^{2+}$ or Fe$^{3+}$ can be substituted into the composition Li$_{1-a}$M"$_a$FePO$_4$, as with the other dopants M", a certain concentration must be in solid solution (i.e., form part of the crystal lattice) for the conductivity to be increased substantially, since this determines the electronic carrier concentration. The results with Fe$^{2+}$ and Fe$^{3+}$ doping are consistent with the experiments using other dopants M" that show that when conductivity increased, the dopant in question was found to be in solid solution (either through STEM measurements of dopant distribution in the crystallites or by the appearance/absence of impurity phases by STEM or XRD).

Further, it is believed that the solubility of dopants M" is a function of ion size. With the exception of Mn$^{2+}$, all of the dopants that can be effective as M' dopants have an ionic radius, in octahedral coordination, that was less than that of Fe$^{2+}$. This is supported by the following ionic radii values, taken from the tabulation by Shannon (1976):

$R(Fe^{2+}) = 0.78$ A  $R(Li^+) = 0.76$ A
$R(Fe^{3+}) = 0.65$ A  $R(Mg^{2+}) = 0.72$ A  $R(Mn^{2+}) = 0.83$ A  $R(Ti^{4+}) = 0.61$ A
$R(Zr^{4+}) = 0.72$ A  $R(Nb^{5+}) = 0.64$ A  $R(Ta^{5+}) = 0.64$ A  $R(W^{6+}) = 0.60$ A
$R(Al^{3+}) = 0.54$ A

Figure 8:
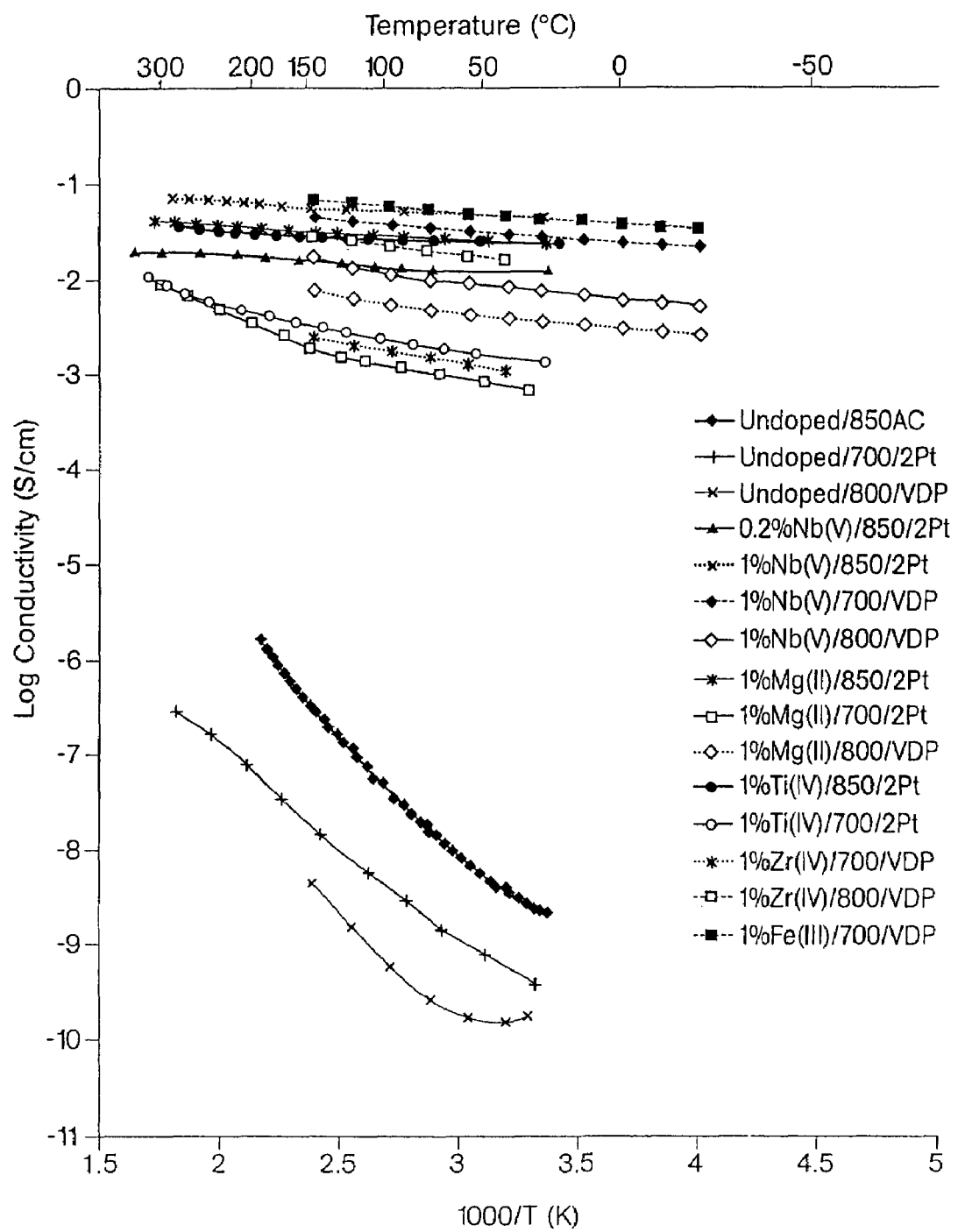
FIGS. 8 and 9 are graphs showing the conductivity of doped and undoped samples as a function of temperature.
Figure 9:
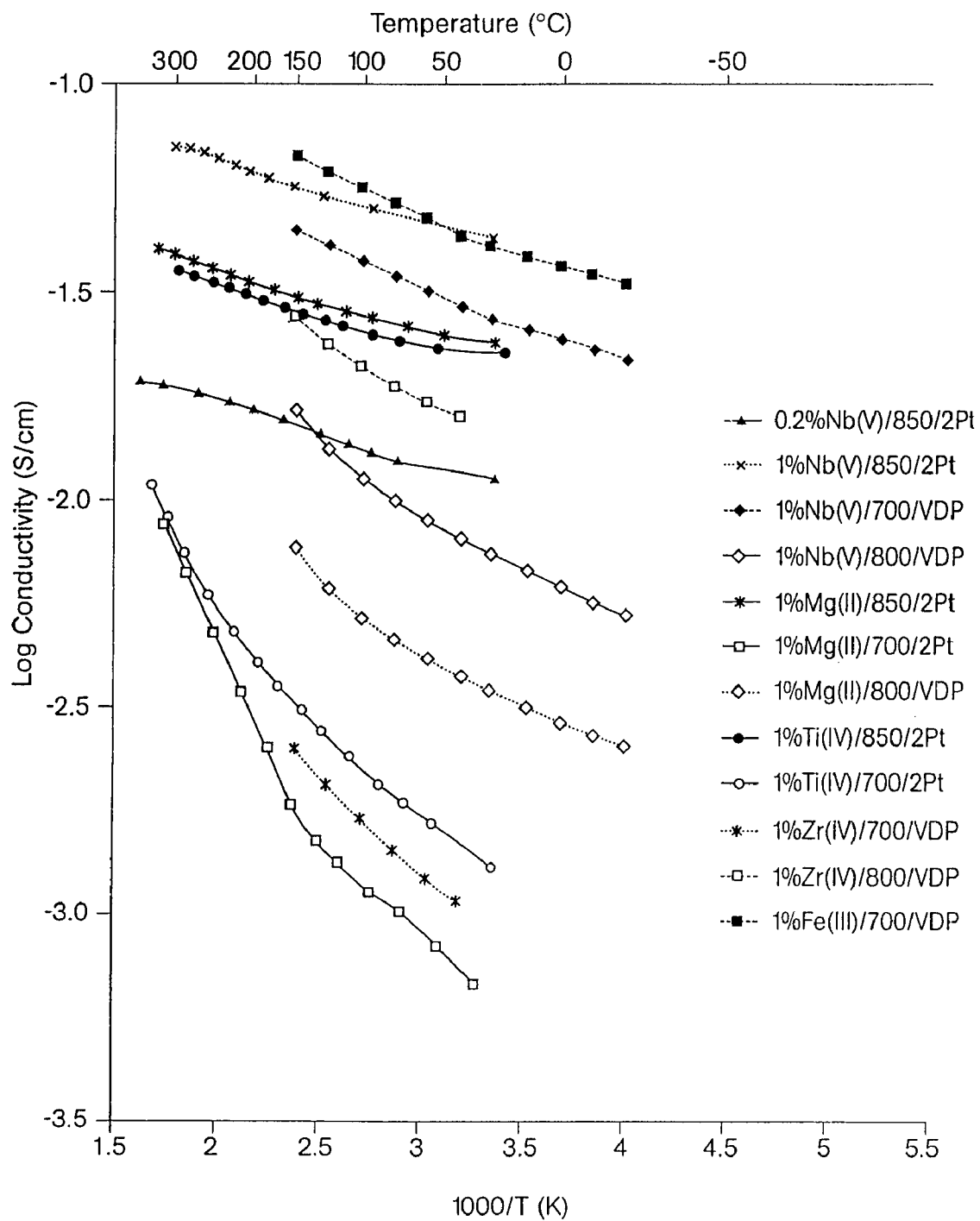

The temperature dependence of conductivity in the materials of the invention was measured using 2-point and 4-point electrical conductivity measurements of fired pellets pressed from powder samples prepared according to Examples 1 and 2. Both undoped and doped compositions were measured. In addition, ac (impedance spectroscopy) measurements were made on pellets prepared from undoped powder. The temperature dependence of electrical conductivity is shown in FIGS. 8 and 9 as a plot of log$_{10}$ conductivity against 1000/T(K). It is seen that the doped compositions can have more than 10$^7$ greater conductivity than an undoped sample. While both types exhibited increasing conductivity with increasing temperature, indicating semiconducting behavior, the doped materials had much shallower temperature dependence. An activation energy in the range of 25-75 meV was determined for the highly conductive doped samples, which is reasonable for ionization of shallow acceptors or donors, while an activation energy of about 500 meV was observed for the undoped sample. The high conductivity of the doped samples is maintained, with little temperature dependence, over the −20° C. to +150° C. temperature range of interest for many battery applications. Near room temperature, for example between 21C to 27C, the variation of electronic conductivity with temperature is minor, such that where a temperature within this range is referred to herein, it is understood that a range of temperatures around any particular value is included.

The highly conductive samples were also subjected to a Seebeck coefficient measurement. Platinum leads were attached to two ends of a sintered sample, whereupon one end was heated to a higher temperature than the other end, and the induced voltage was measured. The heated end was found to be at a negative potential relative to the cold end, exhibiting easily measured and significant potential values of −0.1 mV to −0.3 mV. This shows that the conductive LiFePO$_4$ compositions were p-type conductors. An undoped LiFePO$_4$ composition subjected to the same measurement was found to be n-type.

Figure 10:
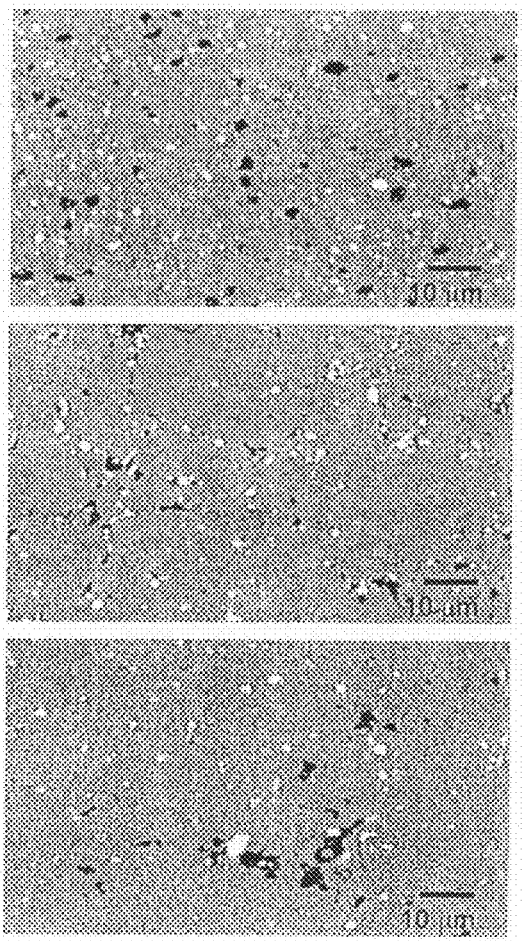
FIG. 10 shows backscattered electron images of the polished cross-section of two Nb-doped and one undoped pellet sintered to high density.
Figure 11:
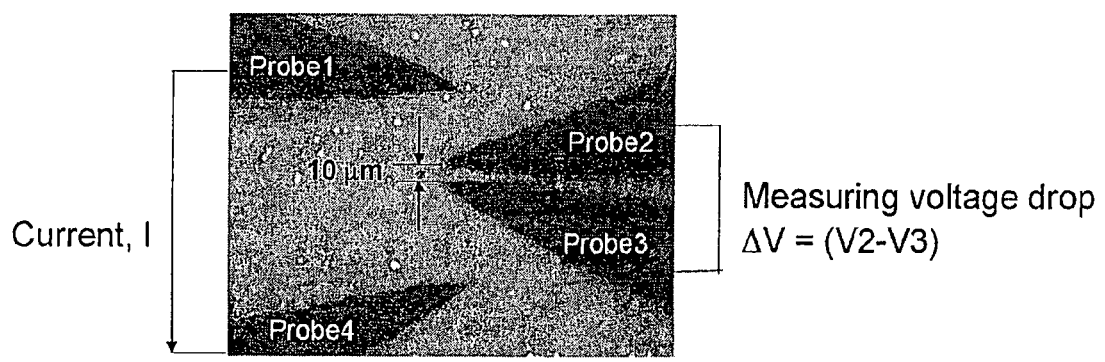
FIG. 11 is the configuration of a four-point microcontact measurement performed to determine the electronic conductivity of samples.
Figure 12:
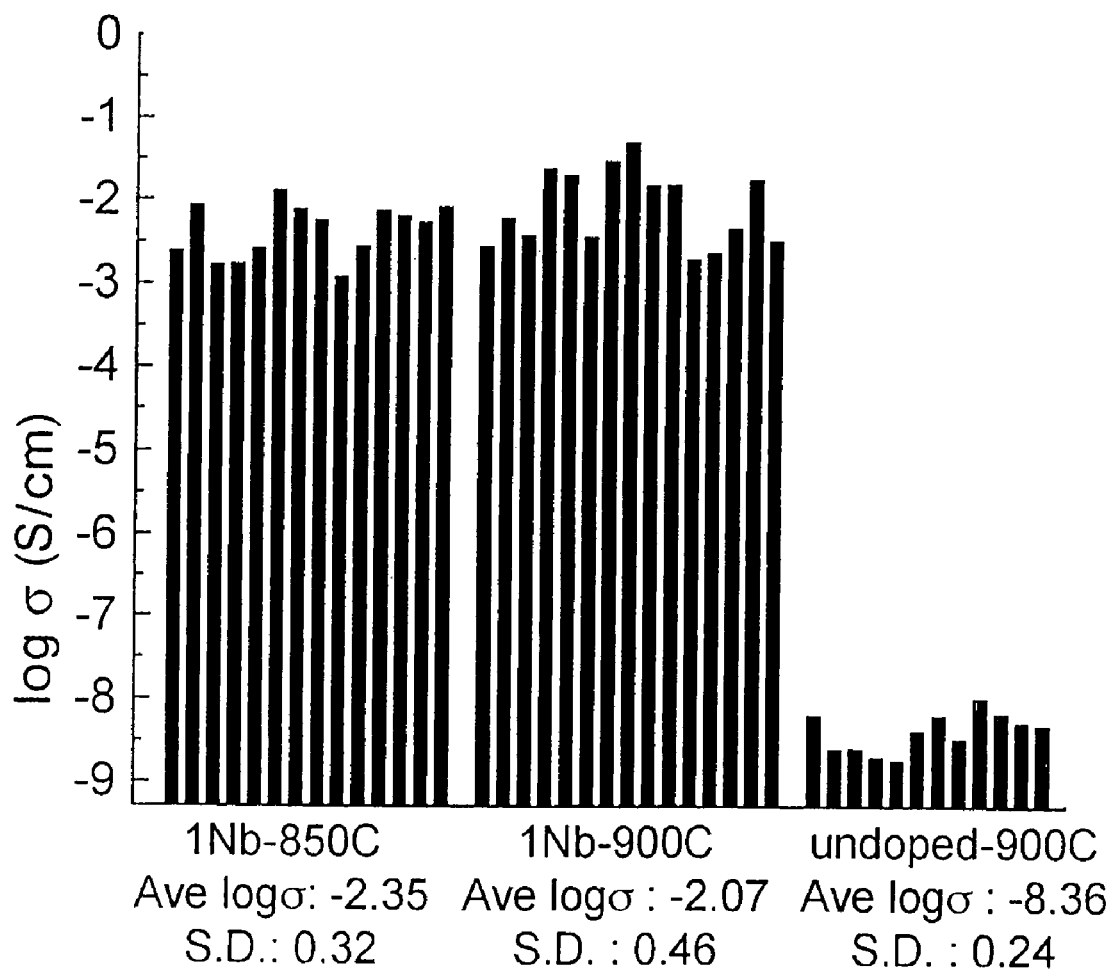
FIG. 12 is the electrical conductivity measured at several locations within each of the three samples of FIG. 10.

In some cases, the electrical conductivity of the samples was measured using a four-point microcontact method in order to determine the conductivity of individual crystalline grains. For these measurements, densely sintered pellets with an average grain size of about 10 micrometers were cut and polished. A co-linear array of microcontacts were used. Current probes were placed about 100 micrometers apart on the polished surface, while voltage probes were placed about 10 micrometers apart. FIG. 10 shows three samples whose conductivities at the microscopic scale were measured, two being 1% Nb-doped conductive compositions sintered at 850C and 900C respectively, and one being an undoped composition sintered at 900C. Combustion IR detection showed that all three samples had low carbon content, less than 0.5 wt %. The gray phase in FIG. 10 is the olivine phase, the black contrast features are porosity, and the bright contrast particles are iron phosphide phase. FIG. 11 shows the microcontact measurement geometry, in which it is seen that the inner voltage contacts are about 10 micrometers apart, or about the same separation as individual grains in the samples of FIG. 10. Thus the voltage contacts typically span one grain or one grain boundary. The microcontact array was placed in 12 to 15 separate locations on each sample, and the current-voltage relationship was measured at teach point over a range of currents in a room-temperature laboratory. FIG. 12 shows histograms of the conductivity obtained from the measurements, in which each bar represents one location of the microcontact array. It is seen that firstly, within each sample the conductivity has a similar value from place to place showing relatively uniform conductivity across a sample. Secondly, the conductivity of the doped samples is of about the same magnitude as measured by two-point and four-point measurements across entire sintered pellets, and is several orders of magnitude greater than the conductivity of the undoped sample.

Figure 13:
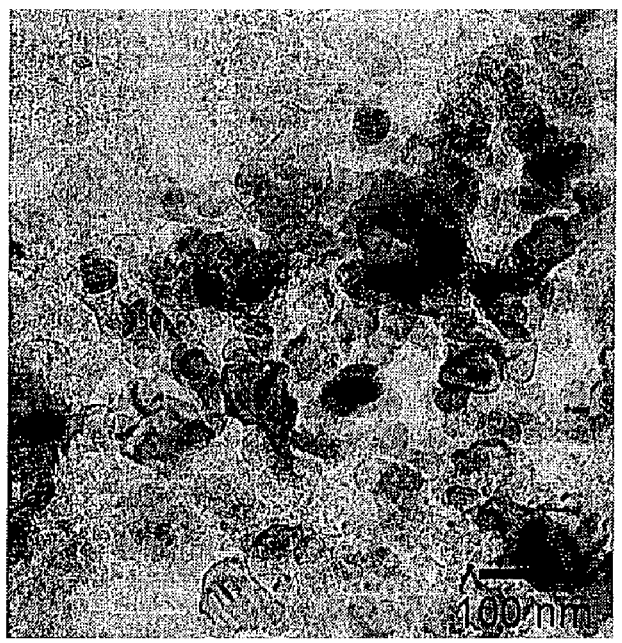
FIG. 13 shows bright-field TEM images of powders of 1% Nb and 1% Zr doping level and prepared according to the invention.
Figure 13:
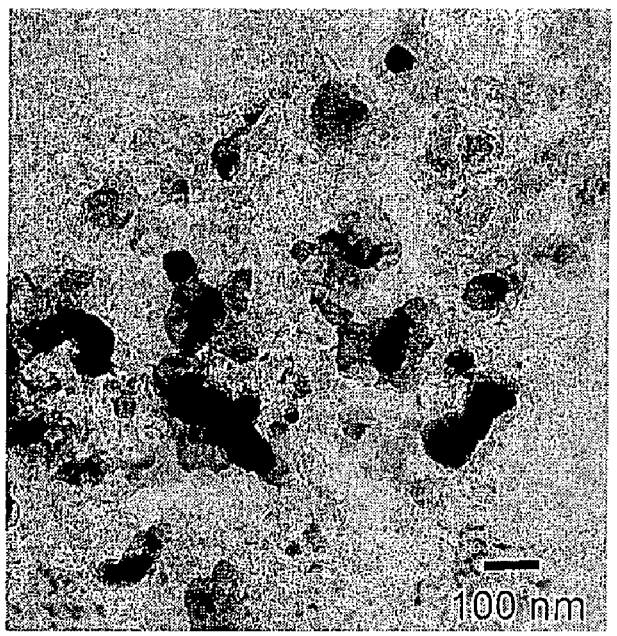
Figure 14:
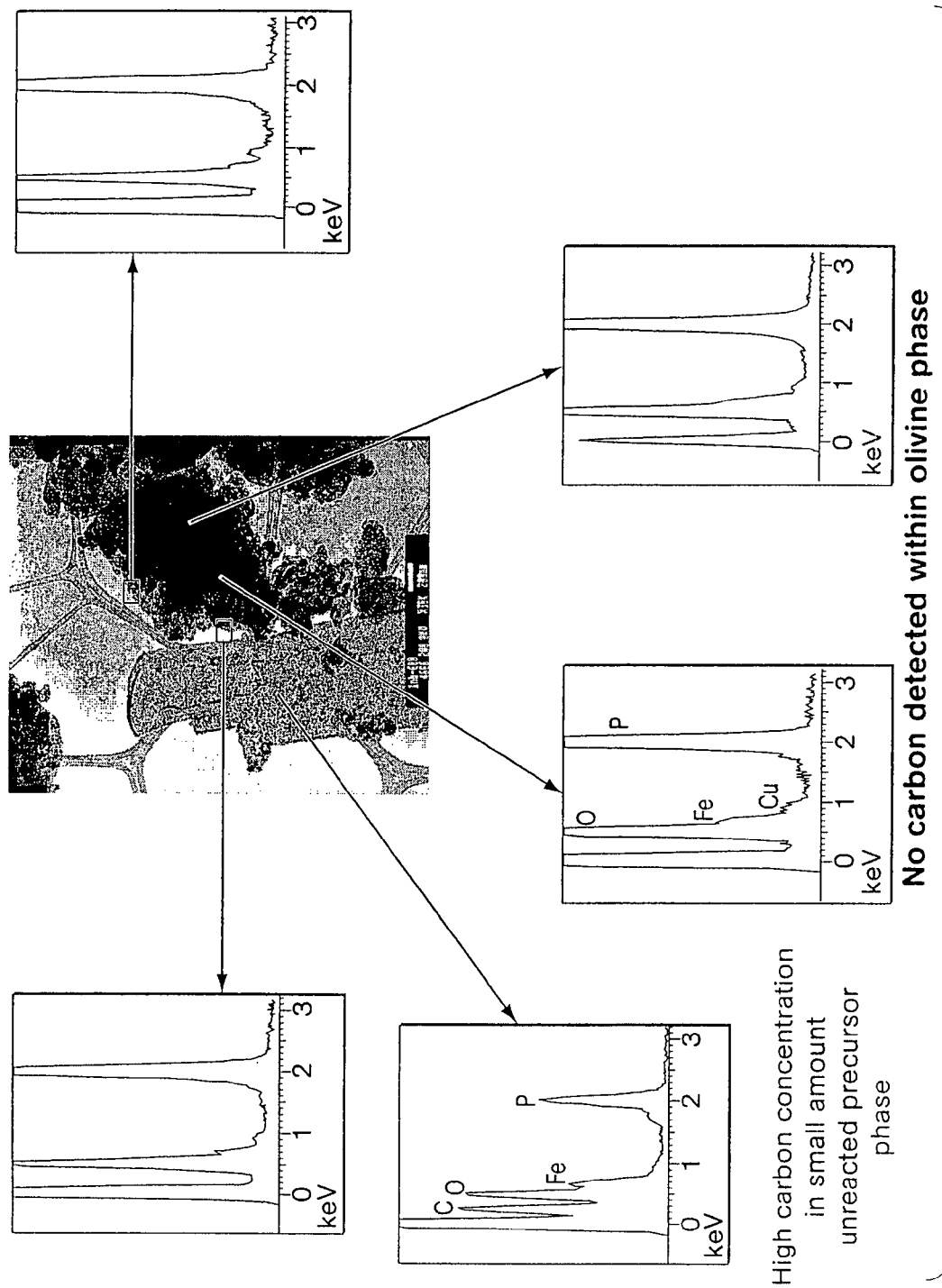
FIG. 14 shows a TEM image of a conductive 1% Nb doped composition fired at 600C, showing a particle of incompletely reacted precursor and crystallized olivine phase, and energy-dispersive X-ray spectra taken with a focused electron probe at the locations indicated, showing that carbon is enriched within the particle of unreacted precursor and not detected within several locations of the olivine phase.
Figure 15:
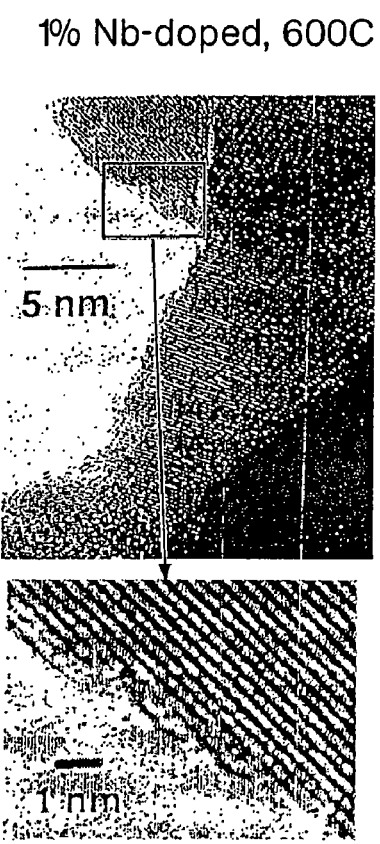
FIGS. 15 and 16 show high resolution TEM images of a conductive 1% Nb doped composition fired at 600C, in which lattice fringes are visible in crystallites of olivine phase, and showing the absence of a significant surface coating of another material.
Figure 15:
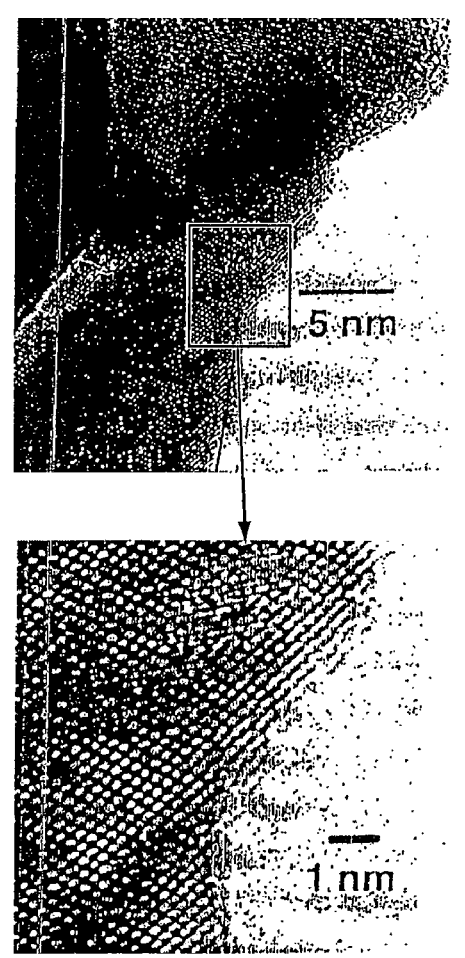
Figure 16:
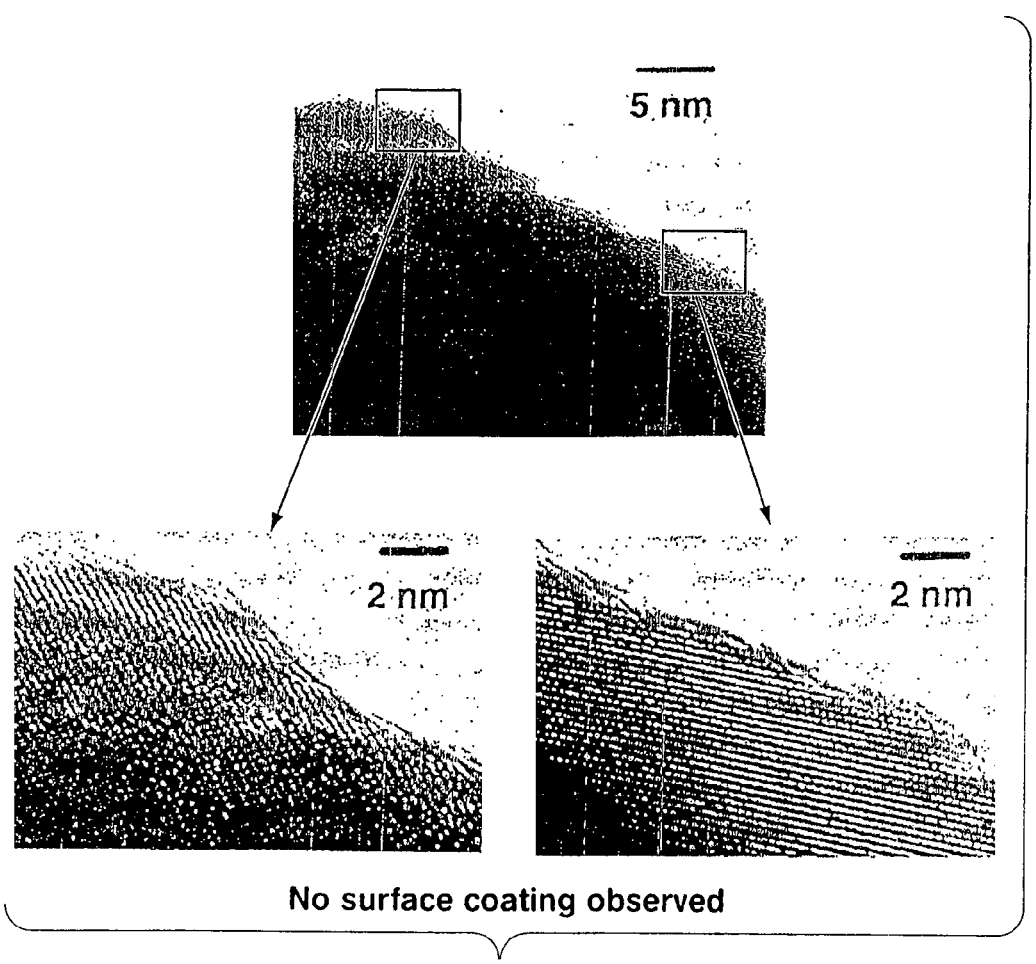

TEM observations were made of the powders of Example 2. FIG. 13 shows copies of TEM images of powders doped with 1% Nb or 1% Zr. It is seen that the average size of individual crystallites is less than about 100 nm in the Nb-doped sample, less than about 50 nm in the Zr-doped sample, and that the powder has an aggregated morphology. Energy-dispersive X-ray analysis was conducted to determine the location of residual carbon, typically present at a level determined by combustion IR analysis to be between 0.2 and 2.5 wt % depending on the firing conditions. FIG. 14 carbon coating on the particles as practiced in prior art was present. FIG. 14 shows a particle of unreacted precursor, present in small amounts in the sample, in which carbon is found at an enriched level. In the other regions, containing the olivine phase, no carbon is detected. FIGS. 15 and 16 show high resolution TEM images of olivine phase particles, in which lattice fringes are imaged. No continuous surface phase of carbon or other separate conductive compound was found. Thus it is seen that the fine particle size and increased conductivity of these samples is observed in samples without a significant amount of free carbon.

Surface area measurements are another well-known measure of effective particle size. The specific surface area was measured, using the BET method, of doped and undoped samples heat treated under several conditions. Table 4 shows results for several powder samples. It is observed that the undoped powders have a specific surface area that is typically less than about 10 $m^2/g$ for heat treatment temperatures of 600° C. or greater. These are heat treatment conditions sufficient to provide a nearly completely crystallized powder. However, the doped compositions have much higher surface area, typically greater than 40 $m^2/g$ for 1% Zr-doped powder fired at 600C, and greater than 30 $m^2/g$ for 1% Nb-doped powder fired at 600C. In the doped samples the powder is also nearly completely crystallized after firing at these temperatures although a small quantity of incompletely crystallized precursor to the olivine phase remains. Other powders doped with 0.2-1 mole % of dopants such as Al, Mg, and Ti also had specific surface areas of 35 to 42 $m^2/g$ after firing at 600C. At higher firing temperatures of 700 to 800° C. the specific surface area of the doped samples remains higher than of the undoped samples. Having a crystal density of 3.6 $g/cm^3$, the diameter of monosized spheres of the compound having an equivalent specific surface area (i.e., the equivalent spherical particle size) of 40 $m^2/g$ is 21 nm, of 30 $m^2/g$ is 28 nm, of 29 $m^2/g$ is 42 nm, of 15 $m^2/g$ is 56 nm, of 10 $m^2/g$ is 83 nm, of 5 $m^2/g$ is 167 nm, and of 1 $m^2/g$ is 833 nm. Thus it is seen that the doping methods of the present example provide for complete or nearly complete crystallization of the olivine structure compound while also providing for a high specific surface area, higher than that of the undoped compound under identical processing and firing conditions.

TABLE 4

Compositions, Firing Conditions, and Specific Surface Areas of Insulating and Conductive Samples

| Composition | Temp. (° C.) | Container | BET area ($m^2/g$) | Conductivity | Color |
| --- | --- | --- | --- | --- | --- |
| $LiFePO_4$ | 600 | Plastic bottle | 9.5 | insulating | Gray |
| | 700 | Porcelain jar | 3.9 | insulating | Gray |
| | 800 | Porcelain jar | ~1 | insulating | Light Gray |
| $LiFe_{0.99}Zr_{0.01}PO_4$ | 600 | Porcelain jar | 43.2 | conductive | Black |
| | 600 | Porcelain jar | 41.8 | conductive | Black |
| | 700 | Porcelain jar | 26.4 | conductive | Black |
| | 750 | Porcelain jar | 11.6 | conductive | Dark gray |
| $LiFe_{0.99}Nb_{0.01}PO_4$ | 600 | Porcelain jar | 34.7 | conductive | Black |
| | 800 P | Porcelain jar | 15.3 | conductive | Black | shows TEM images and corresponding chemical analyses of regions in a 1% Nb doped sample fired at 600C and that was analysed to have about 2.4% residual carbon. This sample of relatively high residual carbon content compared to others of Example 2 was selected for TEM in order to determine if a Without being bound by any particular interpretation, these results show that conductivities, higher than those obtained using the method and compositions of Example 1, can be obtained in a composition that is deficient in the alkali ion and excess in the other metals that would normally occupy octahedral sites in a LiFePO$_4$ structure. As mentioned, the results show that the solubility of the metal, M", was higher when the composition was formulated in this manner. Without being bound by any interpretation, it is reasonable to expect that having a deficiency of Li and excess of Mg allows one or the other octahedral site cations, Mg or Fe, to occupy octahedral sites in the structure that would normally be occupied by Li.

Based on the results obtained in this instance, where there is an excess of the non-alkaline metal and a deficiency of the alkali, it is believed that almost any metal added to the structure of the parent compound such that substitution of the metal onto the M1 crystallographic sites normally occupied by the main alkaline metal occurs, would have the desired effect of improving the electronic conductivity of the resulting compound.

Without being bound by any particular interpretation, we note that LiFePO$_4$ is found by first-principles calculations of the spin-polarized type to have an unusual band structure of the type known as a half-metal. The band gap is spin-sensitive and may in one spin have a gap of about 1 eV while in the other being a metal. It is also found that the electron effective mass is much larger than the hole effective mass, which is consistent with observation of higher electronic conductivity in a p-type conductor.

Without being bound by any particular interpretation, it is noted that a mechanism of defect formation can be understood from the observations that the increased electronic conductivity of the present materials is thermally activated and p-type, that there is not a strict proportionality between dopant concentration and conductivity, that similar increases in conductivity are possible for dopants of 2+ through 6+ valence, that a two-phase reaction exists upon delithiation, as shown in later Examples and as is seen in undoped LiFeO$_4$, and that a high capacity and high rate capability are maintained over a wide range of lithiation of the doped compounds. The olivine structure has continuous networks of metal-filled anion polyhedra, including having the cations that occupy the M2 sites (Fe site in LiFePO$_4$) forming a corner-sharing network of octahedra in the (010) plane, while the cations on M1 (Li) sites form edge-sharing chains of octahedra in the [100] direction. It is noted that the substitution of a cation M that is supervalent to Li$^+$ in the composition Li$_{1-x}$M$_x$FePO$_4$ is normally expected to result in donor doping. In oxides, aliovalent solutes can be compensated by electronic or ionic defects. The following point defect reactions (in Kröger-Vink notation), illustrate these mechanisms for an M$^{3+}$ cation that is respectively compensated by electrons or by cation vacancies on the M2 site:

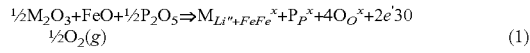

(1)

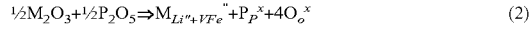

(2)

In the first instance, electroneutrality is given by [M$_{Li''}$]=n, namely the dopant acts directly as a donor species. If the second mechanism is dominant, electroneutrality is given by [M$_{Li''}$]=2[V$_{Fe}''$], in which case the donor and vacancy charge-compensate one another and no direct effect on the electronic carrier concentration is expected. However, it can be shown that in this instance as well, secondary defect equilibria should lead to an increase in the n-type conductivity. Neither of these simple mechanisms can explain a material of high p-type conductivity. An excess of acceptor point defects above and beyond the dopant concentration, or a large difference between hole and electron mobilities as discussed earlier, are necessary. Possible acceptors in the LiFePO$_4$ structure are cation vacancies (V$_{Li}'$, V$_{Fe}''$), or oxygen interstitials (O$_i''$). The latter defect is unlikely given the nearly hexagonal close-packed oxygen sublattice in olivine, which should result in a high anion vacancy formation energy.

A mechanism whereby cation doping on the M1 sites allows the stabilization of solid solutions with a net cation deficiency, that is, where the doped olivine endmember has a solid solution of composition Li$_{1-a-x}$M$_x$FePO$_4$ or Li$_{1-x}$M$_x$Fe$_{1-b}$PO$_4$, in which a and b are M1 or M2 vacancy concentrations respectively, is consistent with the results. If the net charge due to a and b exceed that due to x, then the material will have a net excess of acceptor defects (Fe$^{3+}$ ions). Taking for example an M$^{3+}$ dopant, the respective valences for a lithium deficient solid solution are Li$^{1+}_{1-a-x}$M$^{3+}_x$(Fe$^{2+}_{1-a+2x}$Fe$^+_{a-2x}$)(PO$_4$)$_{3-}$. It is noted that lithium deficiency is particularly likely under high temperature firing conditions due to lithium volatility. The above defect mechanism is analogous to allowing an extension of the solid solution field for the pure Li-rich endmember phase to cation deficient solid solutions, Li$_{1-a}$FePO$_4$. We recall that pure LiFePO$_4$ has been observed to decompose immediately to two co-existing phases upon delithiation, LiFePO$_4$ and FePO$_4$, thereby pinning the Li chemical potential and resulting in the flat intercalation voltage vs. lithium concentration. Thus the insulating behavior of undoped LiFePO$_4$ throughout electrochemical cycling suggests negligible mixed (Fe$^{2+}$/Fe$^{3+}$) iron valency in either phase. The retention of either lithium or iron deficiency in the highly lithiated solid solution can therefore result in charge compensation by Fe$^{3+}$ and p-type conductivity.

Regarding the delithiated FePO$_4$ endmember phase, our electrochemical data in later Examples indicate that it also retains high electronic conductivity throughout cycling. The influence of M1 site cation doping is expected to be quite different for this phase. Starting with pure FePO$_4$, in which all iron is trivalent, cation doping will result in the formation of divalent iron: M$^{3+}_x$(Fe$^{2+}_{3x}$Fe$^{3+}_{1-3x}$)PO$_4$. This composition is obtained upon delithiation of the solid solution given earlier. The dopant in this instance may be viewed as an "interstitial" cation donor, occupying normally unoccupied M1 sites, and n-type conductivity should result. During operation as a lithium storage material, the present materials may be a two-phase material, one phase p-type and the other n-type, that change in their relative proportions as the overall lithium concentration changes. A transition from p- to n-type conductivity may be measurable for the two-phase material as a whole as delithiation proceeds. This behavior may be observed whether the cation dopant M occupies the M1 site, or preferentially occupies the M2 site and displaces Fe to the M1 site.

The room temperature conductivity of some of the compounds of the invention exceeds that of the well-established intercalation cathodes LiCoO$_2$ and LiMn$_2$O$_4$ in their lithiated (discharged) states. At these high levels of electronic conductivity, lithium ion transport is likely to limit the overall rate of intercalation and deintercalation. That is, the effective lithium chemical diffusion coefficient is likely to be limited by lithium transport (i.e., the ionic transference number t$_{Li}$ is ~0). Because it is known that delithiation of LiFePO$_4$ results in coexistence of two phases, lithium ingress and egress from particles of the storage material requires growth in the amount of one phase and a decrease in the amount of the other. Without being bound by any particular interpretation of the rate-limiting microscopic mechanism of phase transformation, it is understood that a decrease in the crystallite size is beneficial to ion transport. At the same time, it is necessary to simultaneously accommodate electron flow to and from the particles. The structure of the materials of the invention are almost ideal for providing optimal mixed electronic-ionic transport in a battery system, having a porous aggregate structure in which the nanoscale primary crystallites can be surrounded by the electrolyte, allowing lithium ion transport through a very small cross-sectional dimension, while remaining electronically "wired" together through the sinter necks. For materials in which electronic transport is limiting, it can still be beneficial to decrease the crystallite size, as the potential drop across particle is less for a material of higher conductivity. (If ion transport is limiting, further increases in the electronic conductivity are not expected to improve the rate capability of a single particle significantly, but can improve the electronic conductivity of a network of particles such as that present in a typical composite electrode.)

Having a fine primary crystallite size due to doping as provided by the present invention provides high rate capability. Therefore, another feature of the materials of the present invention is a structure characterized by primary crystallites having at least a smallest dimension that is less than 200 nm, preferably less than 100 nm, still preferably less than 50 nm, and still more preferably less than 30 nm. According to the invention the individual crystallites of the stated sizes are typically joined by sintering, forming an interconnected but porous network. In some cases, an average of at least 50% of the surface area of the primary crystallites is exposed so that it can contact the electrolyte. To determine the percentage of exposed surface area, the following procedure can be used: the average primary particle size and shape was measured, for instance by electron microscopy, and the surface area per unit mass can be thus computed. This would be the surface area that would result for completely isolated particles. The specific surface area of the powder can then be measured and compared to the first number. The latter should be at least 50% of the former. In accordance with having a very small primary crystallite size and aggregates that are not highly densified, the specific surface areas of the materials of the invention are preferably greater than about 10 $m^2/g$, more preferably greater than about 20 $m^2/g$, more preferably greater than about 30 $m^2/g$, and still more preferably greater than about 40 $m^2/g$.

It is understood that olivines with other metals partially or completely substituted for Fe, including but not limited to $LiMnPO_4$ and $LiCoPO_4$, or others in the family of polyanion compounds, including but not limited to those with continuously joined networks of transition metal filled polyhedra within the structure, may enjoy the benefits of improved electronic conductivity, reduced crystallite size, high reversible charge capacity, high rate capability, and other benefits described herein when they are doped or processed according to the invention.

EXAMPLE 3

Electrode Fabrication and Electrochemical Tests

Figure 17A:
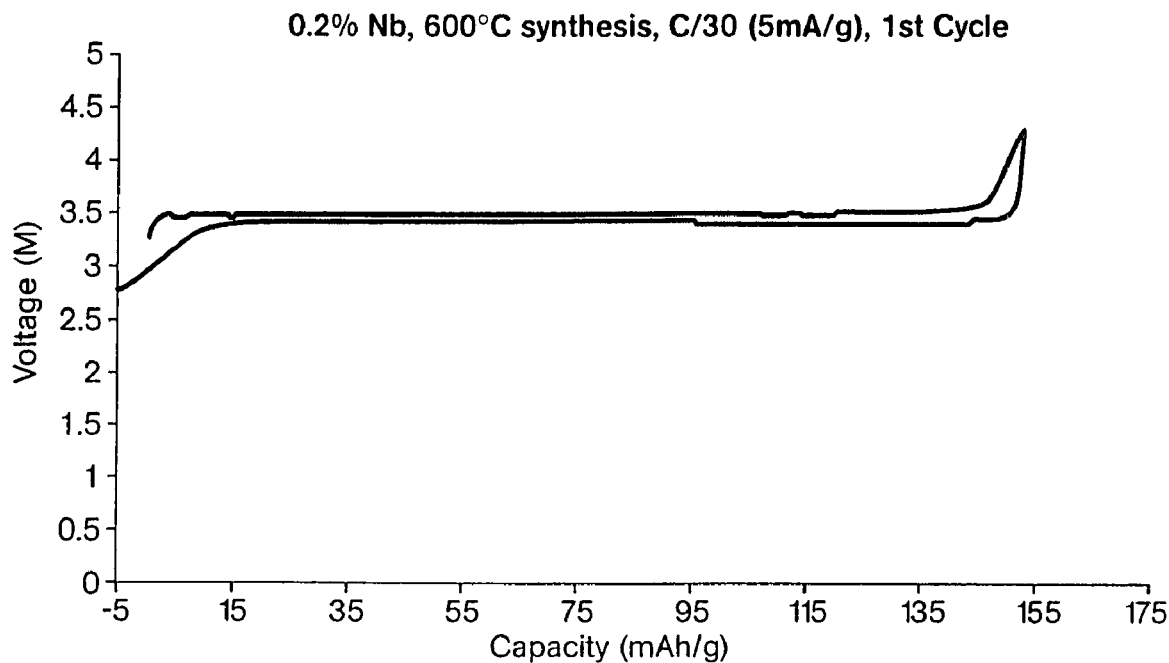
FIG. 17A shows a first electrochemical cycle for an electrode prepared using a Nb-doped composition, and tested against a lithium metal negative electrode in a laboratory cell using a nonaqueous liquid electrolyte.
Figure 17B:
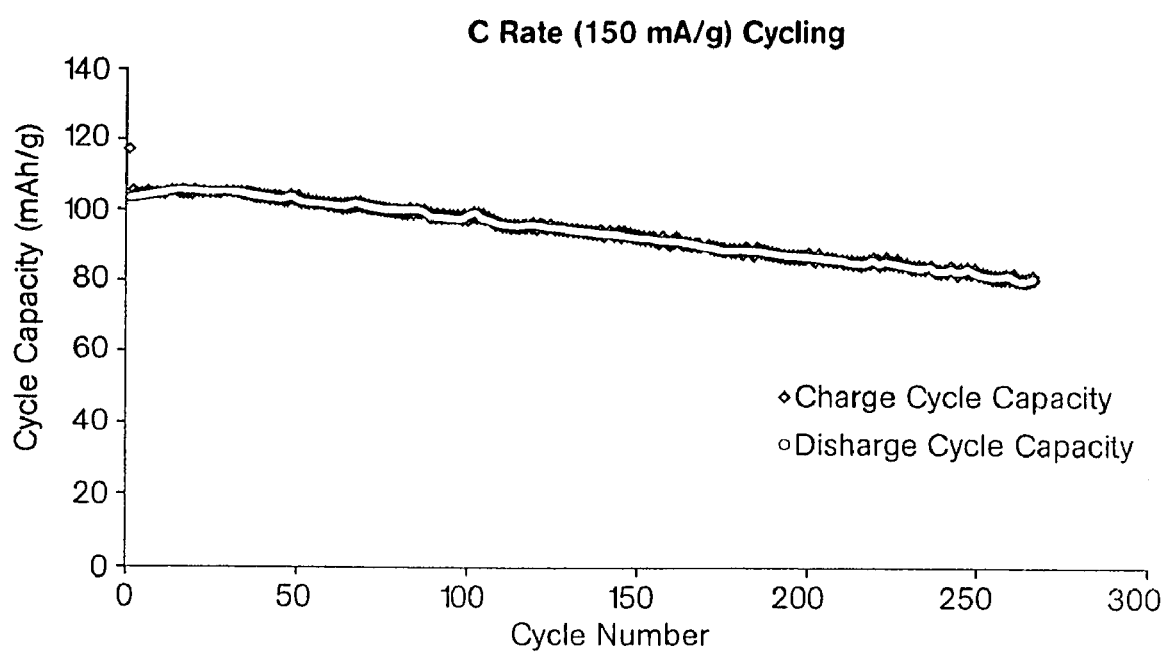
FIG. 17B shows capacity vs. cycle number for this electrode at a 1C rate (150 mA/g).
Figure 17C:
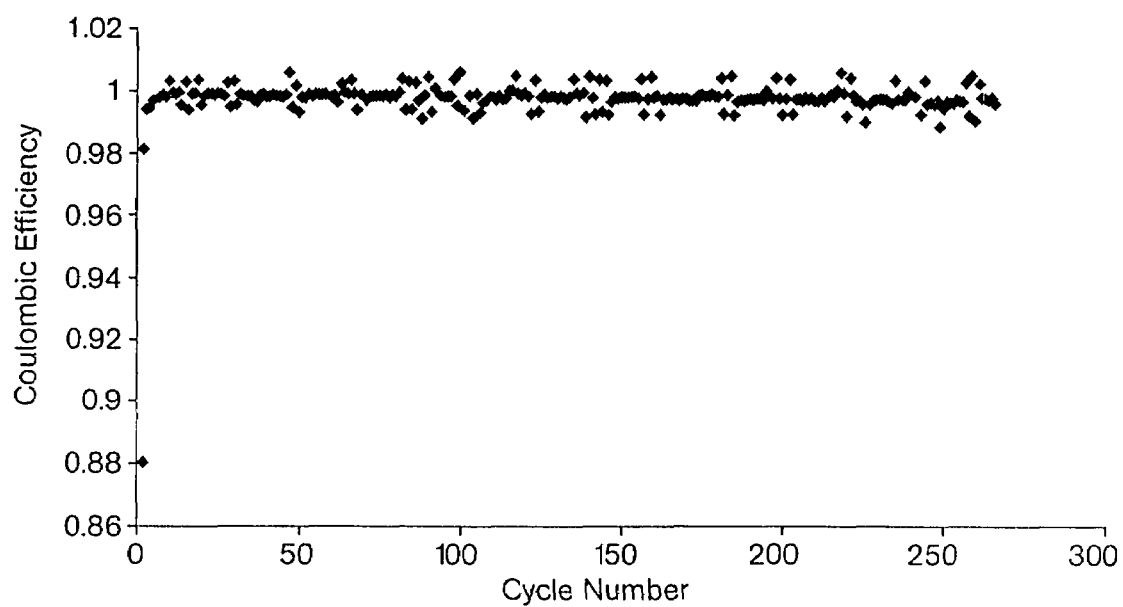
FIG. 17C shows the coulombic efficiency vs. cycle number at 1C rate (150 mA/g)

A composition $Li_{0.998}Nb_{0.002}FePO_4$ was prepared as described in examples 1 and 2 using lithium carbonate, niobium phenoxide, iron oxalate, and ammonium dihydrogen phosphate, and heat treated according to the procedure labeled as HT1 shown in Table 2. The resulting powder was black and conductive, and was cast as an electrode coating on an aluminum foil current collector, using a standard formulation of 85 wt % of said composition, 10 wt % SUPER P™ carbon, and 5 wt % PVDF binder. γ-butyroactone was used as the solvent. The positive electrode (cathode) coating was tested against a lithium metal foil counterelectrode (anode) in a standard cell assembly using CELGARD® 2400 separator film and EC:DMC (+1M $LiPF_6$) as the electrolyte. Galvanostatic tests were performed at several current rates. FIG. 17A shows the first electrochemical cycle at C/30 rate, in which it is seen that a capacity of about 150 mA/g is obtained. A flat voltage plateau is observed, indicating a two-phase equilibrium of constant lithium chemical potential. FIG. 17B shows capacity vs. cycle number for this electrode at a 1C rate (150 mA/g), to about 260 cycles. FIG. 17C shows that the coulombic efficiency vs. cycle number at 1C rate (150 mA/g) is generally greater than about 0.997. These results show that this material of the invention had good performance as a storage cathode for rechargeable lithium battery systems, at practical rates of charge and discharge, without requiring special procedures, such as coating with conductive additives.

EXAMPLE 4

Electrode Fabrication and Electrochemical Tests of the Lithium Storage Compounds and Electrodes of the Invention at High Discharge Rates The electrochemical performance of the undoped and doped powders of Examples 1 and 2 were evaluated by using them in electrodes of a variety of formulations and testing said electrodes under a wide range of conditions as the positive electrode in a liquid electrolyte cell, using lithium metal foil as the negative electrode. Table 5 lists several of the electrode formulations that were prepared and tested. All samples were tested using CELGARD® 2400 or 2500 separator film and 1:1 EC:DEC with 1M $LiPF_6$ liquid electrolyte.

TABLE 5

Lithium Storage Materials and Electrode Formulations

| Sample | Active Materials Composition and Heat Treatment | Specific Surface Area ($m^2/g$) | Electrode Formulation (wt percentages) | Active Material Loading ($mg/cm^2$) |
| --- | --- | --- | --- | --- |
| A | $LiFePO_4$, 700° C./Ar | 3.9 | Cathode/Super-P/Kynar 461 79/10/11 | 5.3 |

TABLE 5-continued

Lithium Storage Materials and Electrode Formulations

| Sample | Active Materials Composition and Heat Treatment | Specific Surface Area (m²/g) | Electrode Formulation (wt percentages) | Active Material Loading (mg/cm²) |
|---|---|---|---|---|
| B | LiFePO$_4$, 700° C./Ar | 3.9 | Cathode/Super-P/Kynar 461 79/10/11 | 7.8 |
| C | (Li$_{0.99}$Zr$_{0.01}$)FePO$_4$, 600° C./Ar | ~40 | Cathode/Super-P/Alfa-Aesar PVdF 78.3/10.1/11.6 | >3.9 |
| D | (Li$_{0.99}$Zr$_{0.01}$)FePO$_4$, 600° C./Ar | ~40 | Cathode/Super-P/Alfa-Aesar PVdF 78.4/10.0/11.6 | 2.5 |
| E | (Li$_{0.99}$Zr$_{0.01}$)FePO$_4$, 600° C./Ar | 41.8 | Cathode/Super-P/Kynar 2801 79/10/11 | 4.0 |
| F | (Li$_{0.99}$Zr$_{0.01}$)FePO$_4$, 600° C./Ar | 41.8 | Cathode/Super-P/Kynar 2801 79/10/11 plasticized | 4.3 |
| G | (Li$_{0.99}$Zr$_{0.01}$)FePO$_4$, 600° C./Ar | 41.8 | Cathode/Super-P/Kynar 2801 79/10/11 plasticized | 4.4 |
| H | (Li$_{0.99}$Zr$_{0.01}$)FePO$_4$, 700° C./Ar | 26.4 | Cathode/Super-P/Kynar 461 79/10/11 | 5.3 |
| I | Li(Fe$_{0.98}$Ti$_{0.02}$)PO$_4$, 600° C./Ar | ~40 | Cathode/Super-P/Kynar 461 79/10/11 | 5.9 |
| J | (Li$_{0.998}$Nb$_{0.002}$)FePO$_4$, 600° C./Ar | ~40 | Cathode/Super-P/Alfa-Aesar PVdF 85/10/5 | — |

Table 5, Sample D.

A composition (Li$_{0.99}$Zr$_{0.01}$)FePO$_4$, fired at 600° C. in Ar according to the methods of Example 2, and having a specific surface area of about 40 m²/g, was formulated into an electrode by mixing 78.4 wt % of the active material, 10.0 wt % of SUPER P™ carbon, and 11.6 wt % Alfa-Aesar PVDF as the binder, using γ-butyrolactone as solvent. The mixing was done in a small plastic container containing one Teflon® ball using a dental amalgamator (Wig-L-Bug) for 5 minutes. Mixed suspensions were cast onto aluminum foil current collectors, dried, and pressed at 4 tons/cm². Electrochemical test samples were cut from the pressed castings and assembled in stainless steel test cells with lithium metal foil (Alfa Aesar, Ward Hill, Mass., USA) as the counterelectrode and CELGARD® 2400 (Hoechst Celanese, Charlotte, N.C., USA) as the separator. The liquid electrolyte used was 1:1 by wt ethylene carbonate and diethyl carbonate with 1M LiPF$_6$ added as the conductive salt.

Figure 18A:
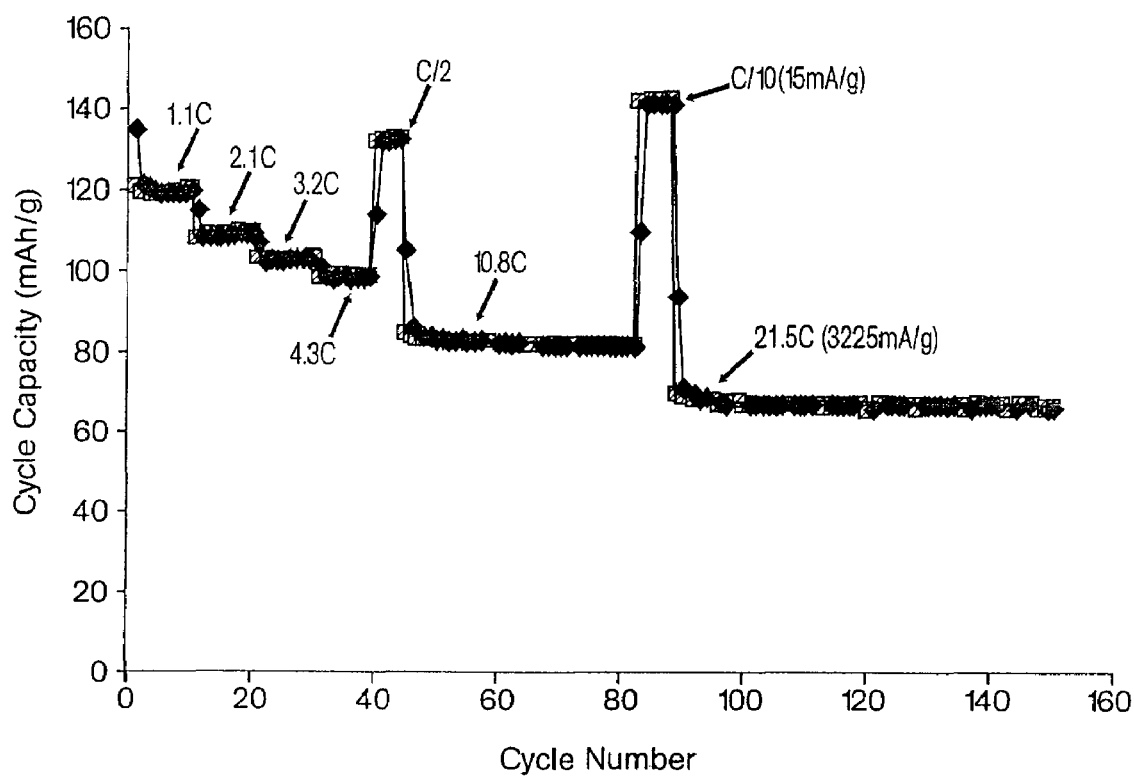
FIGS. 18A and 18B show electrochemical test data for electronically conductive olivine of composition Li$_{0.99}$Zr$_{0.01}$FePO$_4$ S in a conventional lithium battery electrode design (78 wt % cathode-active material, 10 wt % Super PTM carbon, 12 wt % PVdF binder; 2.5 mg/cm$^2$ loading) with a lithium metal negative electrode and nonaqueous liquid electrolyte.
Figure 18B:
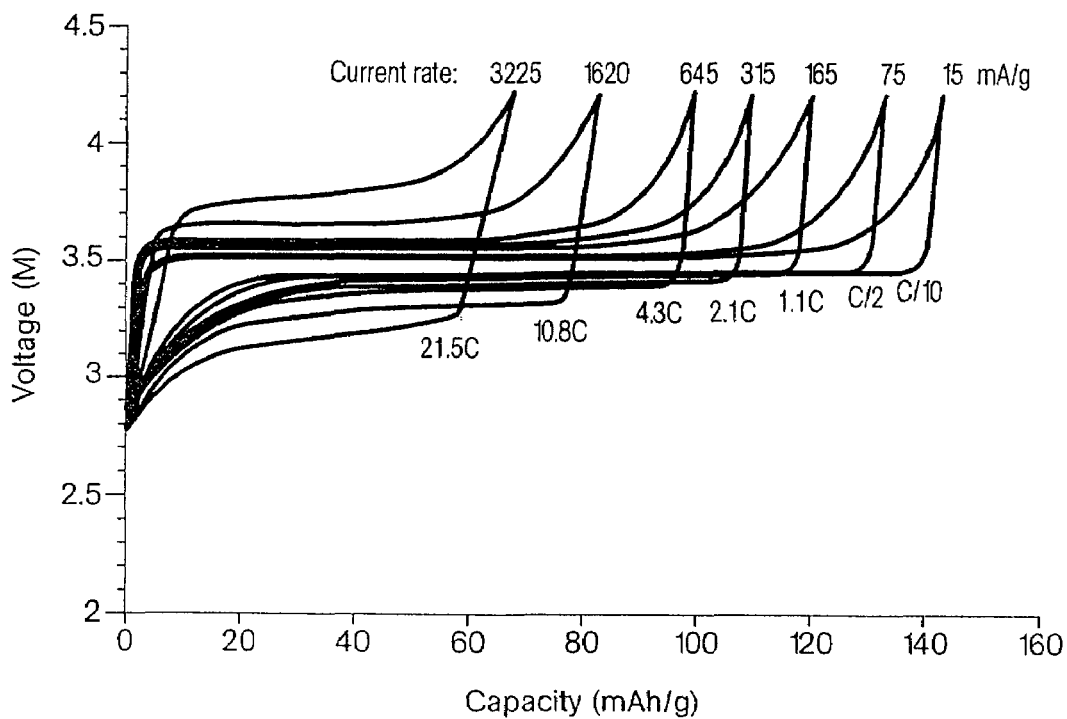

FIG. 18A shows the charge and discharge capacities of a cell with about 2.5 mg/cm² loading of the active material, observed in continuous cycling at rates varying from 15 mA/g (C/10) to 3225 mA/g (21.5C) between the voltage limits of 2.8-4.2V, at room temperature. It is noted that a stable capacity is obtained upon cycling over a wide range of rates, to more than 150 cycles. FIG. 18B shows corresponding charge-discharge curves for the doped sample, in which there is only a modest polarization, with a clear voltage plateaus at ~3.1V even at a discharge rate of 21.5C. Comparing with published data for LiFePO$_4$, it is clear that the low doping levels used to increase conductivity and increase specific surface area do not decrease the storage capacity at low rates, but greatly increase the power density that is possible. The low polarization is attributed to the high electronic conductivity at the particle scale. Thus this electrode made using a compound of the invention is seen to have high energy density at much higher current rates than previously seen for undoped LiFePO$_4$.

Table 5, Sample C.

An electrode prepared as described for Sample D of Table 5, and having >3.9 mg/cm² loading of active material, was assembled in a Teflon® and stainless steel Swagelok® test vessel with lithium metal foil (Alfa Aesar, Ward Hill, Mass., USA) as the counterelectrode and CELGARD® 2400 (Hoechst Celanese, Charlotte, N.C., USA) as separator. The liquid electrolyte used was 1:1 by wt ethylene carbonate and diethyl carbonate with 1M LiPF$_6$ added as the conductive salt.

Figure 19:
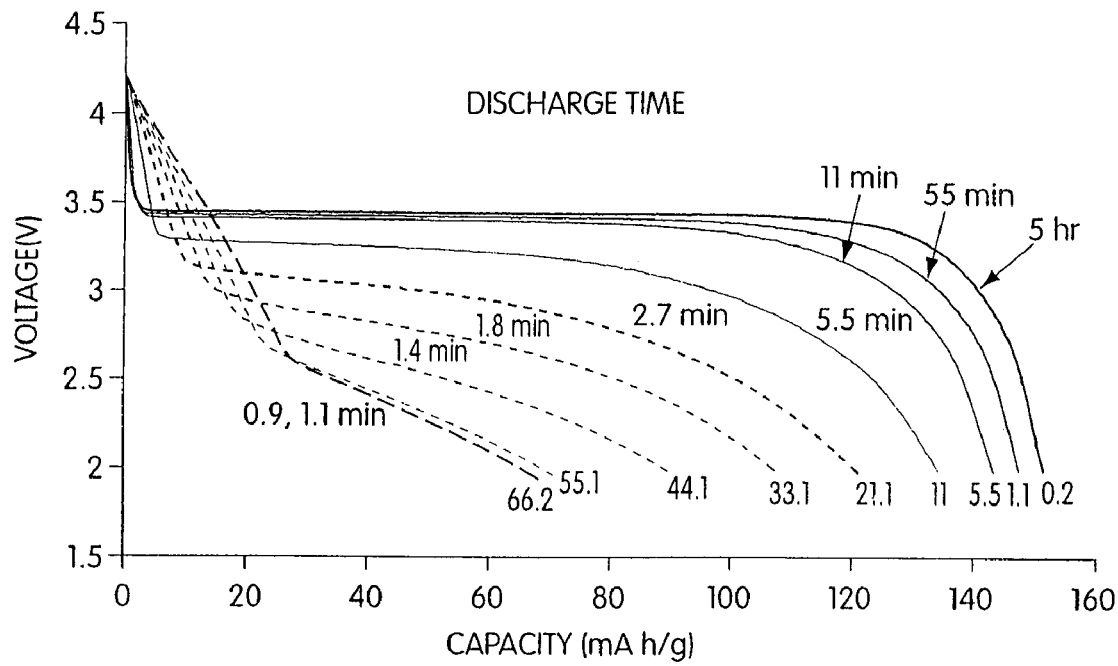
FIG. 19 shows discharge curves for continuous cycling between 2-4.2V for an electrode made using Li$_{0.99}$Zr$_{0.01}$FePO$_4$ powder and tested to discharge rates of 66.2C (9.93 A/g) at a temperature of 42° C. in a conventional cell design using a lithium metal negative electrode and nonaqueous liquid electrolyte.

FIG. 19A shows discharge capacities measured at 42° C. observed in continuous cycling tests. For the curve labeled 0.2C, the cell was charged and discharged at a current rate of 0.2C (30 mA/g) between the voltage limits of 2-4.2V. For the other curves, the cell was charged at a rate of 1.1 C (165 mA/g) and then discharged at the rates shown. It is seen that this cell maintains a significant discharge capacity and relatively little polarization upon discharging at rates as high as 66.2C (9.93 A/g). Compared to previously reported electrochemical test data for LiFePO$_4$, this cell can be discharged at a remarkably high power density while still having significant energy density.

Table 5, Sample F, E, G, H.

Sample F was prepared from a composition (Li$_{0.99}$Zr$_{0.01}$)FePO$_4$, fired at 600° C. in Ar according to the methods of Example 2, and having a specific surface area of 41.8 m²/g. It was formulated into an electrode by mixing 79 wt % of the active material, 10 wt % of SUPER P™ carbon, and 11 wt % Kynar 2801 binder in γ-butyrolactone as solvent, using the procedures of Sample D and C. After casting and drying, the coating was immersed in a plasticizing solvent of 15 wt % propylene carbonate in methanol, then pressed and dried. The resulting positive electrode (cathode) was tested against a lithium metal foil counterelectrode (anode) in a Swagelok cell assembly using CELGARD® 2500 separator film and 1:1 EC:DEC with 1M $LiPF_6$ liquid electrolyte.

Figure 20:
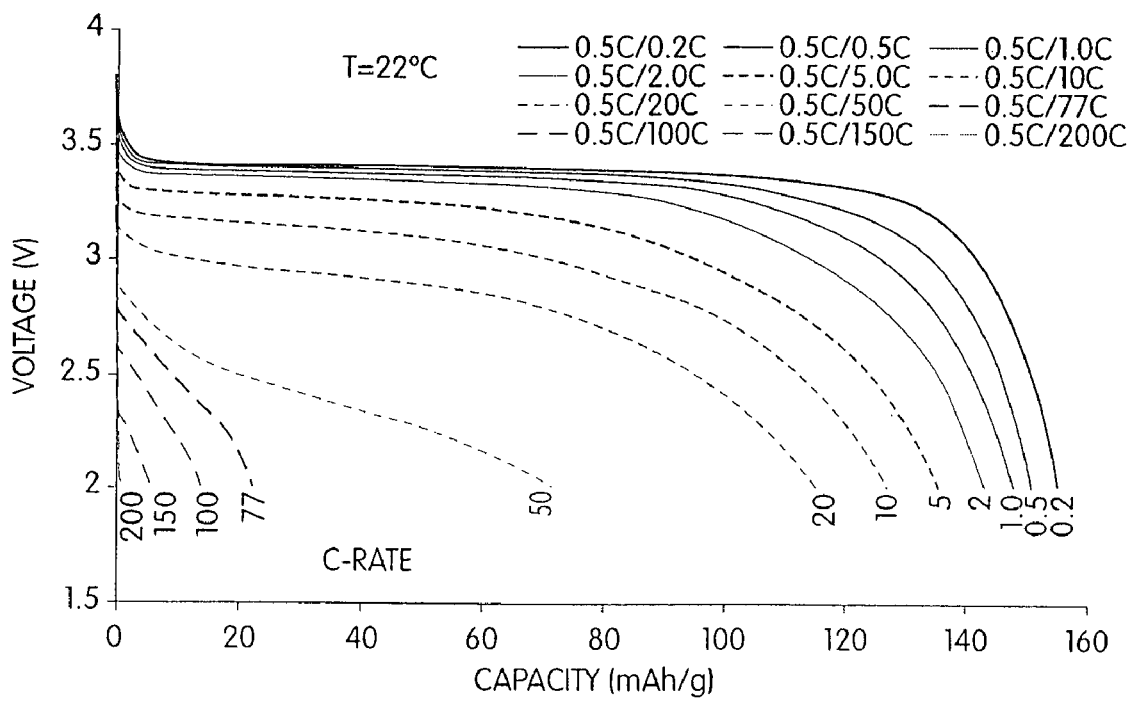
FIG. 20 shows discharge curves for constant-current constant-voltage cycling between 2-3.8V for an electrode made using Li$_{0.99}$Zr$_{0.01}$FePO$_4$ powder and tested to discharge rates of 200C (30 A/g) at a temperature of 22° C. in a conventional cell design using a lithium metal negative electrode and nonaqueous liquid electrolyte.

FIG. 20 shows discharge curves for this cell measured by the constant-current constant-voltage (CCCV) method whereby the cell was first charged at 0.5C rate (75 mA/g), then held at the upper limiting voltage of 3.8V until the charging current decayed to 0.001 mA, before discharging to 2V at the stated rate. Note that in comparison to FIG. 19, the initial linear behavior upon discharge is not seen, indicating that the linear region is a capacitive response due to incomplete equilibration in the cell. (In later calculations of the energy density of cell tested in continuous cycling, the capacity of this linear region is not included.) The results in FIG. 20 show quite remarkably that even at a 50C (7.5 A/g) discharge rate, about half of the capacity available at C/5 rate is provided by the cell.

Figure 21:
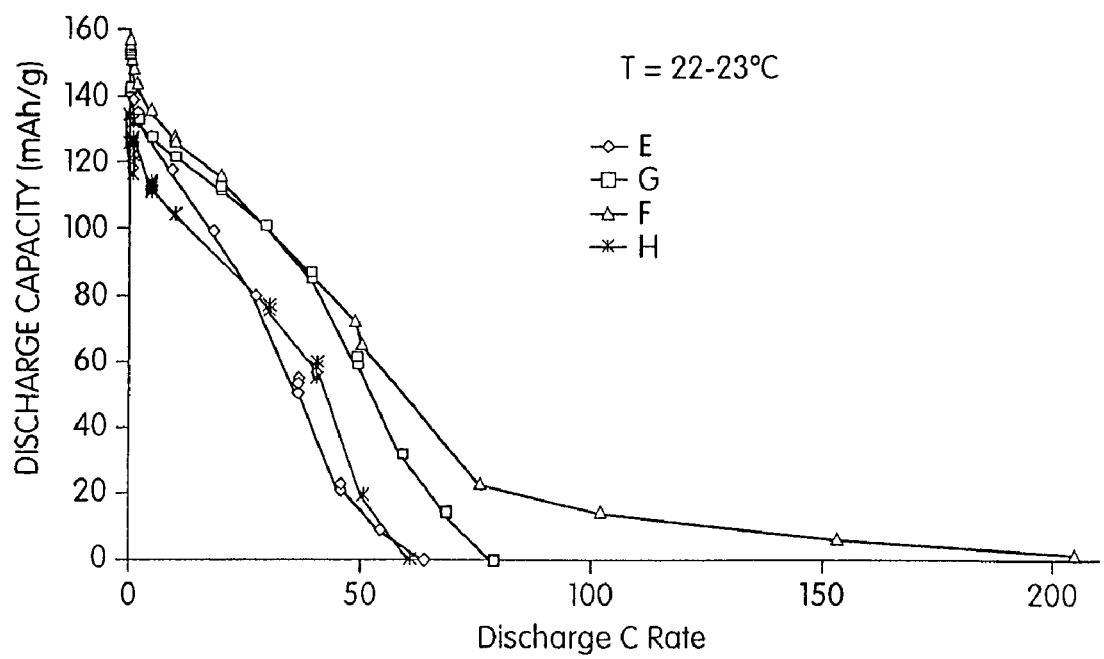
FIG. 21 shows discharge capacity vs. discharge rate curves for several electrodes formulated using Li$_{0.99}$Zr$_{0.01}$FePO$_4$ powder heat treated at 600° C. or 700° C., and tested to high discharge rates greater than 60C (9 A/g) at 22-23° C. in a conventional cell design using a lithium metal negative electrode and nonaqueous liquid electrolyte.

FIG. 21 compares the discharge energy density of Sample F with Samples E, G, and H from Table 5. All tests were conducted at 22-23° C. Sample G was prepared in the same manner as Sample F, and was tested by continuous cycling according to the procedure of Sample C. Sample E was prepared and tested in the same manner as Sample G, except that the electrode was not plasticized. Sample H was prepared from a powder fired to a higher temperature than the others in FIG. 21, 700C in Ar, and has a lower specific surface area of 26.4 $m^2/g$, and used Kynar 461 binder, but was otherwise processed and tested in like manner. It is seen that all four of the samples in FIG. 21 exhibit a remarkably high capacity at high discharge C rates.

Table 5, Samples A and B

Figure 22:
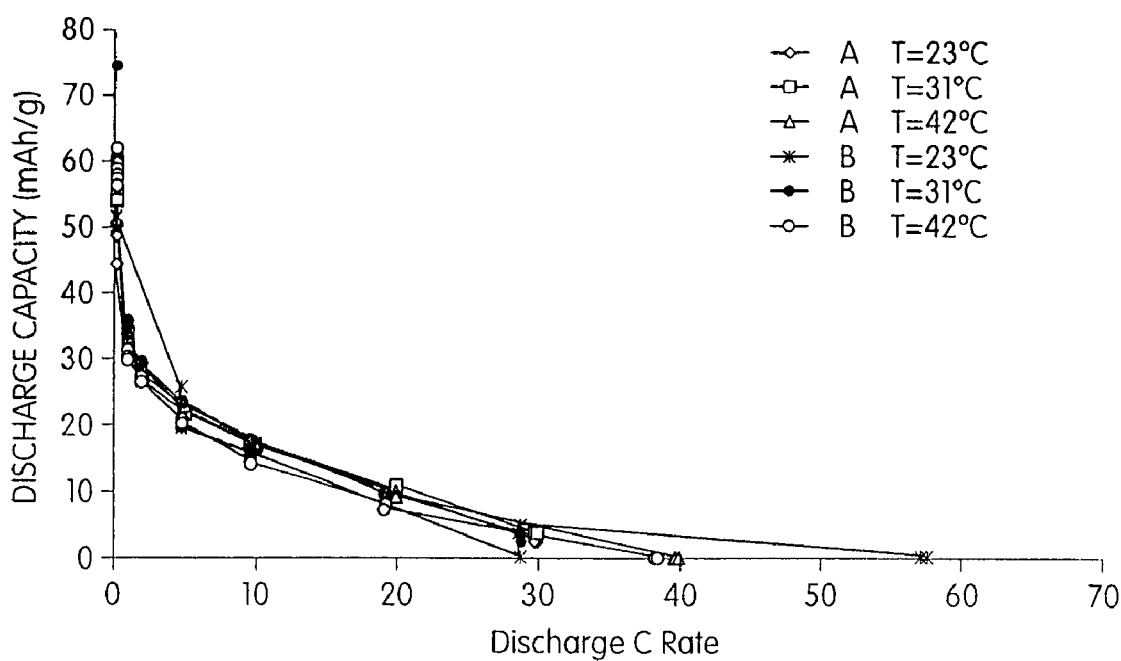
FIG. 22 shows discharge capacity vs. discharge rate curves for two electrodes formulated using undoped LiFePO$_4$ powder heat treated at 700° C., and tested at 23° C. in a conventional cell design using a lithium metal negative electrode and nonaqueous liquid electrolyte.

Samples A and B were prepared from undoped $LiFePO_4$, which after firing at 700C has a relatively low specific surface area of 3.9 $m^2/g$. The electrodes were prepared and tested in like manner to Sample H in Table 5, and the results are shown in FIG. 22, measured at 23, 31, and 42° C. Unlike the results in FIG. 21, however, the undoped samples show greatly inferior discharge capacity that falls to about 20 mAh/g by about 5C (750 mA/g) rate. It is also seen in FIG. 22 that heating to a temperature of 42° C. does not significantly improve the discharge capacity.

Comparison with Literature Data

Figure 23:
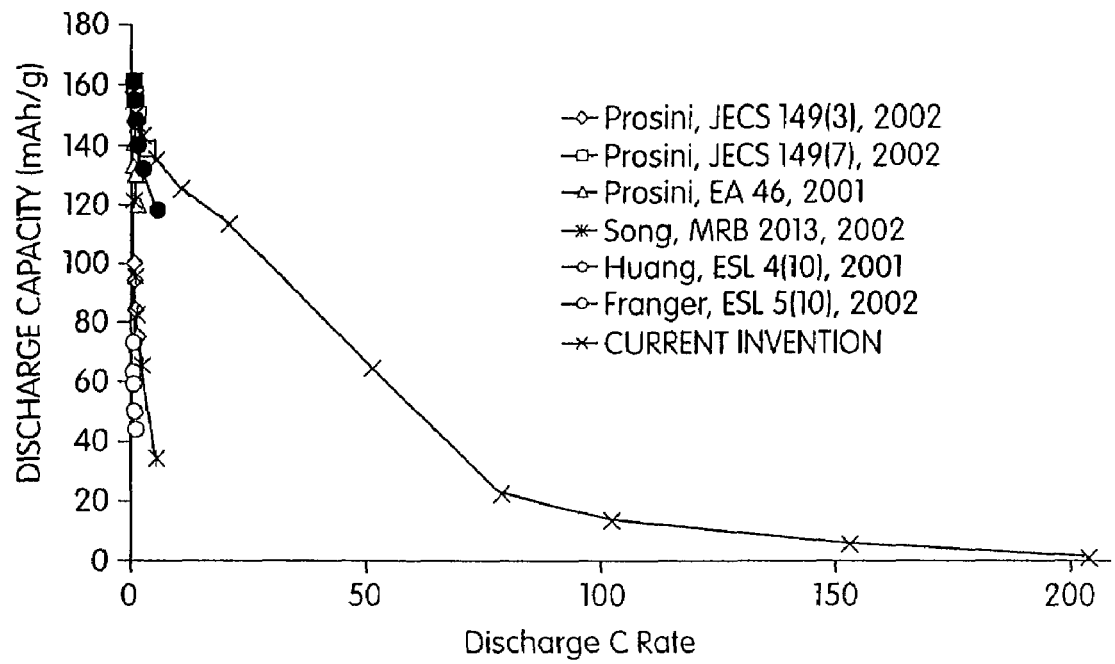
FIG. 23 shows discharge capacity vs. discharge rate curves for several LiFePO4 electrodes described in published literature, compared to an electrode of the invention containing Li$_{0.99}$Zr$_{0.01}$FePO$_4$ powder, showing the markedly higher discharge capacity available at high discharge rates of the electrodes of the invention.

Electrochemical test results have been reported for several $LiFePO_4$-based electrodes in the published literature. FIG. 23 compares the results from Sample F in Table 5 to results from several published papers. It is seen that the electrodes of the invention have markedly higher discharge capacity at high rates, whereas the literature data typically shows a rapid decrease in capacity with increasing rate at rates below 5C or 10C rate. This comparison illustrates the novel high performance properties of the lithium storage materials and electrodes of the current invention.

Energy Density vs. Current Density

Figure 24:
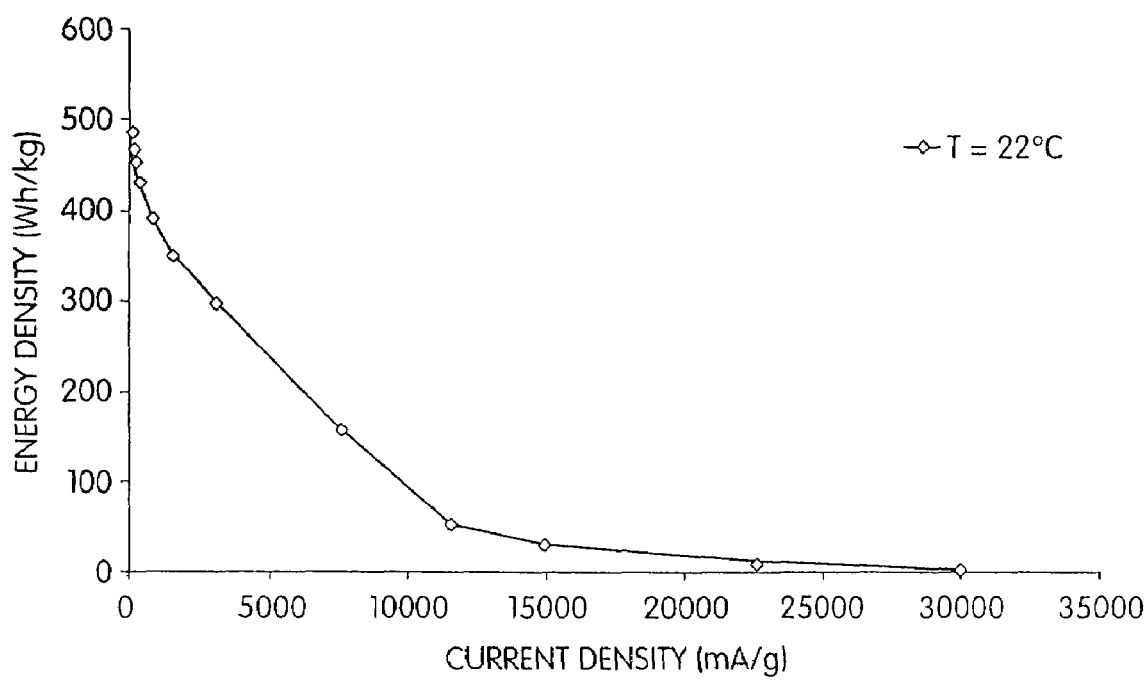
FIG. 24 shows the discharge energy density in mAh/g vs. the current density in mA/g for an electrode formulated using Li$_{0.99}$Zr$_{0.01}$FePO$_4$ powder and measured at a temperature of 22° C.
Figure 25:
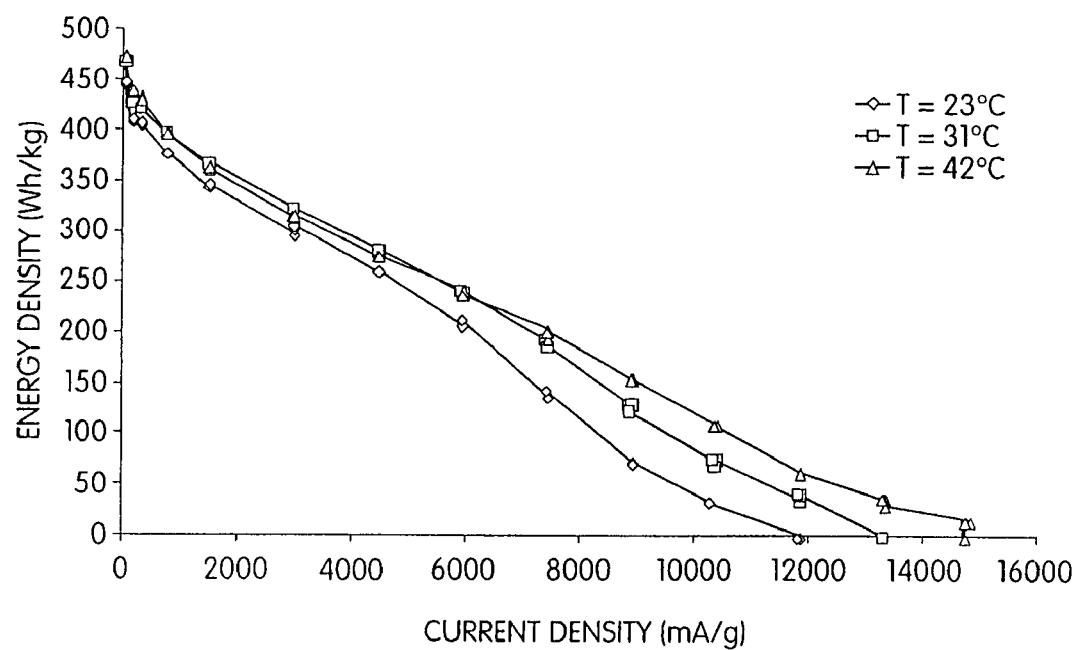
FIG. 25 shows the discharge energy density in mAh/g vs. the current density in mA/g for an electrode formulated using Li$_{0.99}$Zr$_{0.01}$FePO$_4$ powder and measured at temperatures of 23, 31, and 42° C.
Figure 26:
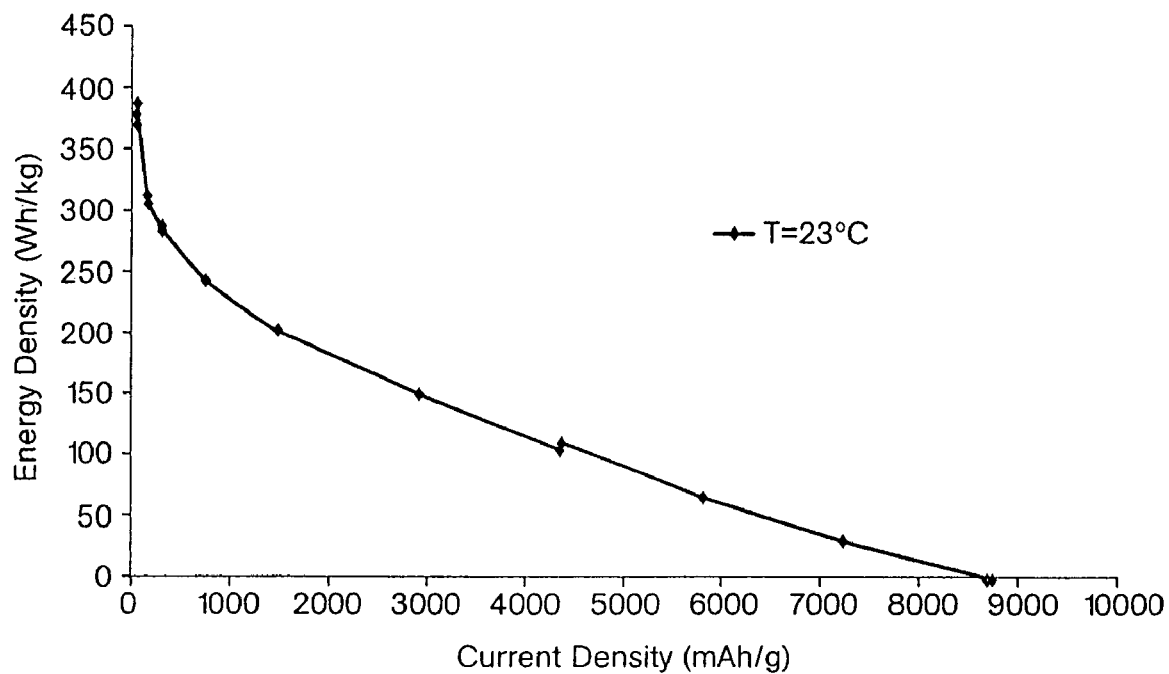
FIG. 26 shows the discharge energy density in mAh/g vs. the current density in mA/g for an electrode formulated using Li(Fe$_{0.98}$Ti$_{0.02}$)PO$_4$ powder and measured at 23° C.
Figure 27:
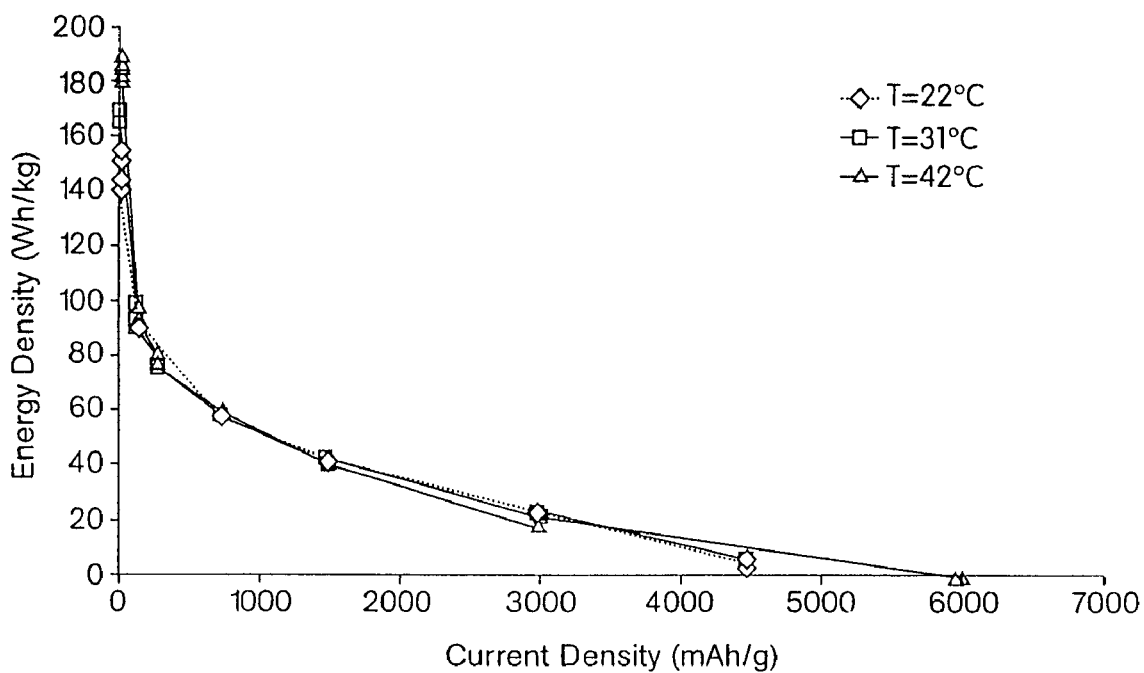
FIG. 27 shows the discharge energy density in mAh/g vs. the current density in mA/g for an electrode formulated using undoped LiFePO4 and measured at temperatures of 23, 31, and 42° C.

In FIGS. 24-27, we show the discharge energy density available from the total mass of storage compound available in several electrodes of Table 5, plotted against the current per gram of storage material. The energy densities are obtained by integrating the voltage vs. charge capacity curves. In FIG. 24, results from Sample F are shown for a measurement temperature of 22° C.; in FIG. 25, results for Sample G are shown for measurement temperatures of 23, 31, and 42° C.; in FIG. 26, results for Sample I measured at 23° C.; and in FIG. 27, results are shown for Sample A for measurement temperatures of 23, 31, and 42° C. Comparing FIGS. 24-26 with FIG. 27, the vast improvement in the energy density of the lithium storage materials of the invention compared to undoped $LiFePO_4$ is clearly seen

EXAMPLE 5

Storage Battery Cells

Example 4 illustrates the high discharge capacity available from the lithium storage compounds of the invention, and electrodes utilizing said compounds, at high discharge rates. Having shown clearly the improved electrochemical properties of the lithium storage compounds and electrodes of the invention, we now illustrate storage battery cells of exceptional power density and high energy density based on these compounds and electrodes.

It is well-known that typical lithium-ion batteries based on laminated electrodes and designed for high energy density contain 25-35% by weight and 13-18% by volume of the positive electrode storage compound, typically $LiCoO_2$. While more detailed calculations of the weight and volume fractions of materials are used for specific designs, these approximate values provide an adequate basis for determining the energy density and power density of conventional cell designs utilizing the present lithium storage compounds. Accounting for the 29% lower crystal density of $LiFePO_4$ compared to $LiCoO_2$, and assuming a somewhat lower packing density due to the high specific surface area, it is conservatively estimated that an optimized cell could contain 10-20 wt % of the positive electrode active material. Using the results of Example 4 for electrodes tested against lithium metal negative electrodes, and taking into account its slightly lower cell voltage when used in conjunction with a carbon electrode (3.25 vs. 3.7 V), the power density—energy density results shown in FIG. 28 are obtained. Results are shown for 10 wt %, 15 wt %, and 20 wt % of the positive electrode active material. Power and energy densities for complete discharge of a cell of 800-1500 W/kg and 30-60 Wh/kg at a 20C (3 A/g) rate, 1500-4200 W/kg and 15-30 Wh/kg at a 50C (7.5 A/g) rate, and 2500-5000 W/kg and 5-10 Wh/kg at a 80C (12 A/g) rate, are obtained. Such cells could provide power densities not possible in current nickel metal-hydride (400-1200 W/kg, 40-80 Wh/kg) and lithium-ion battery technology (800-2000 W/kg, 80-170 Wh/kg). These capabilities, in a low-cost and ultra-safe storage material, may be especially attractive for high power and large battery applications including but not limited to power tools and hybrid and electric vehicles.

EXAMPLE 6

Doping From Milling Media and Containers

This example shows that doping to yield high electronic conductivity can be accomplished by using suitable milling media and containers. It also shows that the high electronic conductivity of the materials of the invention is obtained without excessive carbon or other conductive additives. Table 6 shows the results of carbon and zirconium analysis of several materials prepared according to the methods of Examples 1 and 2. It is seen that milling with ⅜" $ZrO_2$ milling media can add a detectable concentration of Zr to the samples. Amongst the nominally undoped samples, a high conductivity of about $10^{-3}$ S/cm is observed when the Zr concentration from the milling media is 0.018. Taking this added Zr into account, the composition of the sample is of type $Li_{1-a}Zr_aFePO_4$, similar to other high conductivity samples. It is also seen that the polypropylene milling jar has added some excess carbon to this sample. When ¼" $ZrO_2$ milling media are used, negligible Zr doping occurs. An undoped sample fired at 800C has 0.25 wt % carbon, and a low conductivity of $10^{-8}$ S/cm.

Lightly doped samples such as in Table 1 that have been milled with zirconia milling media can thus also be doped with Zr in addition, improving the conductivity.

The four Zr and Nb doped samples, were formulated to have $Li_{1-a}M''_aFePO_4$ composition and have high electronic conductivity. The concentration of carbon is less than 2 weight percent in one instance, and less than 1 weight percent in the other three instances. The sample of highest conductivity, $10^{-2}$ S/cm, has the lowest carbon concentration, only 0.32 weight percent, nearly the same as the highly insulating undoped samples. The sample with the highest carbon concentration has the lowest conductivity. These results show that the high electronic conductivity of doped samples is not correlated with carbon concentration but instead with doping as described herein.

composition $(Li_{0.99}Nb_{0.01})FePO_4$ that provides good electronic conductivity. A batch of powder was formulated according to the following proportions of starting materials:

| 1 mole % Nb-doped $LiFePO_4$ | |
|---|---|
| | ~4 g batch |
| $NH_4H_2PO_4$ | 2.3006 g (99.998%, Alfa-Aesar) |
| $Li_2CO_3$ | 0.7316 g (99.999%, Alfa-Aesar) |
| $Fe(CH_3COO)_2$ | 3.7867 g (99.9%, Alfa-Aesar) |
| $Nb(C_6H_5O)_5$ | 0.1116 g (Alfa-Aesar) |

Each of the components was weighed in an argon-filled glove box. They were then removed from the glove box and ball milled, using zirconia milling balls (~¼" diameter, 400-450 g total weight) in a porcelain milling jar (300 ml capacity) for 24 hours in acetone (150-160 ml) at 230 rpm. The milled mixture was dried at a temperature not exceeding 80° C., and then ground with a mortar and pestle in the argon-filled glove box. The mixture was then heat treated in two steps. A first heat treatment at 350° C. for 10 hours was conducted in a flowing Ar (99.999% purity) atmosphere (>400 cc/min). The powder sample was then ground in

TABLE 6

Carbon analysis of conductive lithium iron phosphate materials.

| Composition | Preparation Method | Carbon (wt %) | Zr (wt %) | Conductivity 2-probe (S/cm) |
|---|---|---|---|---|
| Undoped (large batch) 700° C. | Polypropylene bottle, ⅜" $ZrO_2$ media | 0.25 | 0.009 | $10^{-10}$ |
| Undoped ($Li_{0.99}FePO_4$) 700° C. | Polypropylene bottle, ⅜" $ZrO_2$ media | 2.41 | 0.018 | ($\sim 10^{-3}$) |
| Undoped 800° C. | Porcelain jar, ¼" $ZrO_2$ media | 0.25 | | $10^{-8}$ |
| 1% Zr doped 700° C. | Porcelain jar, ¼" $ZrO_2$ balls | 1.46 | | $10^{-4}$ |
| 1% Zr doped 800° C. | Porcelain jar, ¼" $ZrO_2$ balls | 0.86 | | $10^{-3}$ |
| 1% Nb doped 800° C. | Porcelain jar, Tiny $ZrO_2$ balls | 0.56 | | $10^{-3}$ |
| 1% Nb doped 800° C. | Polypropylene bottle, ⅜" $ZrO_2$ media | 0.32 | | $10^{-2}$ |

EXAMPLE 7

Compositions With Dopant Not in Solid Solution

In this example, as in Example 1, it is shown that when a doped composition similar to the preceding examples of high electronic conductivity is prepared, but the dopant is not in solid solution, then the composition is not conductive. In Example 2, it was shown that a composition $Li_{0.99}Nb_{0.01})FePO_4$ has markedly improved conductivity and electrochemical storage properties compared to an undoped $LiFePO_4$ when the Nb dopant is in solid solution in the crystal lattice. Here it is shown that the same composition prepared with the dopant not in solid solution, but precipitated as a secondary phase, is substantially insulating.

1 mole % Nb-doped $LiFePO_4$ was prepared using iron acetate, $Fe(CH_3COO)_2$ as the Fe precursor. Niobium phenoxide, $Nb(C_6H_5O)_5$ was used as the source of the dopant. The theoretical content of Fe in iron acetate is 32.12 wt %. However, the iron content of iron acetate frequently deviates from the ideal value. Thus it was expected that the composition of the compound would deviate from a nominal laboratory air atmosphere, using a mortar and pestle, and subjected to a second heat treatment at a higher temperature (600° C. to 700° C.) for 20 hours, in flowing Ar gas (>400 cc/min). The heating and cooling rates for each step were 5° C./min. Before heating, purging of the furnace tube in flowing Ar for about 1 hour was conducted.

In contrast to the cases where iron oxalate ($FeC_2O_4.2H_2O$) is used as the starting materials, a 2-probe resistance measurement of this sample showed that the conductivity is less than $10^{-7}$ S/cm at a temperature of 23-27° C. X-ray diffraction of a sample fired at 600C for 20 h in Ar showed that it was predominantly LiFePO4 but had a small amount of an unidentified secondary phase. TEM analysis showed that the dopant Nb was not detectable inside the particles, but was segregated as a secondary phase. Furthermore, the specific surface area of this material was much lower than it is in samples prepared so that the Nb dopant is in solid solution, being 14.3 $m^2/g$ for 600C firing. Thus it is shown that, when in this material, a substantial amount of the added Nb dopant is not in solid solution in the crystalline particles, an increased conductivity is not observed, nor is the advantageous feature of metal additives of diminishing the crystallite size realized. It is understood that the iron acetate precursor, being a suitable reactant for the formation of LiFePO$_4$, is suitable for producing highly conductive compositions when the overall composition is known and more precisely controlled.

EXAMPLE 8

Solid State Reaction Synthesis of LiFePO$_4$

This example describes the preparation of LiFePO$_4$, using wustite iron oxide, FeO, and lithium metaphosphate, LiPO$_3$, as precursors. An advantage of these precursors is that they form a closed or nearly closed reaction system, by which it is meant that upon heat treatment, few if any gaseous species are produced as a reaction by product. Adjustments to the relative amounts of the reactants, and the addition of other constituents such as the dopants in the form of oxides can be used in order to obtain compositions comprising the materials of the invention.

A batch of 6 g LiFePO$_4$ was prepared by using starting materials of the following amounts: 2.733 g FeO (99.5%, Alfa-Aesar, Ward Hill, Mass., USA) and 3.267 g LiPO$_3$ (97%, City Chemical LLC., West Haven, Conn., USA). The components were weighed in an Ar-filled glove box, and transferred to a porcelain jar and ball-milled in acetone for 48 h using zirconia milling balls. The acetone was evaporated from the milled powder at a low temperature (<100° C.), and the dried powder was ground with a mortar and pestle and pressed into pellets. The pellets were embedded in loose powder of the same material and placed in alumina crucibles and subjected to a single heat treatment under Ar atmosphere at 550-900° C. for 20 h.

The heat-treated samples were light to medium grey in color. Predominantly single-phase LiFePO$_4$ was obtained for all heat-treatment temperatures, as identified by X-ray diffraction. Minor amounts of Fe$_2$P and Fe phases were detected by XRD at heat-treatment temperatures at and above 600° C.

EXAMPLE 9

Solid State Reaction Synthesis of Nb-doped LiFePO$_4$

Conductive compositions of the invention are obtained using the starting materials and basic procedure of Example 8, and by adding dopants in the form of oxides, hydroxides or alkoxides to obtain the dopant metal ion in the preferred valence state. A conductive sample with the nominal formulation LiFePO$_4$+1 mole % Nb was prepared using the precursors of Example 8 and adding a small amount of the dopant niobium phenoxide, Nb(C$_6$H$_5$O)$_5$. A batch of about 1 g powder was prepared by using 0.4530 g FeO, 0.5416 g LiPO$_3$ and 0.0352 g Nb(C$_6$H$_5$O)$_5$ (99.99%, Alfa-Aesar, Ward Hill, Mass., USA). The powders were milled, as described in Example 6, and then pressed into pellets and heat-treated under Ar atmosphere at 600° C. for 20 h. Some sintered pellets were also annealed at 850° C. to obtain more densified samples or samples with more coarsened crystallites.

In contrast to the undoped powder of Example 8, the resulting powder was dark grey in color, which gave an indication of increased electronic conductivity, compared to the undoped sample. X-ray diffraction analysis showed predominantly a single crystalline phase of the triphylite LiFePO$_4$ structure. Resistance measurements were made using a two-contact method with metal probes located about 5 mm apart on the fired pellets, and showed a resistivity of about 150 kΩ, in contrast to the insulating sample of Example 8, which when made by the same procedure and from the same starting materials except for the absence of doping with niobium phenoxide showed a resistance of >200 mega ohms (MΩ). Thus it is shown that the doped compositions of the invention prepared according to the methods of this example provide an increased electronic conductivity compared to an undoped composition.

EXAMPLE 10

Solid State Reaction Synthesis of Conductive LiFePO$_4$

In this example, doped LiFePO$_4$ with increased electronic conductivity is prepared using the starting materials and methods of Example 8 and 9, except that the conductive compositions of the invention are obtained by adding dopants in the form of oxides wherein the dopant are in the preferred final valence state, including but not limited to TiO$_2$, Nb$_2$O$_5$, Ta$_2$O$_5$, ZrO$_2$, Al$_2$O$_3$, MgO, or WO$_6$. The dopant oxide is added to the starting mixture of reactants in a quantity sufficient to give a desired concentration in the final product. Using the mixing and firing procedures of Examples 8 and 9, conductive compositions of the invention are obtained.

EXAMPLE 11

Solid-state Reaction Synthesis

This example describes the all-solid state reaction synthesis of LiFePO$_4$ or conductive doped LiFePO$_4$, using wustite iron oxide, FeO, lithium oxide, Li$_2$O, and phosphorous(V) oxide, P$_2$O$_5$, as precursors to the major metallic constituents and metal alkoxides and metal oxides as the source of the dopants. This set of precursors also forms a closed or nearly closed reaction system, from which few if any gaseous species are evolved during synthesis.

A batch of 12 g LiFePO$_4$ was prepared by using starting materials of the following amounts: 5.463 g FeO (99.5%, Alfa-Aesar, Ward Hill, Mass., USA), 1.136 g Li$_2$O (99.5%, Alfa-Aesar, Ward Hill, Mass., USA) and 5.398 g P$_2$O$_5$ (99.99%, Alfa-Aesar, Ward Hill, Mass., USA). The components were weighed in an Ar-filled glove box, transferred to a polypropylene jar and ball-milled for 48 h using zirconia milling balls. Special precautions were taken to avoid any exposure of the reactant mixture to air, due to the very hygroscopic nature of P$_2$O$_5$. For instance, a liquid milling medium (e.g. acetone) was not added prior to milling. The dry, milled powder was extracted from the milling jar in the glove box, ground with mortar and pestle and pressed into pellets. The pellets were placed in alumina crucibles and subjected to a single heat treatment at 550° C. or 850° C. for 20 h., after which the samples were found by X-ray diffraction to contain LiFePO$_4$ as the major crystalline phase. Doped samples are prepared in the same manner, except with the addition of a dopant salt such as a metal alkoxide or metal oxide prior to the mixing and milling steps.

EXAMPLE 12

Solid-state Reaction Synthesis

This example describes the preparation of undoped or doped LiFePO$_4$, using iron oxalate, FeC$_2$O$_4$.2H$_2$O, and lithium metaphosphate, LiPO$_3$, as precursors. Gaseous species formed during synthesis are limited to one formula unit carbon dioxide CO$_2$, one formula unit carbon monoxide CO and two formula units water H$_2$O per formula unit reacted FeC$_2$O$_4$.2H$_2$O.

A batch of 1 g LiFePO$_4$ was prepared by using starting materials of the following amounts: 1.134 g FeC$_2$O$_4$.2H$_2$O (99.99%, Aldrich, Milwaukee, Wis., USA) and 0.5410 g LiPO$_3$ (97%, City Chemical LLC., West Haven, Conn., USA). The components were weighed in an Ar-filled glove box, and ball milled in acetone in a porcelain jar for about 24 h, using zirconia milling balls. The acetone was evaporated from the milled powder at a low temperature (<100° C.), and the dried powder was ground using a mortar and pestle. The milled powder was heat treated at 350° C. for 10 h under flowing Ar gas. The heat-treated powder samples were then ground again with a mortar and pestle and pressed into pellets before a second heat-treatment step. The pellets were placed in alumina crucibles and heated to 600° C. or 700° C. for 20 h under Ar gas. X-ray diffraction showed that a predominantly single-phase LiFePO$_4$ was obtained for both heat-treatment temperatures. A minor amount of another detectable phase (2θ~27, 28, 30 and 31°) was also observed. Doped samples are prepared in the same manner, except with the addition of a dopant salt prior to mixing and milling.

EXAMPLE 13

Solid-state Reaction Synthesis

This example describes the preparation of undoped or doped LiFePO$_4$, using iron oxalate, FeC$_2$O$_4$.2H$_2$O, lithium oxide, Li$_2$O, and phosphorous(V) oxide, P$_2$O$_5$, as precursors. The formation of gaseous species during synthesis is limited to one formula unit carbon dioxide CO$_2$, one formula unit carbon monoxide CO and two formula units water H$_2$O per formula unit reacted FeC$_2$O$_4$.2H$_2$O.

A batch of 1 g LiFePO$_4$ was prepared by using starting materials of the following amounts: 1.134 g FeC$_2$O$_4$.2H$_2$O (99.99%, Aldrich, Milwaukee, Wis., USA), 0.09421 g Li$_2$O (99.5%, Alfa-Aesar, Ward Hill, Mass., USA) and 0.4475 g P$_2$O$_5$ (99.99%, Alfa-Aesar, Ward Hill, Mass., USA). The components were weighed in an Ar-filled glove box, and dry-milled in a porcelain jar for about 24 h using zirconia milling balls. The milled powder was extracted from the milling jar in the glove box and ground using a mortar and pestle. The powder was then heat treated at 300° C. for 10 h under flowing Ar gas, ground again and pressed into pellets before a second heat treatment step. The pellets were placed in alumina crucibles and heated to 600° C. or 700° C. for 20 h under Ar gas. X-ray diffraction showed a predominantly single-phase LiFePO$_4$ for both heat-treatment temperatures. A minor amount of another detectable phase (2θ~27 and 28°) and possibly a minor amount of Fe$_3$O$_4$ was also observed. Doped samples are prepared in the same manner, except with the addition of a dopant salt prior to mixing and milling.

EXAMPLE 14

Chemically Delithiated Doped Conductive LiFePO$_4$

This example describes the chemical delithiation of a doped and conductive LiFePO$_4$, after which it remains highly electronically conductive as predominantly an FePO$_4$ phase. The chemical reduction of LiFePO$_4$ was conducted by the addition of a strong reducing agent, in this case nitronium hexafluorophosphate, NO$_2$PF$_6$, to a suspension of the starting material and acetonitrile, CH$_3$CN. Nitrogen dioxide gas, NO$_2$, and solvated lithium hexafluorophosphate, LiPF$_6$, is formed during the reaction together with the reduced FePO$_4$, according to:

LiFePO$_4$(s)+NO$_2$PF$_6$(sol.) →NO$_2$(g)+LiPF$_6$(sol.)+ FePO$_4$(s) (sol.=solvated)

Specifically a powder of (Li$_{0.99}$Nb$_{0.01}$) FePO$_4$ was delithiated. To obtain a relatively complete level of delithiation, the molar ratio NO$_2$PF$_6$: (Li$_{0.99}$Nb$_{0.01}$) FePO$_4$ was set to 2:1. For a batch of 0.6 g (Li$_{0.99}$Nb$_{0.01}$) FePO$_4$ (prepared according to Example 2), an amount of 1.453 g of NO$_2$PF$_6$ (98%, Matrix Scientific, Columbia, S.C., USA) was used. Both reactants were weighed in an Ar-filled glove box and transferred to a filtering flask equipped with a rubber stopper. A thin glass tube was fitted through a hole in the rubber stopper and a silicone tube was fitted to the tubulation opening on the flask side. 100 ml of acetonitrile (99.998%, anhydrous, Alfa-Aesar, Ward Hill, Mass., USA) was added to the beaker, and the glass tube was adjusted so that the tip was positioned under the liquid surface. The resulting concentration of NO$_2$PF$_6$ in the solution was ca. 0.08 M. A flow of Ar gas was introduced at the glass tube end, so that the gaseous species formed during the reaction were led away through the silicone tube to an exhaust hood. The reaction was allowed to proceed for 24 h, while stirring with a magnetic stirrer. The resulting powder was separated from the solution by filtering through a Buichner funnel equipped with filter paper (#595, Schleicher & Schuell). The powder was thoroughly rinsed in pure acetonitrile and dried under vacuum for two hours. The remaining powder was analysed by X-ray diffraction and showed a single-phase orthorhombic FePO$_4$ structure. The powder was black in color, and when pressed into a pellet, was highly conductive. Thus this example shows that the compounds of the invention remain highly electronically conductive upon delithiation, and that a partially delithiated compound comprises two phases, one relatively highly delithiated and the other relatively delithiated, both of which are electronically conductive.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. Accordingly, those skilled in the art would recognize that the use of an electrochemical device in the examples should not be limited as such. The present invention is directed to each individual feature, system, or method described herein. In addition, any combination of two or more such features, systems or methods, if such features, systems or methods are not mutually inconsistent, is included within the scope of the present invention.

What is claimed is:

1. An electrode comprising an olivine compound having a composition Li$_x$M'$_y$M''$_a$(PO$_4$), and a specific surface area of at least 15 m²/g, wherein M' is at least iron, M" is niobium, x is equal to or greater than 0, and a and y are greater than 0.

2. The electrode of claim 1, wherein the compound can intercalate at least one of an alkali metal or hydrogen.

3. The electrode of claim 1, wherein M' is $Fe^{2+}$.

4. The electrode of claim 1, wherein the compound is substantially free of silicon.

5. The electrode of claim 1, wherein the compound, upon delithiation, undergoes phase-separation into a substantially lithiated compound and a substantially delithiated compound, at least one of which have an electronic conductivity of at least $10^{-6}$ S/cm.

6. The electrode of claim 1, wherein x has a value between zero and about 1, and y is about 1.

7. The electrode of claim 1, wherein the compound has at least one of an ordered or partially disordered olivine structure.

8. The electrode of claim 1, wherein the compound has an olivine structure and contains in crystalline solid solution, amongst the metals M' and M", simultaneously metal ions of at least one type that is oxidizable and another that is reducible at 23° C.

9. The electrode of claim 1, wherein the compound has an olivine structure, and an average ionic radius of the M' ions is larger than an ionic radius of Nb.

10. The electrode of claim 1, wherein the compound comprises a crystalline solid solution of a composition selected from the group consisting of $Li_x vac_y(M'_{1-a}M''_a)PO_4$, $Li_{x-a-y}M''_a vac_y M'PO_4$, $Li_x(M'_{1-a-y}M''_a vac_y)PO_4$ and $Li_{x-a}M''_a M'_{1-y} vac_y PO_4$, wherein the olivine compound defines two distinct metal sites M1 and M2 and vac represents a vacancy in any of an M1 and M2 site of the olivine compound.

11. The electrode of claim 1, wherein the divine compound defines two distinct metal sites M1 and M2 and lithium is substituted onto a M2 site of a crystal of the compound at a concentration of at least $10^{18}$ per cubic centimeter.

12. The electrode of claim 1, wherein the olivine compound defines two distinct metal sites M1 and M2 and x and a are selected such that lithium can substitute into an M2 site of a crystal of the compound.

13. The electrode of claim 1, wherein the composition is any of $Li_x(M'_{1-a}M''_a)PO_4$, $Li_x M''_a M'PO_4$, $Li_x(M'_{1-a-y}M''_a Li_y)PO_4$, or $Li_{x-a}M''_a M'_{1-y}Li_y PO_4$, wherein $0.0001 < a \leq 0.1$.

14. The electrode of claim 1, wherein the composition is any of $Li_x(Fe_{1-a}M''_a)PO_4$, $Li_x M''_a FePO_4$, $Li_x(Fe_{1-a-y}M''_a Li_y)PO_4$, or $Li_{x-a}M''_a Fe_{1-y}Li_y PO_4$, wherein $0.0001 < a \leq 0.1$.

15. The electrode of claim 1, wherein the composition is $Li_x vac_{1-x}(M'_{1-a}M''_a)PO_4$, $Li_x M''_a vac_{1-a-y}M'PO_4$, $Li_x(M'_{1-a-y}M''_a vac_y)PO_4$ or $Li_{x-a}M''_a M'_{1-y}vac_y PO_4$, wherein vac represents a vacancy in a structure of the compound and $0.0001 < a \leq 0.1$.

16. The electrode of claim 1, wherein the composition is $Li_x vac_{1-x}(Fe_{1-a}M''_a)PO_4$, $Li_x M''_a vac_{1-a-y}FePO_4$, $Li_x(Fe_{1-a-y}M''_a vac_y)PO_4$ or $Li_{x-a}M''_a Fe_{1-y}vac_y PO_4$, wherein vac represents a vacancy in a structure of the compound and $0.0001 < a \leq 0.1$.

17. The electrode of claim 1, wherein M" is substantially in solid solution in a crystal structure of the compound.

18. The electrode of claim 1, wherein M" is in solid solution in a crystal structure of the compound at a concentration of at least 0.01 mole % relative to M'.

19. The electrode of claim 18, wherein the concentration is at least 0.02 mole %.

20. The electrode of claim 18, wherein the concentration is at least 0.1 mole %.

21. The electrode of claim 1, wherein the compound forms primary crystallites, at least 50% of which have a smallest dimension less then 500 nm.

22. The electrode of claim 21, wherein the smallest dimension is less than 100 nm.

23. The electrode of claim 21, wherein the smallest dimension is less than 20 nm.

24. The electrode of claim 21, wherein the primary crystallites form an interconnected porous network.

25. The electrode of claim 21, wherein at least 25% of a surface area of the primary crystallites is available for contact with an electrolyte.

26. The electrode of claim 21, wherein at least 50% of a surface area of the primary crystallites is in contact with an electrolyte.

27. The electrode of claim 1, wherein the specific surface area is at least 20 m²/g.

28. The electrode of claim 1, wherein the specific surface area is at least 30 m²/g.

29. The electrode of claim 1, wherein the specific surface area is at least 50 m²/g.

30. The electrode of claim 1, wherein the compound has a conductivity of at least $10^{-6}$ S/cm at 27° C.

31. The electrode of claim 1, wherein the compound has a conductivity of at least $10^{-4}$ S/cm at 27° C.

32. The electrode of claim 1, wherein the compound has a conductivity of at least $10^{-2}$ S/cm at 27° C.

33. The electrode of claim 1, further comprising less than 15 weight percent of a conductivity-enhancing additive based on the weight of the compound.

34. The electrode of claim 33, wherein the conductivity-enhancing additive is present in an amount of less than 7 weight percent.

35. The electrode of claim 33, wherein the conductivity-enhancing additive is present in an amount of less than 3 weight percent.

36. The electrode of claim 33, wherein the conductivity-enhancing additive is present in an amount of less than 1 weight percent.

37. The electrode of claim 33, wherein the conductivity-enhancing additive comprises carbon.

38. The electrode of claim 1, wherein the electrode is adapted for incorporation into an electrochemical device.

39. The electrode of claim 1, formed by mixing an alkali metal salt, an iron compound, a phosphorus salt, and a compound selected from the group consisting of ethoxide and methoxide compounds comprising niobium; milling the mixture; and heat treating the mixture at a first temperature sufficient to form an olivine structure.

40. The electrode of claim 1 having an energy density available from the total mass of said compound tat while:
   charging or discharging at a rate $\geq 30$ mA per g of said compound, is greater than 350 Wh/kg, or
   charging or discharging at a rate $\geq 150$ mA per g of said compound, is greater than 280 Wh/kg, or
   charging or discharging at a rate $\geq 300$ mA per g of said compound, is greater than 270 Wh/kg, or
   charging or discharging at a rate $\geq 750$ mA per g of said compound, is greater than 250 Wh/kg, or
   charging or discharging at a rate $\geq 1.5$ A per g of said compound, is greater than 180 Wh/kg, or
   charging or discharging at a rate $\geq 3$ A per g of said compound, is greater than 40 Wh/kg, or
   charging or discharging at a rate $\geq 4.5$ A per g of said compound, is greater than 10 Wh/kg.

41. The electrode of claim 40, having an energy density available from the total mass of said compound that while:
  charging or discharging at a rate $\geq 30$ mA per g of said compound, is greater than 420 Wh/kg, or
  charging or discharging at a rate $\geq 150$ mA per g of said compound, is greater than 400 Wh/kg, or
  charging or discharging at a rate $\geq 300$ mA per g of said compound, is greater than 370 Wh/kg, or
  charging or discharging at a rate $\geq 750$ mA per g of said compound, is greater than 350 Wh/kg, or
  charging or discharging at a rate $\geq 1.5$ A per g of said compound, is greater than 270 Wh/kg, or
  charging or discharging at a rate $\geq 3$ A per g of said compound, is greater than 150 Wh/kg, or
  charging or discharging at a rate $\geq 4.5$ A per g of said compound, is greater than 80 Wh/kg, or
  charging or discharging at a rate $\geq 6$ A per g of said compound, is greater than 35 Wh/kg, or
  charging or discharging at a rate $\geq 7.5$ A per g of said compound, is greater than 50 Wh/kg, or
  charging or discharging at a rate $\geq 15$ A per g of said compound, is greater than 10 Wh/kg.

42. The electrode of claim 40, having an energy density available from the total mass of said compound that while:
  charging or discharging at a rate $\geq 30$ mA per g of said compound, is greater than 475 Wh/kg, or
  charging or discharging at a rate $\geq 150$ mA per g of said compound, is greater than 450 Wh/kg, or
  charging or discharging at a rate $\geq 300$ mA per g of said compound, is greater than 430 Wh/kg, or
  charging or discharging at a rate $\geq 750$ mA per g of said compound, is greater than 390 Wh/kg, or
  charging or discharging at a rate $\geq 1.5$ A per g of said compound, is greater than 350 Wh/kg, or
  charging or discharging at a rate $\geq 3$ A per g of said compound, is greater than 300 Wh/kg, or
  charging or discharging at a rate $\geq 4.5$ A per g of said compound, is greater than 250 Wh/kg, or
  charging or discharging at a rate $\geq 7.5$ A per g of said compound. is greater than 150 Wh/kg, or
  charging or discharging at a rate $\geq 11$ A per g of said compound, is greater than 50 Wh/kg, or
  charging or discharging at a rate $\geq 15$ A per g of said compound, is greater than 30 Wh/kg.

43. The electrode of claim 1, wherein the electrode comprises a sheet or a mesh coated or impregnated with the olivine compound.

44. The electrode of claim 1, wherein the electrode comprises a metal foil coated on one or both sides with the olivine compound.

45. The electrode of claim 1, wherein the electrode is a sheet or mesh of electronically conductive material coated with a loading of at least 4 mg of said olivine compound per square centimeter of the sheet or mesh.

46. The electrode of claim 1, wherein said electrode is a sheet or mesh of electronically conductive material coated wit a loading of at least 8 mg of said olivine compound per square centimeter of the sheet or mesh.

47. The electrode of claim 1, wherein said electrode is a sheet or mesh of electronically conductive material coated with a loading of at least 10 mg of said olivine compound per square centimeter of the sheet or mesh.

48. The electrode of claim 1, wherein said electrode is a sheet or mesh of electronically conductive material coated with a loading of at least 10 mg of said olivine compound per square centimeter of the sheet or mesh.

49. The electrode of claim 1, wherein said electrode is a sheet or mesh of electronically conductive material coated with a loading of at least 20 mg of said olivine compound per square centimeter of the sheet or mesh.

50. The electrode of claim 1, wherein said electrode is a sheet or mesh of electronically conductive material coated with said olivine compound and has a total thickness of at least 20 micrometers.

51. The electrode of claim 1, wherein said electrode is a sheet or mesh of electronically conductive material coated with said olivine compound and has a total thickness of at least 40 micrometers.

52. The electrode of claim 1, wherein said electrode is a sheet or mesh of electronically conductive material coated with said olivine compound and has a total thickness of at least 60 micrometers.

53. The electrode of claim 1, wherein said electrode is a sheet or mesh of electronically conductive material coated wit said olivine compound and has a total thickness of at least 80 micrometers.

54. The electrode of claim 1, wherein said electrode is a sheet or mesh of electronically conductive material coated wit said olivine compound and has a total thickness of at least 100 micrometers.

55. The electrode of claim 1, wherein said electrode is a sheet or mesh of electronically conductive material coated wit said divine compound and has a total thickness of at least 150 micrometers.

56. The electrode of claim 1, wherein said electrode is a sheet or mesh of electronically conductive material coated with said olivine compound and has a total thickness of at least 200 micrometers.

57. The electrode of claim 1, wherein the compound has a conductivity of at least $10^{-8}$ S/cm at 27° C.

58. The electrode of claim 1, wherein the compound has a composition $Li_x(M'_{1-a}M''_a)PO_4$, wherein $0,0001 < a \leq 0.1$.

59. The electrode of claim 1, wherein the compound has a composition $(Li_{1-a}M''_a)_x M'_y PO_4$, wherein $0.0001 < a \leq 0.1$.

60. The electrode of claim 1, wherein the electrode further comprises an iron phosphide.

61. The electrode of claim 1, wherein the compound has a composition $Li_x Fe_y Nb_a(PO_4)$.

62. The electrode of claim 1, wherein, relative to a stoichiometric olivine $LiMPO_4$ compound, the compound is lithium deficient.

63. The electrode of claim 1, wherein, relative to a stoichiometric olivine compound $LiMPO_4$, the compound contains an excess of non-lithium metals M' and M".

64. The electrode of claim 1, wherein, relative to a stoichiometric olivine compound $LiMPO_4$, the compound is lithium deficient and contains an excess of non-lithium metals M' and M", such that at least a portion of the non-lithium metals occupy a site in the olivine structure normally occupied by lithium.

65. The electrode of claim 1, wherein the compound has a composition $Li_{0.99}Nb_{0.01}Fe(PO_4)$.

66. The electrode of claim 1, wherein M' further comprises at least one additional first-row transition metal.

67. An electrode comprising an olivine compound having a composition $Li_x M'_y M''_a(PO_4)$, and a specific surface area of at least 40 m²/g, wherein M' is at least iron, M" is selected from the group consisting of Group IIA, IIIA, IVA, VA, VIA, and IIIB metals having an ionic radius less than the ionic radius of $Fe^{2+}$, x is equal to or greater than 0, and a and y are greater than 0.

68. The electrode of claim 67, wherein M" has a formal valence greater than 1+ as an ion in the compound.

69. The electrode of claim 67, wherein M" is one or more metals selected from the group consisting of aluminum, titanium, zirconium, niobium, tantalum, tungsten, and magnesium.

70. The electrode of claim 67, wherein the compound is an n-type conductor.

71. The electrode of claim 67, wherein the compound comprises a mixture of an n-type conductor and a p-type conductor.

72. The electrode of claim 67, wherein the compound is a p-type conductor.

73. The electrode of claim 67, wherein the compound is a p-type conductor when substantially fully lithiated and an n-type conductor when substantially fully delithiated.

74. The electrode of claim 67, wherein the compound is $Li_xFe_yM''_aPO_4$, wherein x, y and a are greater than 0.

75. The electrode of claim 67, wherein the compound has an olivine structure and contains in crystalline solid solution, amongst the metals M' and M", metal ion pairs of different oxidation state, wherein the metal ion pairs of different oxidation state are selected from the group consisting of metal ion pairs $Fe^{2+}$ and $Fe^{3+}$, $Mn^{2+}$ and $Mn^{3+}$, $Co^{2+}$ and $Co^{3+}$, $Ni^{2+}$ and $Ni^{3+}$, $V^{2+}$ and $V^{3+}$, and $Cr^{2+}$ and $Cr^{3+}$, with the ion of lesser concentration being at least 10 parts per million of the sum of the two ion concentrations.

76. The electrode of claim 67, wherein M" is in solid solution in a crystal structure of the compound at a concentration of at least 0.05 mole % relative to M'.

77. The electrode of claim 67, wherein the compound forms primary crystllites, at least 50% of which have a smallest dimension less than 200 nm.

78. The electrode of claim 77, wherein the smallest dimension is less than 50 nm.

79. The electrode of claim 77, wherein the smallest dimension is less than 10 nm.

80. The electrode of claim 67, wherein the compound has a conductivity of at least $10^{-7}$ S/cm at 27° C.

81. The electrode of claim 67, wherein the compound has a conductivity of at least $10^{-5}$ S/cm at 27° C.

82. The electrode of claim 67, wherein the compound has a conductivity of at least $10^{-3}$ S/cm at 27° C.

83. The electrode of claim 67, further comprising less tan 10 weight percent of a conductivity-enhancing additive based on the weight of the compound.

84. The electrode of claim 83, wherein the conductivity-enhancing additive is present in an amount of less than 5 weight percent.

85. Th. electrode of claim 83, wherein the conductivity-enhancing additive is present in an amount of less than 2 weight percent.

86. The electrode of claim 67, wherein M" is niobium.

87. The electrode of claim 67, wherein the compound can intercalate at least one of an alkali metal or hydrogen.

88. The electrode of claim 67, wherein M' is $Fe^{2+}$.

89. The electrode of claim 67, wherein the compound is substantially free of silicon.

90. The electrode of claim 67, wherein the compound, upon delithiation, undergoes phase-separation into a substantially lithiated compound and a substantially delithiated compound, at least one of which have an electronic conductivity of at least $10^{-6}$ S/cm.

91. The electrode of claim 67, wherein x has a value between zero and about 1, and y is about 1.

92. The electrode of claim 67, wherein the compound has at least one of an ordered or partially disordered olivine structure.

93. The electrode of claim 67, wherein the compound has an divine structure and contains in crystalline solid solution, amongst the metals M' and M", simultaneously metal ions of at least one type that is oxidizable and another that is reducible at 23° C.

94. The electrode of claim 67, wherein the compound comprises a crystalline solid solution of a composition selected from the group consisting of $Li_xvac_y(M'_{1-a}M''_a)PO_4$, $Li_{x-a}M''_avac_yM'PO_4$, $Li_x(M'_{1-a-y}M''_avac_y)PO_4$ and $Li_{x-a}M''_aM'_{1-y}vac_yPO_4$, wherein the olivine compound defines two distinct metal sites M1 and M2 and vac represents a vacancy in any of an M1 and M2 site of the olivine compound.

95. The electrode of claim 67, wherein the olivine compound defines two distinct metal sites M1 and M2 and lithium is substituted onto a M2 site of a crystal of the compound at a concentration of at least $10^{18}$ per cubic centimeter.

96. The electrode of claim 67, wherein the composition is any of $Li_x(M'_{1-a}M''_a)PO_4$, $Li_xM''_aM'PO_4$, $Li_x(M'_{1-a-y}M''_aLi_y)PO_4$, or $Li_{x-a}M''_aM'_{1-y}Li_yPO_4$, wherein $0.0001 < a \leq 0.1$.

97. The electrode of claim 67, wherein the composition is any of $Li_x(Fe_{1-a}M''_a)PO_4$, $Li_xM''_aFePO_4$, $Li_x(Fe_{1-a-y}M''_aLi_y)PO_4$, or $Li_{x-a}M''_aFe_{1-y}Li_yPO_4$, wherein $0.0001 < a \leq 0.1$.

98. The electrode of claim 67, wherein the composition is $Li_xvac_{1-x}(M'_{1-a}M''_a)PO_4$, $Li_xM''_avac_{1-a-y}M'PO_4$, $Li_x(M'_{1-a-y}M''_{vac y})PO_4$ or $Li_{x-a}M''_aM'_{1-y}vac_yPO_4$, wherein vac represents a vacancy in a structure of the compound and $0.0001 < a \leq 0.1$.

99. The electrode of claim 67, wherein the composition is $Li_xvac_{1-x}(Fe_{1-a}M''_a)PO_4$, $Li_xM''_avac_{1-a-y}FePO_4$, $Li_x(Fe_{1-a-y}M''vac_y)PO_4$ or $Li_{x-a}M''_aFe_{1-y}vac_yPO_4$, wherein vac represents a vacancy in a structure of the compound and $0.0001 < a \leq 0.1$.

100. The electrode of claim 67, wherein M" is substantially in solid solution in a crystal structure of the compound.

101. The electrode of claim 67, wherein M" is in solid solution in a crystal structure of the compound at a concentration of at least 0.01 atom % relative to M'.

102. The electrode of claim 77, wherein the primary crystallites form an interconnected porous network.

103. The electrode of claim 77, wherein at least 25% of a surface area of the primary crystallites is available for contact with an electrolyte.

104. The electrode of claim 77, wherein at least 50% of a surface area of the primary crystallites is in contact with an electrolyte.

105. The electrode of claim 67, wherein the specific surface area is at least 50 $m^2/g$.

106. The electrode of claim 67, further comprising a conductivity-enhancing additive comprising carbon.

107. The electrode of claim 67, wherein the electrode is adapted for incorporation into an electrochemical device.

108. The electrode of claim 67, formed by mixing an alkali metal salt, a first-row transition metal compound, a phosphorus salt, and a compound selected from the group consisting of ethoxide and methoxide compounds comprising one or more metals selected from the group consisting of Group IIA, IIIA, IVA, VA, VIA, metals having an ionic radius less than the ionic radius of $Fe^{2+}$; milling the mixture; and heat treating the mixture at a first temperature sufficient to form an olivine structure.

109. The electrode of claim 67 having an energy density available from the total mass of said compound that while:
  charging or discharging at a rate $\geq 30$ mA per g of said compound, is greater than 350 Wh/kg, or charging or discharging at a rate ≧150 mA per g of said compound, is greater than 280 Wh/kg, or charging or discharging at a rate ≧300 mA per g of said compound, Is greater than 270 Wh/kg, or charging or discharging at a rate ≧750 mA per g of said compound, is greater than 250 Wh/kg, or charging or discharging at a rate ≧1.5 A per g of said compound, is greater than 180 Wh./kg, or charging or discharging at a rate ≧3 A per g of said compound, is greater than 40 Wh/kg, or charging or discharging at a rate ≧4.5 A per g of said compound, is greater than 10 Wh/kg.

110. The electrode of claim 67, having an energy density available from the total mass of said compound that while:

charging or discharging at a rate ≧30 mA per g of said compound, is greater than 420 Wh/kg, or charging or discharging at a rate ≧150 mA per g of said compound, is greater than 400 Wh/kg, or charging or discharging at a rate ≧300 mA per g of said compound, is greater than 370 Wh/kg, or charging or discharging at a rate ≧750 mA per g of said compound, is greater than 350 Wh/kg, or charging or discharging at a rate ≧1.5 A per g of said compound, is greater than 270 Wh/kg, or charging or discharging at a rate ≧3 A per of said compound, is greBter than 150 Wh/kg, or charging or discharging at a rate ≧4.5 A per g of said compound, is greater than 80 Wh/kg, or charging or discharging at a rate ≧6 A per g of said compound, is greater than 35 Wh/kg, or charging or discharging at a rate ≧7.5 A per g of said compound, is greater than 50 Wh/kg, or charging or discharging at a rate ≧15 A per g of said compound, is greater than 10 Wh/kg.

111. The electrode of claim 67, having an energy density available from the total mass of said compound that while:

charging or discharging at a rate ≧30 mA per g of said compound, is greater than 475 Wh/kg, or charging or discharging at a rate ≧150 mA per g of said compound, is greater than 450 Wh/kg, or charging or discharging at a rate ≧300 mA per g of said compound, is greater than 430 Wh/kg, or charging or discharging at a rate ≧750 mA per g of said compound, is greater than 390 Wh/kg, or charging or discharging at a rate ≧1.5 A per g of said compound, is greater than 350 Wh/kg, or charging or discharging at a rate ≧3 A per g of said compound, Is greater than 300 Wh/kg, or charging or discharging at a rate ≧4.5 A per g of said compound, is greater than 250 Wh/kg, or charging or discharging at a rate ≧7.5 A per g of said compound, is greBter than 150 Wh/kg, or charging or discharging at a rate ≧11 A per g of said compound, is greater than 50 Wh/kg, or charging or discharging at a rate ≧15 A per g of said compound, is greater than 30 Wh/kg.

112. The electrode of claim 67, wherein the electrode comprises a sheet or a mesh coated or impregnated with the olivine compound.

113. The electrode of claim 67, wherein the electrode comprises a metal foil coated on one or both sides with the olivine compound.

114. The electrode of claim 67, wherein the electrode is a sheet or mesh of electronically conductive material coated with a loading of at least 4 mg of said olivine compound per square centimeter of the sheet or mesh.

115. The electrode of claim 67, wherein said electrode is a sheet or mesh of electronically conductive material coated with a loading of at least 8 mg of said olivine compound per square centimeter of the sheet or mesh.

116. The electrode of claim 67, wherein said electrode is a sheet or mesh of electronically conductive material coated with a loading of at least 10 mg of said olivine compound per square centimeter of the sheet or mesh.

117. The electrode of claim 67, wherein said electrode is a sheet or mesh of electronically conductive material coated with a loading of at least 14 mg of said olivine compound per square centimeter of the sheet or mesh.

118. The electrode of claim 67, wherein said electrode is a sheet or mesh of electronically conductive material coated with a loading of at least 20 mg of said olivine compound per square centimeter of the sheet or mesh.

119. The electrode of claim 67, wherein said electrode is a sheet or mesh of electronically conductive material coated with said olivine compound and has a total thickness of at least 20 micrometers.

120. The electrode of claim 67, wherein said electrode is a sheet or mesh of electronically conductive material coated with said olivine compound and has a total thickness of at least 40 micrometers.

121. The electrode of claim 67, wherein said electrode is a sheet or mesh of electronically conductive material coated with said olivine compound and has a total thickness of at least 60 micrometers.

122. The electrode of claim 67, wherein said electrode is a sheet or mesh of electronically conductive material coated with said olivine compound and has a total thickness of at least 80 micrometers.

123. The electrode of claim 67, wherein said electrode is a sheet or mesh of electronically conductive material coated with said olivine compound and has a total thickness of at least 100 micrometers.

124. The electrode of claim 67, wherein said electrode is a sheet or mesh of electronically conductive material coated with said olivine compound and has a total thickness of at least 150 micrometers.

125. The electrode of claim 67, whereIn said electrode is a sheet or mesh of electronically conductive material coated with said olivine compound and has a total thickness of at least 200 micrometers.

126. The electrode of claim 67, wherein the electrode further comprises an iron phosphide.

127. The electrode of claim 67, wherein the compound has a composition $Li_xFe_yNb_a(PO_4)$.

128. The electrode of claim 67, wherein, relative to a stoichiometric olivine $LiMPO_4$ compound, the compound is lithium deficient.

129. The electrode of claim 67, wherein, relative to a stoichiometric olivine compound $LiMPO_4$, the compound contains an excess of non-lithium metals M' and M".

130. The electrode of claim 67, wherein, relative to a stoichiometric olivine compound $LiMPO_4$, the compound is lithium deficient and contains an excess of non-lithium metals M' and M", such that at least a portion of the non-lithium metals occupy a site in the divine structure normally occupied by lithium.

131. The electrode of claim 67, wherein the compound has a composition $Li_{0.99}Nb_{0.01}Fe(PO_4)$.

132. The electrode of claim 67, wherein M' further comprises at least one additional first-row transition metal.

* * * * *